Feb. 7, 1950

J. H. VOSS

PRIVATE AUTOMATIC TELEPHONE SYSTEM OF THE PASSING CALL TYPE 2,496,902

Filed June 28, 1945

12 Sheets-Sheet 1

INVENTOR.
JOHN H. VOSS

BY

ATTORNEY

INVENTOR.
JOHN H. VOSS
BY
Chas. W. Candy
ATTORNEY

Feb. 7, 1950 J. H. VOSS 2,496,902

PRIVATE AUTOMATIC TELEPHONE SYSTEM
OF THE PASSING CALL TYPE

Filed June 28, 1945 12 Sheets-Sheet 3

INVENTOR.
JOHN H. VOSS

BY *Chas. W. Candy*

ATTORNEY

Feb. 7, 1950

J. H. VOSS

PRIVATE AUTOMATIC TELEPHONE SYSTEM OF THE PASSING CALL TYPE 2,496,902

Filed June 28, 1945

12 Sheets-Sheet 4

INVENTOR.
JOHN H. VOSS

BY Chas. W. Candy

ATTORNEY

INVENTOR.
JOHN H. VOSS
BY
Chas. W. Cardy
ATTORNEY

PRIVATE AUTOMATIC TELEPHONE SYSTEM
OF THE PASSING CALL TYPE

Filed June 28, 1945

INVENTOR.
JOHN H. VOSS

BY Chas. W. Candy

ATTORNEY

Feb. 7, 1950 J. H. VOSS 2,496,902

PRIVATE AUTOMATIC TELEPHONE SYSTEM OF THE PASSING CALL TYPE

Filed June 28, 1945 12 Sheets-Sheet 7

INVENTOR.
JOHN H. VOSS

BY Chas. Tu. Candy

ATTORNEY

Feb. 7, 1950

J. H. VOSS
PRIVATE AUTOMATIC TELEPHONE SYSTEM
OF THE PASSING CALL TYPE 2,496,902

Filed June 28, 1945

12 Sheets-Sheet 8

INVENTOR.
JOHN H. VOSS

BY Chas. W. Candy

ATTORNEY

Feb. 7, 1950 J. H. VOSS 2,496,902
PRIVATE AUTOMATIC TELEPHONE SYSTEM
OF THE PASSING CALL TYPE
Filed June 28, 1945 12 Sheets-Sheet 9
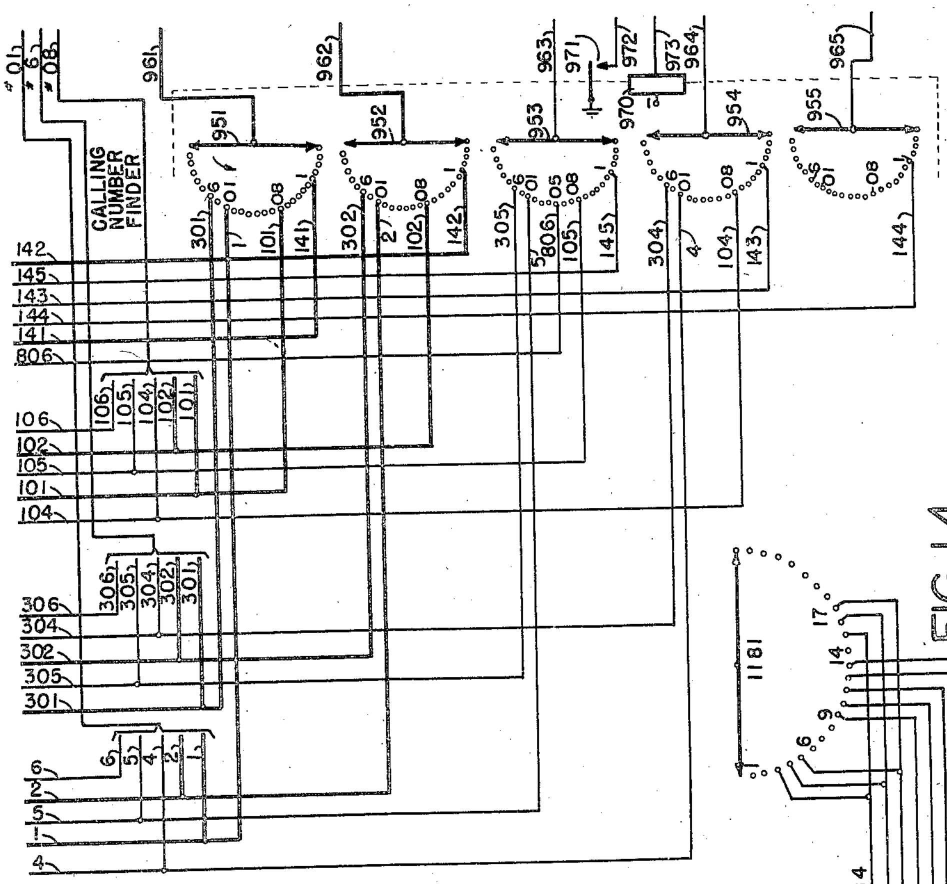
FIG. 9
FIG. 13
| | | |
|---|---|---|
| FIG. 12 | FIG. 7 | FIG. 8 |
| FIG. 4 | FIG. 5 | FIG. 6 |
| FIG. 1 | FIG. 2 | FIG. 3 |
| FIG. 9 | FIG. 10 | FIG. 11 |
PLAN FOR ASSEMBLING SHEETS
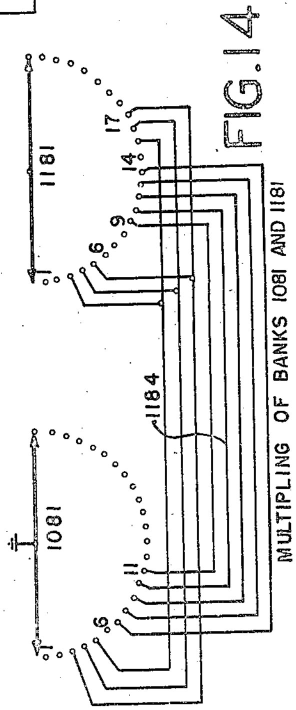
FIG. 14
MULTIPLING OF BANKS 1081 AND 1181
INVENTOR.
JOHN H. VOSS
BY [signature]
ATTORNEY

PRIVATE AUTOMATIC TELEPHONE SYSTEM
OF THE PASSING CALL TYPE

Filed June 28, 1945

INVENTOR.
JOHN H. VOSS

BY Chas. [signature]

ATTORNEY

Feb. 7, 1950

J. H. VOSS

PRIVATE AUTOMATIC TELEPHONE SYSTEM OF THE PASSING CALL TYPE 2,496,902

Filed June 28, 1945

12 Sheets-Sheet 11

INVENTOR.
JOHN H. VOSS

BY Chas. L. Candy

ATTORNEY

Feb. 7, 1950

J. H. VOSS

PRIVATE AUTOMATIC TELEPHONE SYSTEM OF THE PASSING CALL TYPE 2,496,902

Filed June 28, 1945

12 Sheets-Sheet 12

INVENTOR.
JOHN H. VOSS

BY [signature]

ATTORNEY

Patented Feb. 7, 1950 2,496,902

UNITED STATES PATENT OFFICE 2,496,902

PRIVATE AUTOMATIC TELEPHONE SYSTEM OF THE PASSING CALL TYPE

John H. Voss, Downers Grove, Ill., assignor to Automatic Electric Laboratories, Inc., Chicago, Ill., a corporation of Delaware Application June 28, 1945, Serial No. 601,965

5 Claims. (Cl. 179—27)

This invention relates in general to telephone systems, and more particularly to small systems of the type commonly known as private automatic telephone exchanges.

Private automatic telephone exchanges are installed in business and other establishments for providing local service between a relatively small number of local telephone stations, and for completing connections between the local telephone stations and a distant telephone exchange over trunk lines.

An object of the invention is to provide an improved private automatic telephone exchange system of the general type shown in Patent No. 2,056,752, issued October 6, 1936, to John H. Voss, in which system new and novel circuit means are included for accomplishing the various telephone connections.

Another object of the invention is to provide an automatic telephone exchange system which can be efficiently operated either with or without a special attendant's station in the completion of trunk connections between the exchange and another exchange, and, when the attendant's station equipment is furnished, the attendant's station can be quickly and conveniently switched out of service for night or other light load periods without requiring complicated temporary switching arrangements.

A further object of the invention is to provide in the attendant's station equipment special facilities in addition to the facilities ordinarily provided for the handling of trunk connections between the local exchange and another exchange. These additional facilities include means for completing trunk connections for local telephone stations not enabled to make direct connections with the trunk lines, means for offering trunk connections to local telephone stations testing busy, and means for establishing a conference circuit connection between a trunk line and two local telephone stations.

A feature of the invention is the provision of a code call connecting link in the local automatic exchange which is used for completing code calls between local telephone stations without requiring the occupying of local connecting links during the conversation periods of the code calls.

Another feature of the invention is that a station connected with a trunk line connection can call a local telephone station over the code call paging equipment, and the paged station, after answering the code call, can transfer the trunk line connection from the first station to the paged station.

A further feature of the invention resides in the circuit arrangement whereby a called local telephone station is given a distinctive signal when answering the call to indicate that the attendant has held a trunk line connection for the called local station and has signalled the called local station without remaining on the local connection until the called local station answers. The called local station thereupon accepts the trunk line connection by operating momentarily the transfer key associated with the called local station.

Another feature of the invention is the provision of circuit means so that a local telephone station connected with a trunk line connection can signal the attendant over the trunk line. The attendant can disconnect the local station from the trunk line, and can offer the trunk line connection to another local station if so desired.

A still further function of the invention is the provision of means in the local connecting links so that a local station can actuate such means for the purpose of over-riding the guarding conditions when the called station tests busy.

Another feature of the invention is that the marking potentials required in the banks of the trunk and local switches for the completion of outgoing trunk calls, the completion of incoming trunk calls, the transferring of trunk calls from local stations to other local stations, and for obtaining access to the code call link are so controlled by a common relay group that marking potential for only one class of call is established at one time. Consequently, there can be no interference between various classes of calls occurring simultaneously.

Another feature of the invention concerns a novel arrangement of call restriction relays whereby a local telephone station is restricted from making outgoing trunk calls or answering incoming trunk calls, or both. This means of restriction is effective on trunk calls but not on local code calls although code calls function under the same common relay group control as trunk calls.

Other features of the invention relate mostly to circuit improvements that will be apparent from the following detail description of the drawings comprising Figures 1 to 14 inclusive, which drawings show by means of the usual circuit diagrams a sufficient amount of apparatus to enable the invention to be described and understood.

Figure 1 illustrates in the lower left-hand corner a local telephone designated as station #08. Two line circuits, one for the attendant's information line #01 and the other for station #08, are shown near the center of Figure 1. The wipers and operating magnet of one of the local finders are shown at the right of Figure 1, together with the multiple bank connections to the trunk finders, code call finders, local connectors and other local finders.

Figure 2 shows a group of finder-connector relays for controlling the operation of one of the finder and connector switch links, the wipers of which are shown in Figures 1 and 3 respectively.

Figure 3 shows the connector wipers and operating magnet of the finder-connector link, together with the multiple bank connections. At the upper right-hand corner is shown a local telephone station #6, and to the left thereof the associated line circuit. A small group of relays are shown at the lower right-hand corner, these relays being associated with the code call finder link and the trunk call allotter.

Figure 4 at the left and center shows the equipment for an attendant's station. The wipers and operating magnet of one of the trunk finders are shown at the right, together with the multiple bank connections to the local connectors, local finders, code call finders and other trunk finders.

Figures 5 and 6 show the relays of one of the two-way trunk circuits, the associated finder and wipers being shown in Figure 4.

Figure 7 at the left and center shows a trunk transfer control circuit and associated chain relays, and at the right shows the chain relays associated with outgoing and incoming trunk calls.

Figure 8 at the upper portion shows trunk call restriction relays for preventing any local station, or stations, from connecting with the trunk line. In the lower portion of Figure 8 is shown a relay type trunk call allotter which regulates the sequence in which outgoing trunk calls, incoming trunk calls and transferred trunk calls are completed.

In Fig. 9, at the right are shown the wipers and operating magnet for the calling number finder of the code call link, together with the multiple bank connections to the answering number finder of the code call link, the local connectors, the local finders and the trunk finders.

Figure 1:
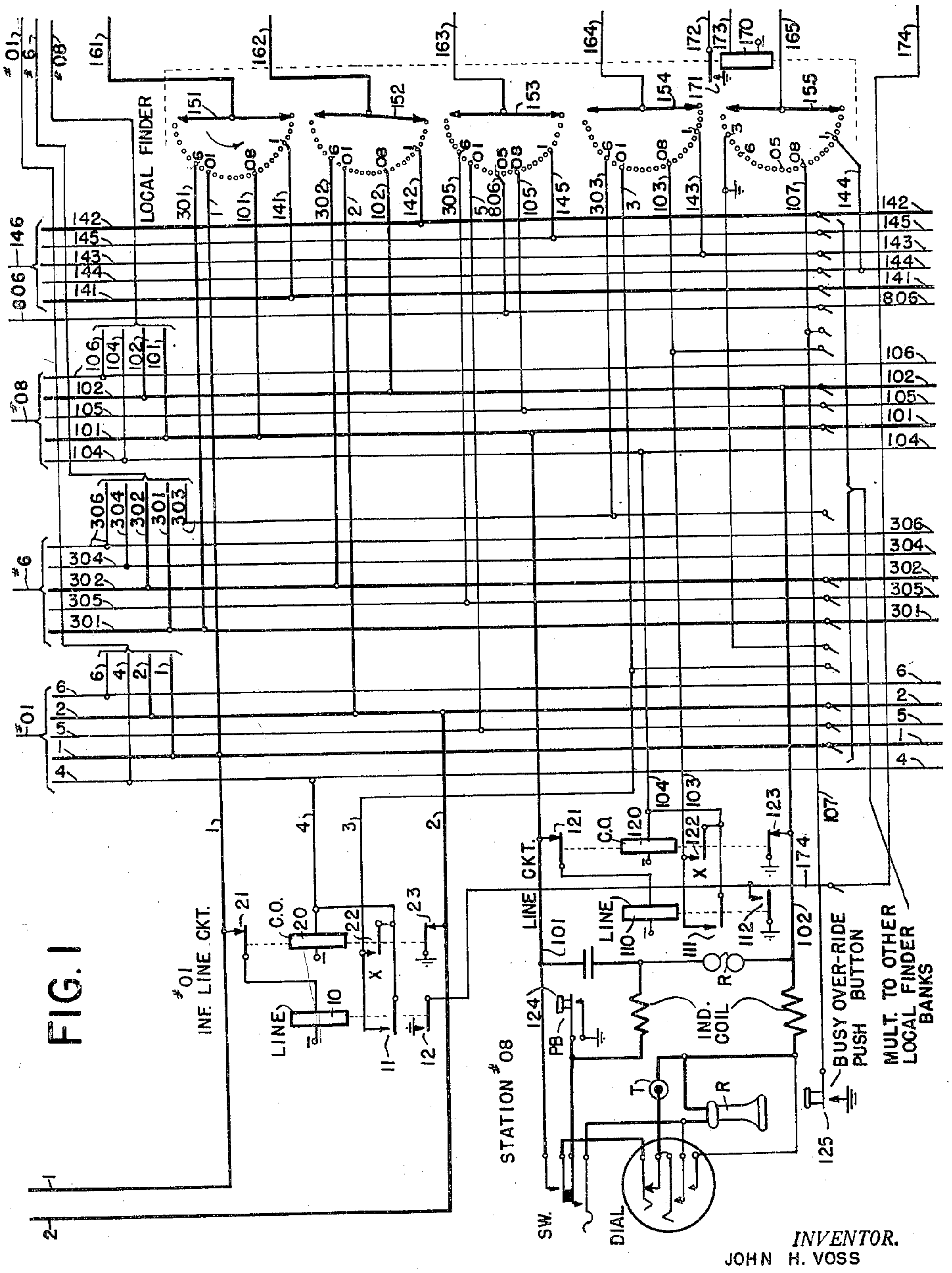

Figure 13 includes a numbering plan for assembling the drawing sheets together so that a continuous circuit drawing of the invention may be established.

Figure 10:
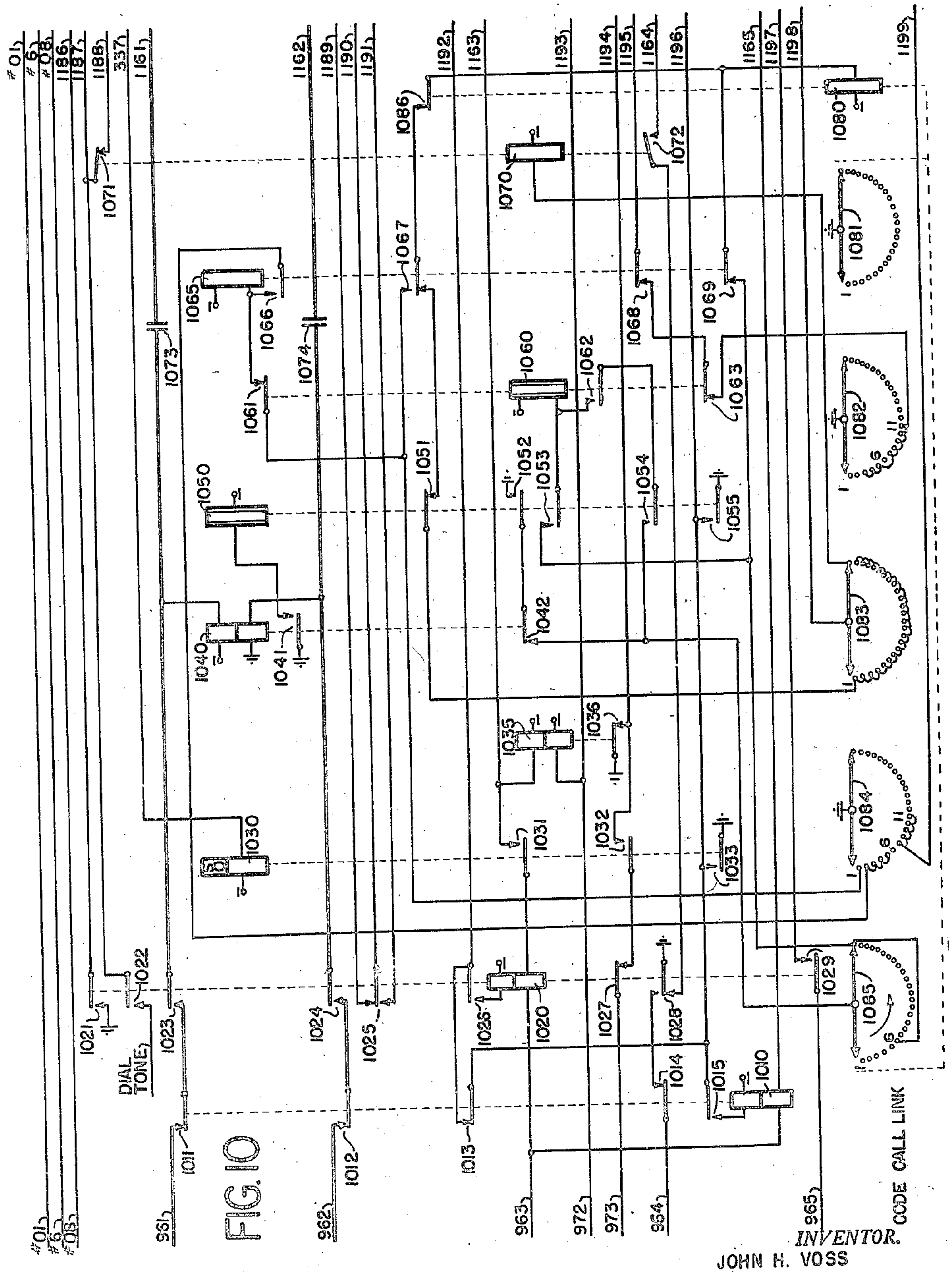
Figures 10 and 11 show the relay equipment of the code call link. The associated calling number finder and wipers for this code call link are shown in Figure 9, and the answering number finder and wipers in Figure 11.
Figure 11:
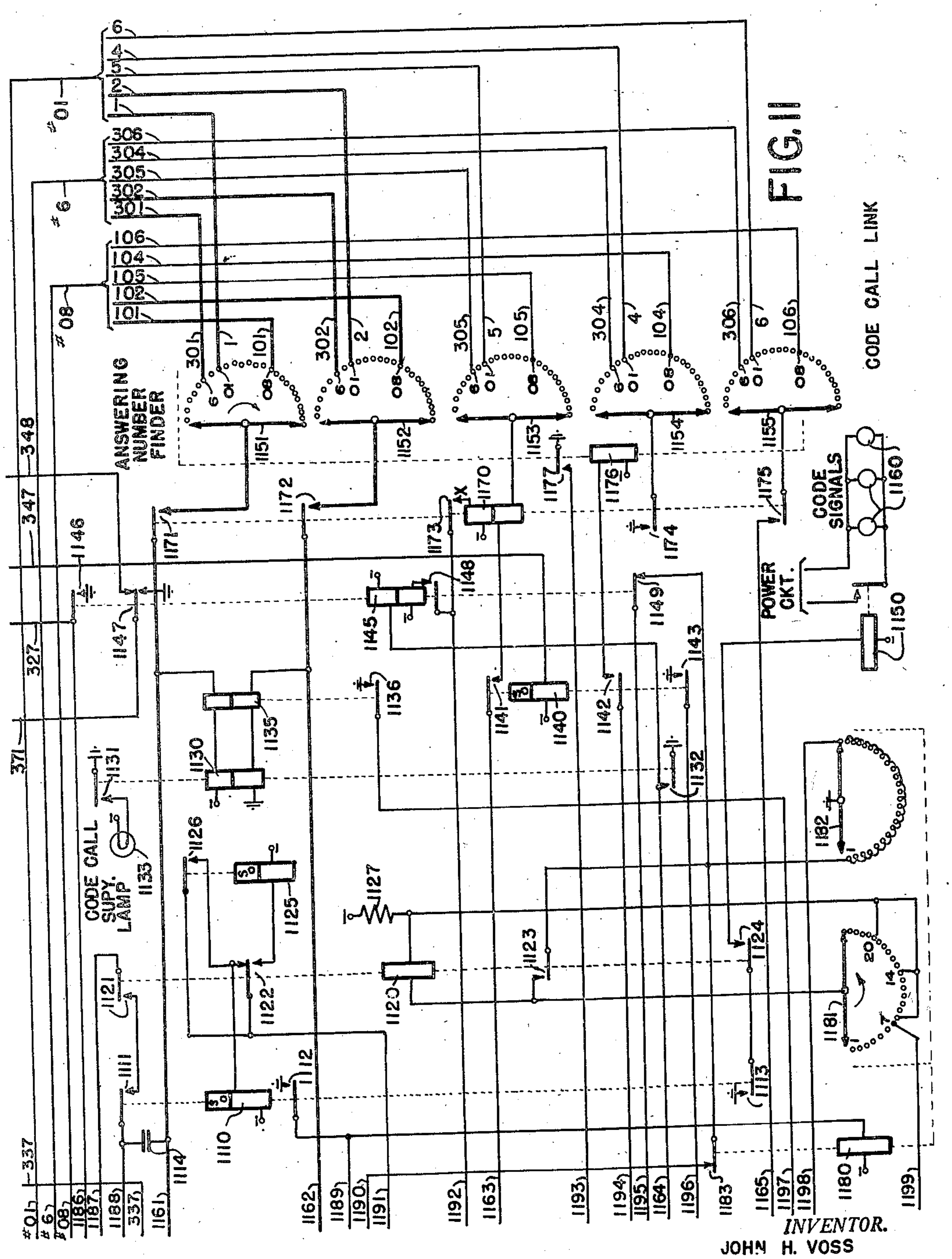

Figure 14 shows an enlarged view of the multipling of banks 1081 and 1181 associated with the code call link of Figures 10 and 11 respectively.

Referring now to Figure 1, all local telephone stations, such as station #08, are fitted with a standard well known automatic telephone set including a calling dial, receiver R, transmitter T, switching springs SW, ringer R, and an induction coil. Non-restricted stations from which trunk calls may be made and answered, in addition to local calls, are equipped with a push button such as PB.

Semi-restricted stations may be entitled to answer incoming trunk calls but not to make outgoing trunk calls, such as station #6 (Figure 3), and are also equipped with a push button PB. The "test" terminals on the banks of trunk finder wiper 453 (Fig. 4) and local finder wiper 153 (Fig. 1) of such station line circuits are, however, connected to negative battery through a resistance each time an outgoing trunk call is attempted. For example, the test terminals of station line circuit #6 on the banks of trunk finder wiper 453 and local finder wiper 153 are connected by means of conductor 305 carried through Figs. 1, 4, 5 and 7 to the working contact of armature 803 (Fig. 8), and armature 803 is connected to negative battery through resistance 805. Relay 800 (Fig. 8) is operated each time an outgoing trunk call is attempted from station #6 and, consequently, the sixth contacts of the banks of wipers 453 and 153 are connected to negative battery through resistance 805. The connecting of negative battery through resistance 805 to the sixth contacts of the banks of finder wipers 453 and 153 prevents the trunk circuit from switching through to station #6 as hereinafter described.

Semi-restricted stations may, on the other hand, be entitled to make outgoing trunk calls but not to answer directly incoming trunk calls from the distant exchange. The "test" terminals on the banks of trunk finder wiper 453 (Fig. 4) and local finder wiper 153 (Fig. 1) of such station line circuits are connected to negative battery through a resistance each time such stations attempt to answer an incoming trunk call. For example, the test terminal of station line circuit #05 on the banks of trunk finder wiper 453 and local finder wiper 153 are connected by means of conductor 806 carried through Figs. 1, 4, 5, and 7 to the working contact of armature 812 (Fig. 8), and armature 812 (Fig. 8) is connected to negative battery through resistance 815. Relay 810 (Fig. 8) is operated each time station #05 attempts to answer an incoming trunk call and, consequently, the twelfth contacts of the banks of wipers 453 and 153 are connected to negative battery through resistance 815. The connecting of negative battery through resistance 815 to the twelfth contacts of the banks of finder wipers 453 and 153 prevents the trunk circuit from switching through to station #05 as hereinafter described.

Fully-restricted stations are not entitled to make outgoing trunk calls or receive incoming calls directly from the distant exchange. Such stations, however, may be equipped with a push button and thus be able to connect with incoming trunk calls when such incoming trunk calls are first answered by another station entitled to answer incoming trunk calls directly and then transferred by that station to the wanted fully-restricted station. On the other hand, the push button may be omitted from any fully-restricted station, thus depriving such a fully-restricted station from accepting incoming trunk calls answered by other stations. The attendant's station shown in Fig. 4, however, has facilities for transferring incoming trunk calls to a fully-restricted station not equipped with a push button.

Station #08 shown in Fig. 1 is equipped with a second push button designated "Busy over-ride push button." The operation of this push button, when a local station dialled from station #08 tests busy, permits the calling person at station #08 to cut in on the previously established connection and talk to the dialled station. While station #08 is the only station shown equipped with a second push button, it should be understood that any local station may be so equipped. It is also possible to provide a local station with an automatic busy over-ride facility by connecting ground permanently to the corresponding station terminal in the bank of local finder wiper 155 (Fig. 1). In order to illustrate the full possibilities of busy over-ride service, the bank of local finder wiper 155 is shown wired in Fig. 1 as follows:

The fifteenth contact of the bank is connected to the busy over-ride push button of station #08; the third contact of the bank is permanently connected to ground, thus giving station #3 automatic busy over-ride; and the sixth and twelfth contacts of the bank are unwired, thus denying busy over-ride service to stations #6 and #05.

Each station line extends to a line circuit comprising a line relay and a cut-off relay, such as relays 110 and 120 respectively (Fig. 1). The conductors extending from the line circuits terminate in the banks of the local finders, connectors, trunk finders and code call calling and answering number finders.

The local, trunk and code call calling and answering number finder switches are mechanically similar to the well known rotary line switch having no normal, or home, position, while the circuits thereof have been altered in accordance with the present invention.

Figure 3:
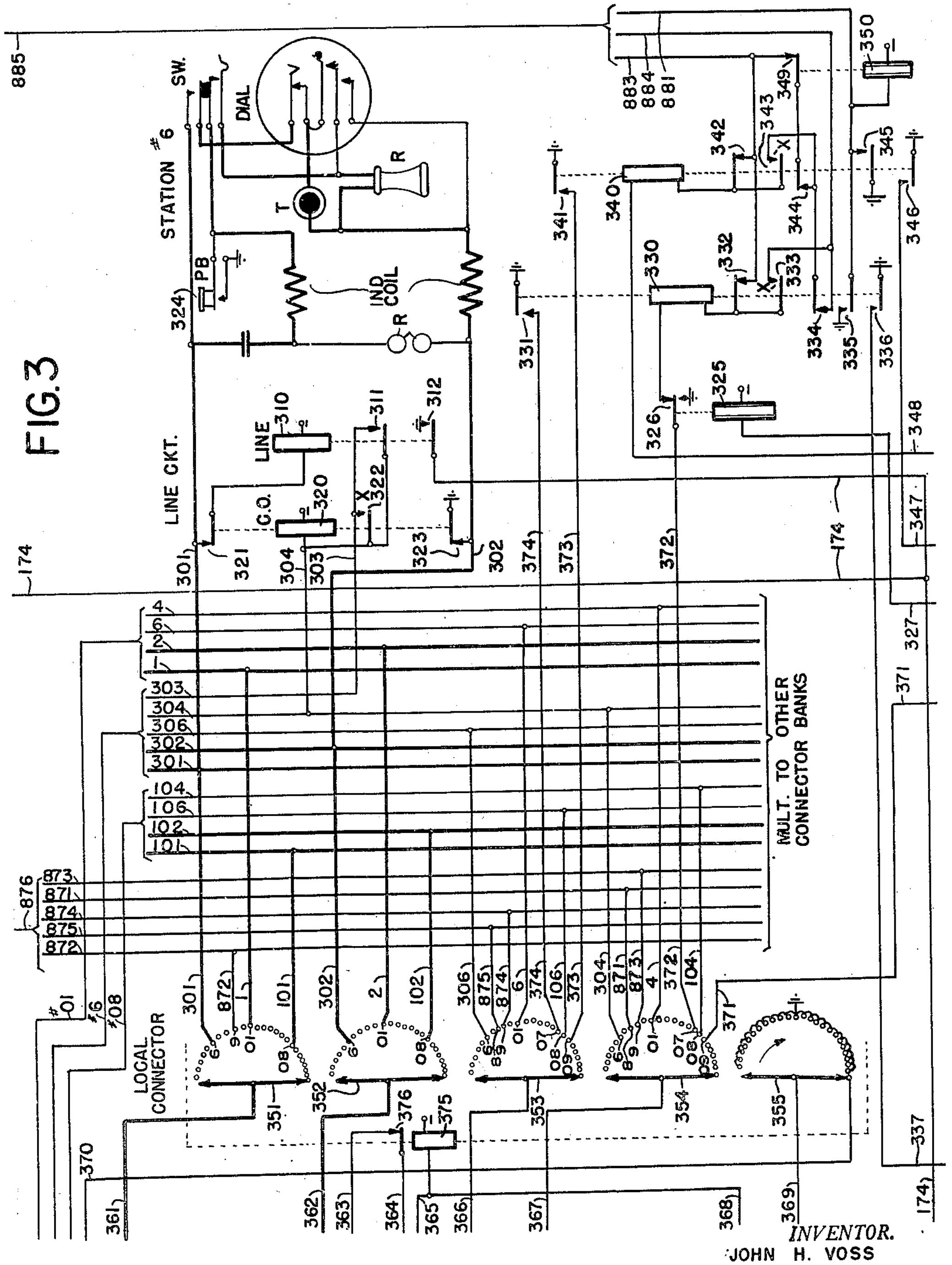

The connector switch shown in Fig. 3 is mechanically similar to the finders but instead of automatically hunting for a marked potential as the finder does, the connector is directively controlled from the normal, or home, position by impulses.

The code registering switch comprising operating magnet 1080 and wipers 1081 to 1085 inclusive (Fig. 10) is mechanically similar to the finders but instead of automatically hunting for a marked potential as the finder does, the code registering switch is directively controlled from the normal, or home, position by impulses.

The code sending switch comprising operating magnet 1180 and wipers 1181 and 1182 (Fig. 11) is mechanically similar to the finders in that it automatically hunts for marked potentials, but the circuit thereof has been changed to cause the code sending switch to return automatically to its normal, or home, position after each use.

Relay 700 in the transfer control circuit (Fig. 7) has an armature 701 provided with a weight 702 on its movable end to cause the armature to vibrate for a predetermined period when the relay releases the armature.

Figure 4:
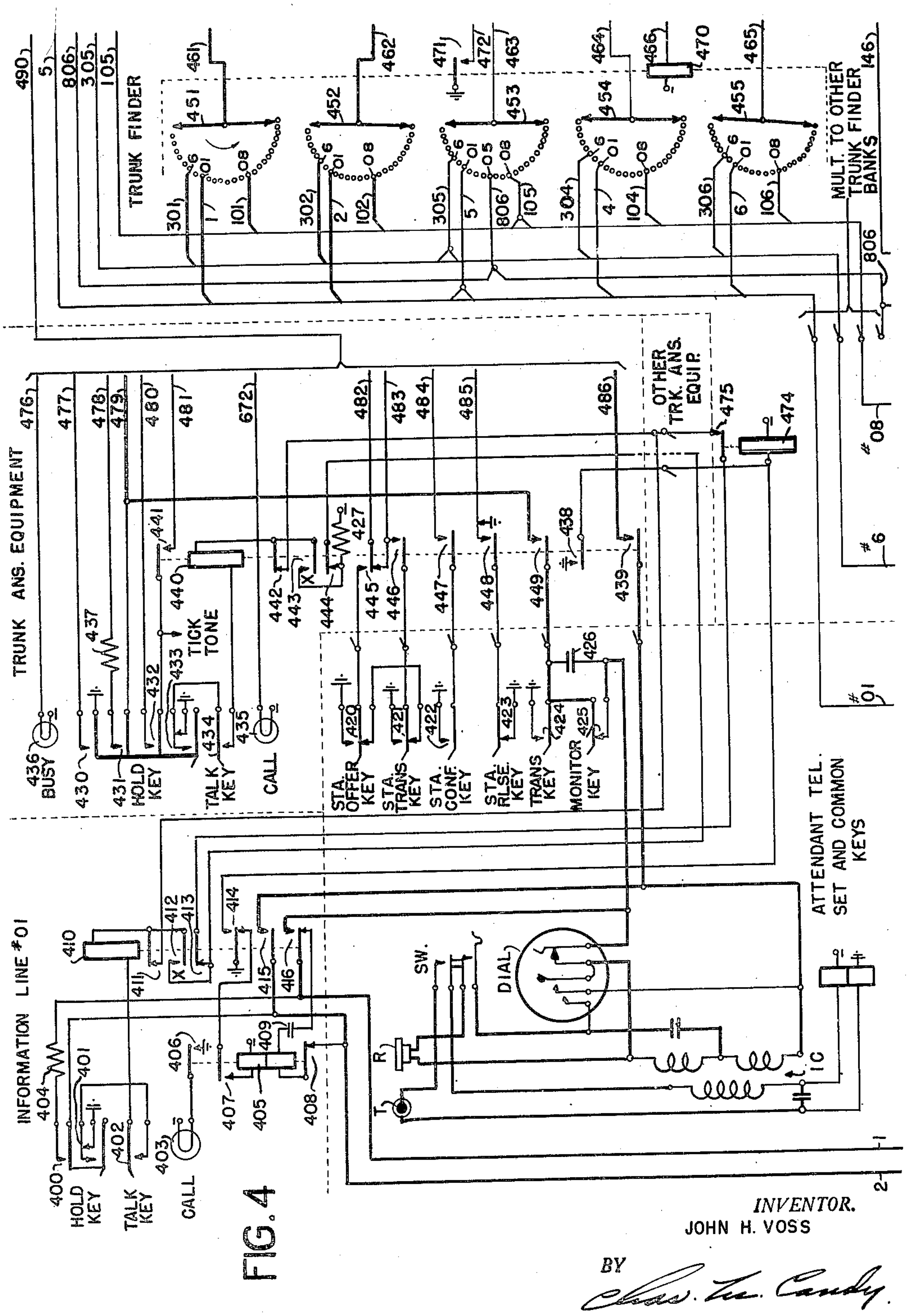

Referring now to the attendant's equipment shown in Fig. 4, the attendant's telephone includes a calling dial, a handset comprising a transmitter T and receiver R, switching springs SW which are closed when the handset is lifted from the cradle and an induction coil IC. Associated with the attendant's telephone are six switch keys designated Station offering key, Station transfer key, Station conference key, Station release key, Transfer key and Monitor key, respectively. The attendant's information line #01 provides two-way service with the local automatic exchange, and includes a call lamp signal, a talk key and a hold key. The trunk answering equipment provides the attendant with facilities for answering incoming calls from, or making outgoing calls to, the distant exchange, and includes a busy lamp signal, a call lamp signal, a talk key and a hold key for each distant exchange trunk.

Figure 5:
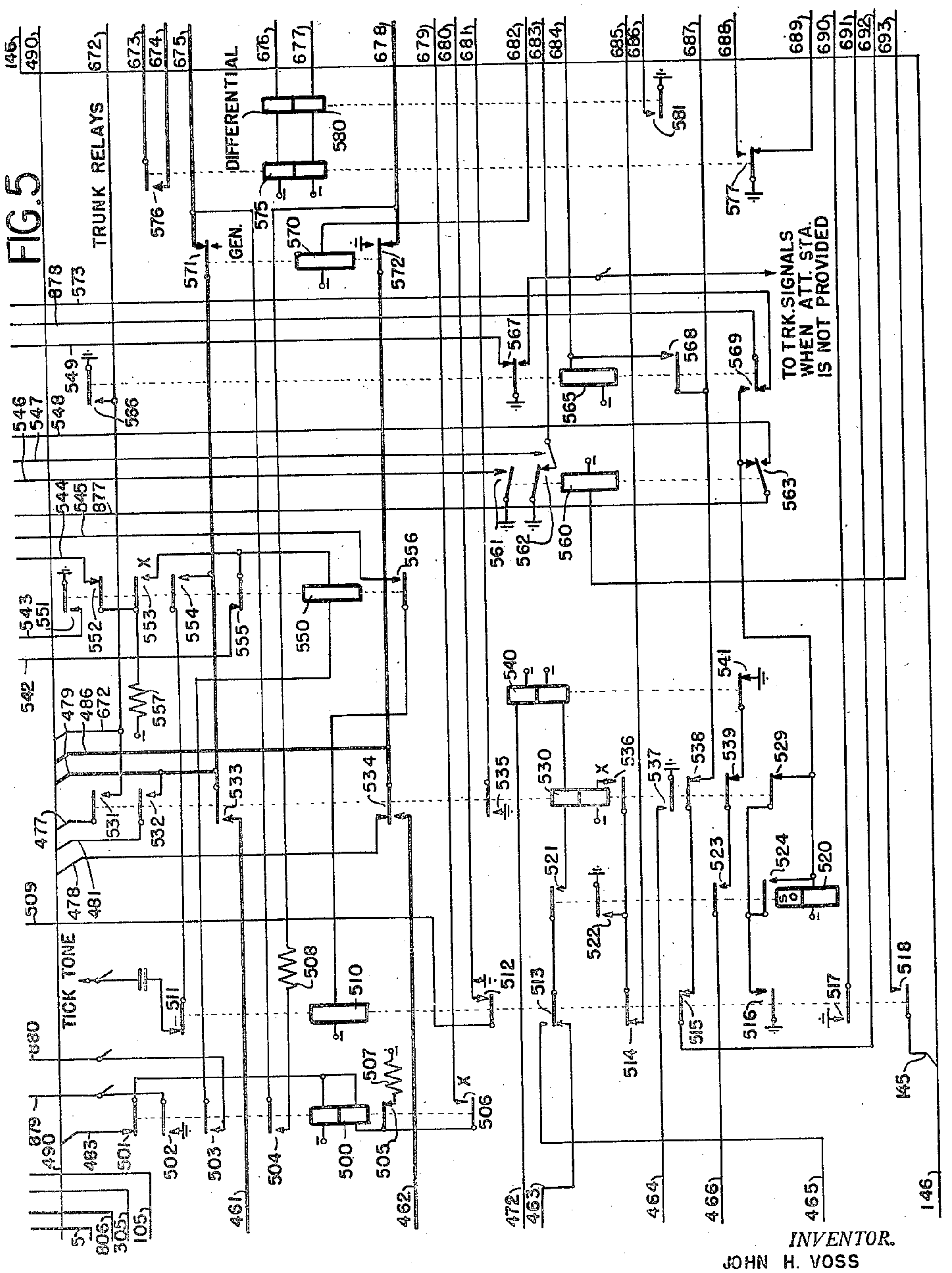
Figure 6:
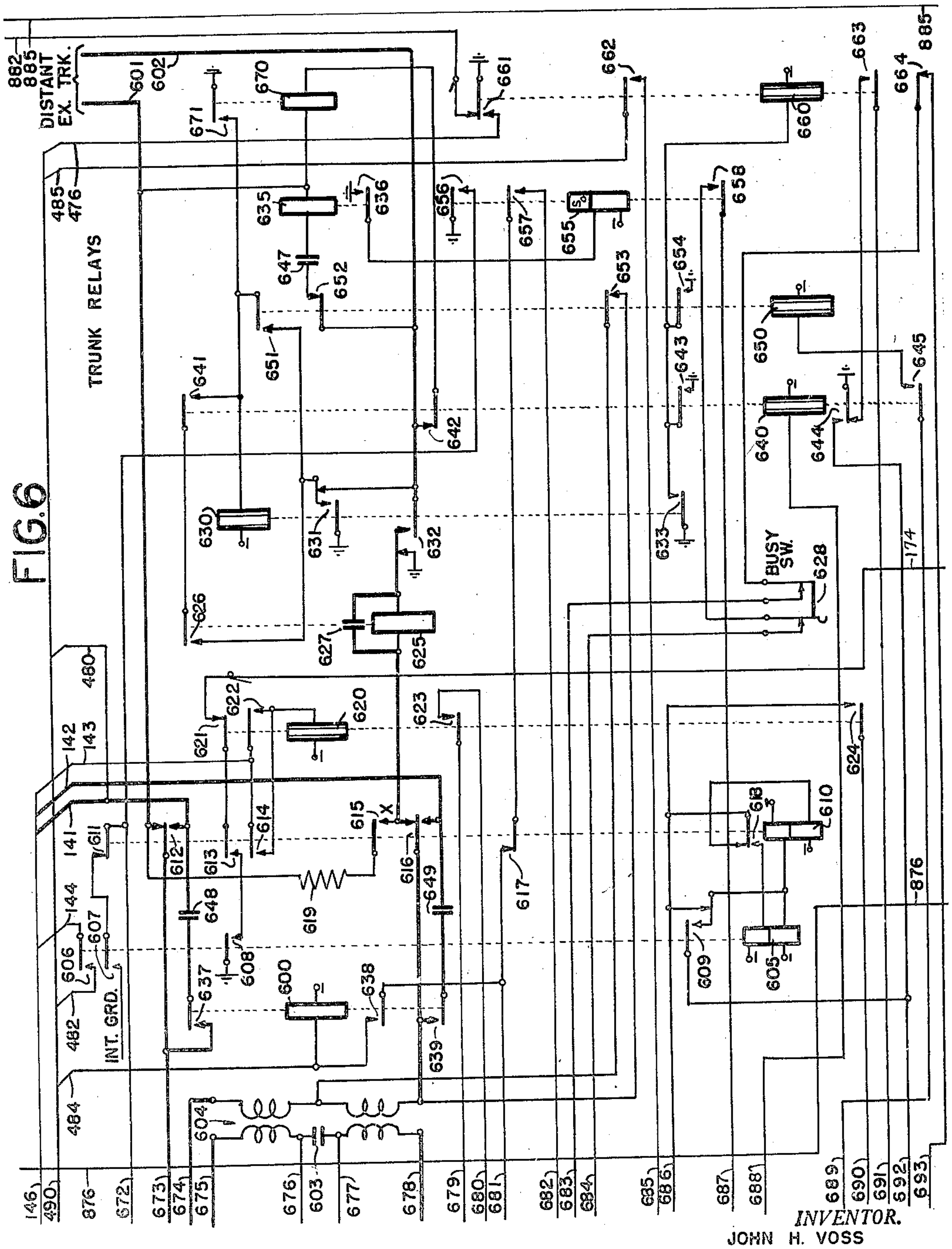

In Figs. 5 and 6, one of a number of two-way trunk circuits is shown connecting the local automatic exchange with a distant telephone exchange. The distant exchange may be of either the automatic type or the common battery manual type.

The local automatic exchange disclosed in the drawings includes facilities for eighteen local lines and five two-way trunk lines. Some of the local stations have only a single digit in the line call numbers, others have two digits, and a third group three digits. Numbers 8 and 9 are used as the trunk answering and trunk calling numbers respectively, and numbers 07 and 09 as the calling and answering numbers, respectively, of the code call paging system.

It should be understood at this time that while the embodiment of the present invention disclosed and described in this specification includes switches of the well known 25-contact rotary line switch type, the invention is not limited to the particular form shown but may utilize larger bank-capacity switches such as the well known Strowger vertical and rotary motion finder and connector switches to increase the number of local station lines.

It should be further understood that while a plurality of battery connections are shown in the drawings, they are preferably the same battery. Also, in order to simplify the drawings further, relay contacts for starting and stopping the operation of the tone and ringing current generating equipment have been omitted. The generating equipment furnishes well known facilities such as interrupted ringing current, continuous ringing current, interrupted positive battery, dial tone, busy tone, and a tick tone comprising a relatively faint but distinctive interrupted signal which may be superimposed on an established talking circuit without interfering with the conversation. An X contact shown in association with a relay armature is a working contact that makes contact with its armature before any other contacts of the particular relay are opened or closed, thus characterizing the relay as a two-step relay.

Having described the equipment and apparatus, a detailed description of the operation will now be given.

*Local calls*

Briefly, local calls are completed in the following manner: The person at the calling station lifts the handset from the telephone cradle and, after hearing conventional dial tone, dials the number of the desired station. If the called station is in use, the calling person receives busy tone. If the called station is not busy, the called station is rung automatically and intermittently. The release of the connection is under the control of the calling person.

In order to describe a local call in detail, it is assumed that station #08 (Fig. 1) desires to call station #6 (Fig. 3). Responsive to the lifting of the handset from the telephone cradle, switch springs SW (Fig. 1) close a circuit for energizing line relay 110 as follows: from ground by way of armature 123, conductor 102, lower winding of induction coil, transmitter T, impulse spring of dial, upper SW springs, conductor 101, armature 121, winding of line relay 110 to negative battery. At armature 111, relay 110 marks line #08 as calling in the bank of the local finder accessible to wiper 154 by connecting negative battery through the winding of cut-off relay 120 to the fifteenth contact of the bank by way of conductor 103.

At armature 112, relay 110 connects ground to the finder start conductor 174 to complete a circuit for the combined line and start relay 225 (Fig. 2) in the finder-connector link as follows: from ground by way of armature 112, conductor 174 to Fig. 2, armature 291 and working contact, resistance 228, upper winding of relay 225 to negative battery. The purpose of resistance 228 is to properly regulate the amount of current supplied to relay 225 and also to minimize the click to the negative talk conductor of the link at a later stage of the operation. At armature 227, relay 225 completes the circuit to relay 230, causing relay 230 to operate.

At armature 232, relay 230 connects ground through the upper windings of relays 220 and 210 in series, armature 207, conductor 164 to wiper 154; and, at armature 233, completes the circuit for energizing the finder operating magnet 170 from ground by way of armature 214 and resting contact, armatures 221, 233, conductor 173, winding of magnet 170 to negative battery.

Magnet 170, upon energizing, positions its pawl preparatory to stepping the wipers of the local finder to find the calling station and, at its armature 171, completes the circuit for energizing stepping relay 220 as follows: from ground by way of armature 171, conductor 172, lower winding of relay 220 to negative battery. Relay 220 upon operating, opens the previously traced circuit for magnet 170 at armature 221, whereupon magnet 170 restores to advance the wipers of the local finder into engagement with their next bank contacts. The restoration of magnet 170 also opens the circuit to relay 220 at armature 171 with the result that relay 220 now restores. The restoration of relay 220 again completes the previously traced circuit for magnet 170, and the operation of magnet 170 again completes the circuit to relay 220 at armature 171. The re-operation of relay 220 again opens the circuit to magnet 170, causing magnet 170 to restore and step the finder wipers into engagement with their next bank contacts. In the same manner as just described, relay 220 and magnet 170 operate alternately until test wiper 154 encounters the calling potential of the calling station line.

As test wiper 154 encounters the bank contact marked with calling potential, the following circuit is completed for energizing relays 210, 220 and cut-off relay 120 from ground at armature 232, upper winding of relay 220, upper winding of relay 210, armature 207, conductor 164, wiper 154 in engagement with contact #15 of its bank, conductor 103, armature 111, winding of cut-off relay 120 to negative battery. Relay 210, upon energizing, first closes its X contact at armature 217, thus locking itself in the operated position to ground at armature 232. Relay 210 extends the negative and positive talking conductors at armatures 211 and 212 respectively from the #15 bank contacts of wipers 151 and 152 to the windings of line relay 225, and relay 225 is now held operated over the loop from station #08 line independent of the start circuit through armature 291 and working contact.

At armature 213 and working contact, relay 210 shunts the circuit of relay 290 with ground, causing relay 290 to restore, and thereby makes this finder-connector link busy to calls from other station lines; and, at armature 216, shunts its upper winding and the upper winding of relay 220, thereby causing relay 220 to restore. Armature 216 also connects ground to contact #15 of wiper 154 bank by way of armature 207, conductor 164 and wiper 154 for the double purpose of maintaining the circuit to station #08 cut-off relay 120 by way of conductor 103, and extending ground by way of multiple conductors 103 and 104 to the respective station #08 terminals in all finder and connector banks to guard station #08 against intrusion. The ground at armature 213 and working contact is also extended to relay 235 by way of conductor 369, wiper 355, conductor 370, resistance 238, upper winding of relay 235 to negative battery for causing relay 235 to complete the dial tone circuit at armature 236.

Relay 120 (Fig. 1), upon energizing, first closes its X contact at armature 122, thereby establishing a multiple circuit from wiper 154. Upon fully operating, relay 120 disconnects relay 110 from the negative line at armature 121, and ground from the positive line at armature 123, causing relay 110 to restore. Relay 120 is maintained in the operated position through armature 122, and relay 110 removes ground from start conductor 174 at armature 112.

Digressing for the moment from the description of the call from station #08 to station #6, an explanation will now be given of the method of automatically allotting the finder-connector links to successive calls originated at local stations. In the foregoing description it was stated that the operation of relay 210 shunted relay 290 at armature 213 and working contact, causing relay 290 to restore and make this finder-connector link busy to calls from other station lines. Prior to relay 290 being shunted down, any number of calling station lines may have connected ground to the common start conductor 174. When finder wiper 154, however, engages the nearest bank contact having calling potential and thereby seizes the related calling station line, the searching action of this finder-connector link is completed and relay 290 is shunted down. The link busy condition is established by relay 290 disconnecting the upper winding of relay 225 from armature 291 and, hence, any subsequent connection of ground to the start conductor 174 by other calling station lines does not reach relay 225.

Figure 2:
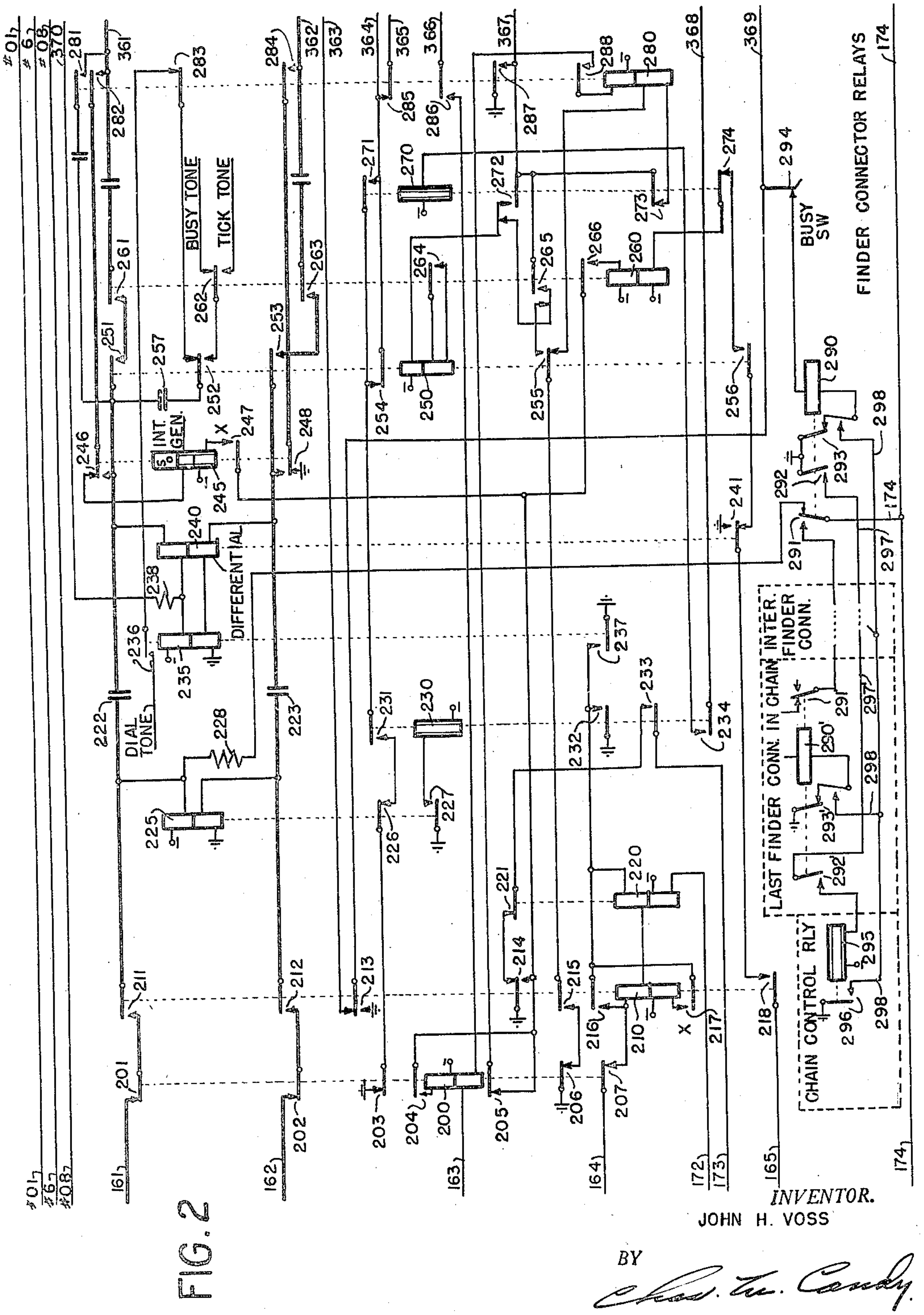

Assuming now that the finder-connector link shown in detail in Figs. 1, 2 and 3 is link #1, then armature 291 through its resting contact switches start conductor 174 to armature 291′ of link #2, and any subsequent connecting of ground to start conductor 174 causes link #2 to search for a calling station bank contact having calling potential. In a like manner to that just described for armature 291, armature 291′ of link #2 switches start conductor 174 to armature 291′ of link #3 when link #2 finds a station bank contact having calling potential. Similarly, start conductor 174 is switched from link #3 to link #4, and so on until the last link in the chain is reached. The resting contact of armature 291′ of the last link is dead ended.

As each link finds a calling line, the associated 290 or 290′ relay is shunted down and, consequently, when all such relays are released, a chain circuit is completed from ground, armature 292 and resting contact, conductor 297 to link #2, armature 292' and resting contact of link #2, conductor 297' to link #3, armature 292' and resting contact of link #3, and so on through all the links including the last link, and from the resting contact of armature 292' of the last link through chain control relay 295 to negative battery. Relay 295 operates and connects ground to the resting contacts of armatures 293 and 293' of all links via multiple conductor 298. If all of the links are still occupied at this moment, neither relay 290 nor any of the 290' relays will operate and, therefore, start conductor 174 will remain switched to the dead resting contact of armature 291' in the last link. If, however, link #1 and other links have been freed in the interval, then relay 290 and relays 290' of the idle links will operate and lock. The start conductor 174 is then switched back to link #1 at armature 291 and working contact, and the idle links are again allotted in numerical sequence.

Armatures 293 and 293' are fitted with contacts of the make-before-type and relay 295 is slow to release to insure that relay 290 and 290' relays of all idle links operate and lock.

Returning now to the description of the call from station #08 to station #6, the finder wipers 151 to 155 inclusive of link #1 are in contact with station #08 bank terminals, and relay 290 has released and switched start conductor 174 to link #2. Dial tone is supplied to station #08 through armatures 236, 283, 252 and resting contact, condenser 257 to the negative talking conductor leading back to station #08. Upon hear- the well known dial tone, the calling person dials the digit 6. Responsive to the dialing of digit 6, the circuit to line relay 225 is interrupted six times, thereby causing relay 225 to be deenergized six times. Relay 225, therefore, restores momentarily for each impulse, and at armature 227 opens the circuit to relay 230. Relay 230, however, is of the slow-to-release type and, therefore, does not restore during the impulsing period. Consequently, the circuits controlled by relay 230 are not disturbed. At armature 226, relay 225 transmits an impulse to connector operating magnet 375 and relay 270 for each deenergization. This multiple circuit may be traced from ground by way of armatures 203, 226, 231 and working contact, 254, 285, conductor 365, winding of magnet 375 to negative battery, and also through armature 234 and working contact, winding of relay 270 to negative battery. Relay 270 operates and, since it is of the slow-to-release type, it does not restore during the impulsing period. At armature 271, relay 270 completes a multiple circuit for itself and magnet 375, independent of the circuit through armature 254.

Connector magnet 375, upon operating, positions its pawl preparatory to stepping the wipers of the connector. As relay 225 operates after each impulse from station #08 dial, the impulsing circuit to magnet 375 is opened at armature 226, with the result that magnet 375 steps the wipers of the connector one step for each opening and closing of relay 225 loop circuit. Magnet 375 therefore, steps the wipers of the connector from the normal, or home, position to contacts #6 of their banks, which contacts are connected to station #6. As wiper 355 leaves its home position, the circuit to the upper winding of relay 235 is opened and dial tone, therefore, is removed from the talking conductors at armature 236.

The operation of the finder-connector link at this time is dependent upon whether station #6 is in use or is idle. Should station line #6 be busy, ground will be encountered by test wiper 354 at its bank contact #6 which causes busy relay 250 to operate from ground by way of the multiple conductor 304 of station line #6, contact #6 of wiper 354 bank, wiper 354, conductor 367, armature 272 and working contact, upper winding of relay 250 to negative battery. At armatures 251 and 253 respectively, relay 250 prepares points in an auxiliary talking circuit to connector wipers 351 and 352, which auxiliary talking circuit may be used by station #08 when over-riding the busy condition. At armature 252 and working contact, relay 250 connects busy tone to the negative talking conductor to station #08 through condenser 257, thus informing the calling person that station #6 is busy on another call. Shortly after the impulses cease, relay 270 restores and completes the locking circuit of busy relay 250 from ground by way of armatures 206, 215 and working contact, 255 and working contact, resting contact of 265, resting contact of 272, upper winding of relay 250 to negative battery. The contacts of armature 272 are of the make-before-break type to prevent an opening of the circuit to relay 250 as relay 270 restores.

When the calling person at station #08 hears the busy tone, he has the option of depressing busy over-ride push button 125 momentarily or abandoning the call by returning his handset to the cradle. Should he depress push button 125, busy over-ride relay 260 operates from grounds by way of push button 125, conductor 107, contact #15 of wiper 155 bank, wiper 155, conductor 165, armatures 218, 241 and resting contact, 256, 274, lower winding of relay 260 to negative battery. Relay 260 locks to ground by way of armature 214 and working contact and armature 266.

At armatures 261 and 263 respectively, relay 260 completes a talking circuit to the selected busy connection from condensers 222 and 223 to wipers 351 and 352 in engagement with contacts #6 of their banks, and from contacts #6 of wiper 351 and wiper 352 banks by way of conductors 301 and 302. At armature 262 and working contact, relay 260 connects a tick tone by way of armature 252 and working contact, condenser 257 to the negative talking conductor, to acquaint the talking parties on the busy connection that an auxiliary talking circuit has been completed to their connection. The talking person at station #08 may now converse with the person at station #6. At armature 264, relay 260 short-circuits the lower winding of busy relay 250 to make this relay slow to release. At armature 265, relay 260 transfers the holding circuit of relay 250 from armature 255 and working contact to ground by way of conductor 304, contact #6 of wiper 354 bank, wiper 354, conductor 367, armature 265 and working contact, resting contact of armature 272, upper winding of relay 250 to negative battery.

Relay 250 is made slow to release in order to prevent this finder-connector link from automatically seizing station #6 line circuit should the established busy connection be released at the moment. If busy relay 250 were not slow to release when its locking circuit is opened by the removal of guarding ground from conductor 304, then switching relay 280 would be immediately connected to cut-off relay 320 of station #6 from ground by way of armatures 206, 215 and working contact, 255 and resting contact, lower winding of relay 280, armature 273, conductor 367, wiper 354 in engagement with contact #6 of its bank, conductor 304, winding of cut-off relay 320 to negative battery, thus seizing station #6 line circuit. Instead of conversing with station #6 in the hearing presence of the other person on the established connection, the person at station #08 may request both persons to disconnect, and then may call station #6 over a new connection.

When the calling person at station #08 releases by returning the handset to the cradle after talking to station #6 by means of the busy over-ride, the loop circuit to relay 225 is opened at the upper springs of switch SW (Fig. 1), and relay 225 restores. At armature 227, relay 225 opens the circuit of release relay 230, which restores after a short interval. Relay 230, upon restoring, removes ground, at armature 232, from the holding circuits of relays 210 and 120, causing these relays to restore; and also removes ground at armature 232 from multiple conductor 103 engaged by wiper 154 to disconnect the busy guarding potential from station #08. The restoration of cut-off relay 120 returns line circuit #08 to normal by connecting line relay 110 to conductor 101 at armature 121, and ground to conductor 102 at armature 123.

Relay 210, upon restoring, opens the talking circuit at armatures 211 and 212, and, at armature 213 in the normal position, removes the ground shunt from relay 290. At armature 213, relay 210 completes the circuit to magnet 375 from ground, contact #6 of wiper 355 bank, wiper 355, conductor 369, armature 213 and resting contact, conductor 363, armature 376 and resting contact, conductor 364, armature 285, conductor 365, winding of magnet 375 to negative battery. At armature 214 in the normal position, relay 210 opens the locking circuit to relay 260, causing relay 260 to restore.

The closing of the connector magnet 375 circuit at armature 213 and resting contact causes magnet 375 to operate and interrupt its own circuit at armature 376 in the operated position. Magnet 375, therefore, operates in the same manner as a buzzer to advance the connector wipers 351 to 355 inclusive step by step until wiper 355 no longer encounters a grounded bank contact. Since the normal, or home, position bank contact is the only contact accessible to wiper 355 that is not connected to ground, the wipers of the connector will be advanced step by step until wiper 355 reaches its home position. As wiper 355 reaches the home position, negative battery is connected to the winding of relay 290 by way of upper winding of relay 235, resistance 238, conductor 370, home contact of wiper 355 bank, wiper 355, conductor 369 and busy switch 294 for switching this finder-connector link back into the allotting chain.

Relay 260, upon restoring, opens the auxiliary talking circuit at armatures 261 and 263: removes tick tone from armature 262: removes the short-circuit, at armature 264, from the lower winding of relay 250; and, at armature 265, opens the locking circuit to relay 250. Busy relay 250, upon restoring, further opens the auxiliary talking circuit at armatures 251 and 253.

Assuming now that station #6 was idle at the time the connector wipers were stopped on bank contacts #6, busy relay 250 does not operate because connector wiper 354 does not find ground on its bank contact #6. Relay 270 restores shortly after the impulsing period and, at armature 273 in the normal position, completes the circuit for energizing switching relay 280 in series with cut-off relay 320 of station #6 line circuit as follows: ground by way of armatures 206, 215 and working contact, 255 and resting contact, lower winding of relay 280, armature 273, conductor 367, wiper 354 in engagement with the sixth contact of its bank, conductor 304, winding of cut-off relay 320 to negative battery. Relays 280 and 320 both operate.

Relay 280, locks to ground by way of armature 214 and working contact, armatures 205 and 288. At armatures 282 and 284 respectively, relay 280 connects wipers 351 and 352 to armatures 246 and 248. At armature 283, relay 280 removes dial tone from the talking circuit; and, at armature 287, connects ground to multiple conductor 304 leading to contacts #6 of all finder and connector test banks for protecting station #08 from intrusion. This guarding circuit may be traced from ground by way of armature 287, conductor 367, wiper 354 in engagement with contact #6 of its bank, conductor 304 multipled to bank contacts #6 of all finder and connector test banks. Armature 287 also transfers the holding circuit of station #6 cut-off relay 320 from the lower winding of relay 280 to ground direct.

Cut-off relay 320, upon operating, disconnects line relay 310 from line conductor 301 at armature 321, and ground from line conductor 302 at armature 323, thus preparing line circuit #6 for ringing. Ringing current is supplied from the link circuit for automatically signalling station #6 from interrupted generator through upper winding of ringing cut-off relay 245, armature 246 and resting contact, armature 282, conductor 361, wiper 351 in engagement with contact #6 of its bank, conductor 301, condenser and ringer R in series, conductor 302, contact #6 of wiper 352 bank, wiper 352, conductor 362, armatures 284, 248 and resting contact to ground.

When the call is answered at station #6 by the lifting of the handset from the cradle, ringing cut-off relay 245 is operated over station #6 line loop, this time including the upper springs of switch SW and transmitter T in place of the condenser and ringer R. At armature 247 and working "X" contact, relay 245 locks to ground by way of armature 214 and working contact. At armatures 246 and 248, relay 245 opens the ringing circuit, and at the working contacts of these armatures connects the talking conductors 301 and 302 of station #6 line circuit in series with differential relay 240 and relay 235 to negative battery and ground. Relay 235 alone is operated. Differential relay 240 does not energize at this time because its two windings are equal and oppose each other. The talking circuit between stations #08 and #6 is now complete over the heavy talking conductors. Transmission battery is supplied to station #08 through relay 225, and to station #6 through relays 235 and 240 in series.

After the conversation has been terminated, and responsive to the calling person at station #08 returning the handset to the cradle, the loop circuit to relay 225 is opened at the upper springs of switch SW (Fig. 1) and relay 225 restores. From this point on the releasing of the finder-connector link is essentially the same as that previously described for the situation where the calling person at station #08 talked to station #6 by means of the busy over-ride facility, with the minor exceptions that that ringing cut-off relay 245 and switching relay 280 are in the locked-up position, and busy relay 250 and busy over-ride relay 260 remained in the normal, or non-operated, position.

In order to call a station in the two-digit group of numbers as, for example, station #05, the calling person initiates the call in the same manner as previously described to cause a finder-connector link to be connected to the calling line. In response to dial tone, the calling person dials the digit 0 to step the connector wipers (351 to 355 inclusive) to contacts #10 of the connector banks, which contacts are dead. Since neither ground or negative battery is encountered by connector wiper 354 on contact #10 of its bank, the connector remains in this position until the receipt of the second digit. In response to the calling person dialling the second digit 5, the wipers of the connector are stepped from contacts #10 of the connector banks to contacts #15 which terminate the line circuit of station #05 in the connector banks. The connection is now completed by the finder-connector link in the manner previously described.

In order to call a station in the three-digit group of numbers as, for example station #002, the calling person dials the first digit 0 which causes the connector wipers to be stepped to contact #10 of the connector banks, which contacts are dead. The connector therefore, remains in this position until the receipt of the second digit. In response to the calling person dialling the second digit 0, the wipers of the connector are stepped from contacts #10 to contacts #20 of the connector banks, which contacts are also dead. The connector, therefore, remains in this position until the receipt of the third digit. In response to the calling person dialling the third digit 2, the wipers of the connector are stepped from contacts #20 to contacts #22 which terminate the line circuit of station #002 in the connector banks.

Each finder-connector link is provided with a busy switch, such as 294, which enables the maintenance man to make the corresponding link busy to calls from the station lines. Operating busy switch 294 causes its contacts to open the circuit of relay 290, thus causing this relay to restore. Relay 290, upon restoring, switches the start conductor 174 from relay 225 at armature 291. The finder-connector link remains in this busied condition until busy switch 294 is returned to the normal, or closed-contact, position.

*Incoming trunk calls*

An incoming trunk call from the distant exchange is announced to the local stations by the operation of multiple signals located throughout the premises, when an attendant's station is not in use. It is, of course, possible to have both an attendant's station and the multiple signals, together with any well known method of switching from the attendant's station to the multiple signals, and vice versa, dependent upon the periods the attendant's station is staffed.

Any local station not restricted against answering incoming trunk calls directly, may answer an incoming trunk call indicated by the operation of the multiple signals by lifting his handset from the telephone and, upon receipt of dial tone, dialling the trunk answering number digit 8. Responsive to the dialling of the digit 8, and in the manner described in detail in the preceding section titled "Local calls," the connector wipers of the local finder-connector link are stepped into engagement with contacts #8 of their banks. The selection of contacts #8 of the connector banks causes the trunk call allotter shown in Figure 8 to seize the trunk circuit on which the incoming call arrived. This trunk circuit is then caused to find automatically the local finder-connector over which the trunk answering number was dialed, switch through to the answering local station line, and release the used local finder-connector link.

It will now be assumed that the incoming trunk call was received over conductors 601 and 602 (Figure 6) of trunk circuit #1, that no other trunk circuits are in use at the moment, and that an attendant's station is not in use. Relays 670 and 635 of trunk circuit #1 are in a position to operate, being bridged across conductors 601 and 602. Relay 670 is fitted with a very high-resistance winding in order that the ringing cut-off relay at the distant exchange will not operate through relay 670 winding. Relay 670 operates during ringing periods and also in the silent periods. Relay 635 is an alternating current relay and operates only during ringing periods.

The circuit for energizing relay 670 during either the ringing or silent periods may be traced from the distant exchange over conductor 601, winding of relay 670, armature 642, conductor 602 and back to the distant exchange. The circuit for energizing relay 635 during the ringing periods may be traced from generator at the distant exchange, conductor 601, winding of relay 635, condenser 647, armature 652, conductor 602 and back to generator at the distant exchange.

Relay 670, upon operating, completes the circuit to relay 630 at armature 671. Relay 630 is of the slow-to-release type and, consequently, will not release due to any fluctuations in the operation of relay 670. Relay 630, upon operating, prepares a point in its locking circuit at armature 631: at armature 632 and working contact, prepares a point in the circuit to series relay 625; and, at armature 633, completes an obvious circuit to slow-to-release relay 660.

Relay 660, upon operating, removes ground from the circuit to normally-operated relay 830 at armature 661, but relay 830 does not restore at this time because ground is supplied to relay 830 from the other trunk circuits over conductor 882; and, at armature 661 and working contact, connects ground to conductor 476 to complete the circuit to a busy lamp at an attendant's station should an attendant's station be provided, to inform the attendant that this trunk is occupied. At armature 664, relay 660 opens the circuit to relay 560, causing relay 560 to restore and make this trunk circuit busy to outgoing calls as hereinafter described.

Relay 635 does not operate until ringing current is supplied from the distant exchange. When ringing current is applied to the trunk circuit, relay 635 operates and completes an obvious circuit at armature 636 for energizing relay 655. Relay 655 is of the slow-to-operate type in order that it will not be operated when ringing relay 635 may respond momentarily to surges on the trunk line circuit from the distant exchange. Relay 655, upon operating, completes the circuit to relay 565 from ground, armature 644 and resting contact, armature 663, conductor 691, armatures 515, 538, conductor 687, armature 658, left-hand contact of busy switch 628, conductor 684, winding of relay 565 to negative battery. Relays 635 and 655 both restore during each silent period between ringing periods.

Relay 565, upon operating, locks to ground by way of armature 644 and resting contact, armature 663, conductor 891, armatures 515, 538 and 568. At armature 567, relay 565 opens the chain circuit to relay 820, causing relay 820 to restore; and, at armature 567 and working contact, completes the circuit to the multiple signals located throughout the premises. The operation of the multiple trunk signals informs the local stations that an incoming trunk call from the distant exchange is awaiting attention.

Relay 820, upon restoring when its chain circuit was opened at armature 567, removes ground from the trunk answering contact #8 on the connector test banks. The purpose of relay 820 in its normally operated position maintaining ground on the trunk answering contact #8 of the connector test banks, is to make the trunk answering number busy should a local station dial the trunk answering number when there is no incoming trunk call to answer.

Figure 7:
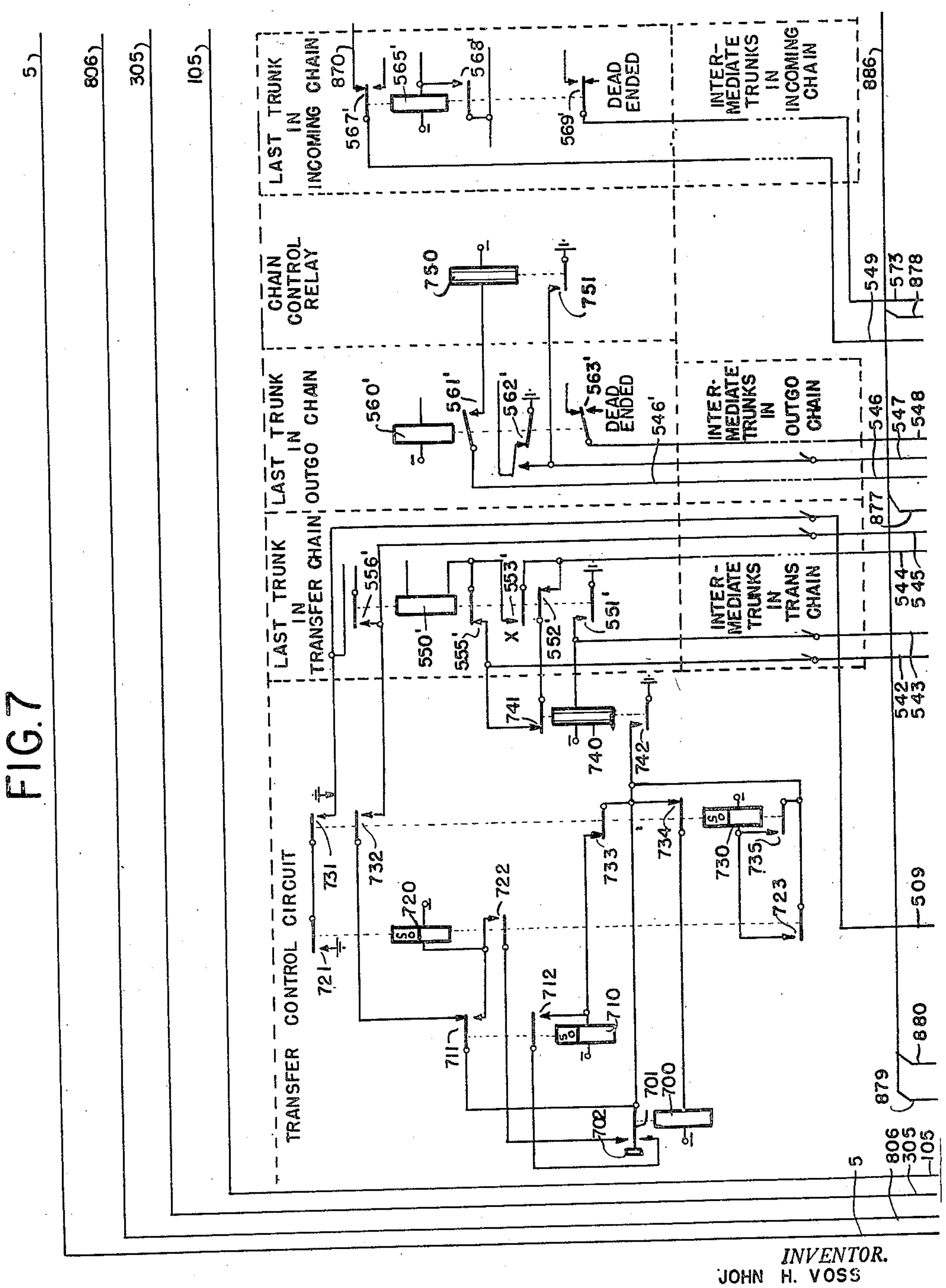

The trunk circuits are arranged to pre-allot an idle trunk circuit for use in an outgoing trunk call by means of chain relay 560 shown in Figure 5 for trunk circuit #1 and chain relays 560′ for the second, third, and so on through the last trunk circuit, the 560′ relay for the last trunk circuit being the only 560′ relay shown in Figure 7. As normally shown in Figure 5, chain relay 560 in the operated position has allotted trunk circuit #1 for use in an outgoing trunk call by preparing a point in the circuit to relay 520 at armature 563 and working contact. When relay 660 is operated on the incoming trunk call, the circuit of relay 560 is opened at armature 664, and relay 560 restores. The outgoing call busy condition is established by relay 560 disconnecting conductor 877 from the winding of relay 520 at the working contact of armature 563, and switching conductor 877 through armature 563 and resting contact to armature 563′ of trunk circuit #2 by way of conductor 548. Consequently, trunk circuit #2 is now allotted for use in an outgoing trunk call. In a like manner to that just described for trunk circuit #1, armature 563′ of trunk circuit #2 switches conductor 877 to armature 563′ of trunk circuit #3 when trunk circuit #2 is taken into use. Similarly, conductor 877 is switched from trunk circuit #3 to trunk circuit #4, and so on until the last trunk circuit in the outgoing trunk chain is reached. The resting contact of armature 563′ of the last trunk circuit is dead ended.

As each trunk circuit is taken into use, the associated 560 or 560′ relay is released and, consequently, when all such relays are released, a chain circuit is completed from ground, armature 561 and resting contact, conductor 546 to trunk circuit #2, armature 561′ and resting contact of trunk circuit #2, conductor 546′ to trunk circuit #3, armature 561′ and resting contact of trunk circuit #3, and so on though all of the trunk circuits including the last trunk circuit, and from the resting contact of armature 561′ of the last trunk circuit through chain control relay 750 to negative battery. Relay 750 operates and connects ground by way of multiple conductor 547 to the resting contacts of armatures 562 and 562′ of all trunk circuits. If all of the trunk circuits are still occupied at this moment, neither relay 560 nor any of the 560′ relays will operate and, therefore, conductor 877 will remain switched to the dead resting contact of armature 553′ in the last trunk circuit. If, however, trunk circuit #1 and other trunk circuits have been freed in the interval, then relay 560 and relays 560′ of the idle trunk circuits will operate and lock. Conductor 877 is then switched back to trunk circuit #1 at armature 563 and working contact, and the idle trunk circuits are again pre-allotted for outgoing call use in numerical sequence. Armatures 562 and 562′ are fitted with contacts of the make-before-break type and relay 750 is slow to release to insure that relay 560 and the 560′ relays of all idle trunk circuits operate and lock.

Returning now to the description of the incoming trunk call on trunk circuit #1, the multiple signals throughout the premises are indicating that an incoming call from the distant exchange is awaiting attention, the release of relay 560 has switched conductor 877 to armature 563′ of trunk circuit #2, and relay 820 is in the released position. Relays 565, 630, 660 and 670 are in the operated position, and relays 635 and 655 are operated during the ringing periods from the distant exchange. Assuming further that a person at station #08 has lifted his handset for the purpose of answering the incoming trunk call, an idle finder-connector link is caused to find station #08 terminals in the finder banks and return dial tone to station #08 telephone. Responsive to the dialling of digit 8, and in the manner described in detail in the preceding section titled "Local calls," the connector wipers are stepped into engagement with contacts #8 of their banks. Relay 270 restores shortly after the impulsing period and, at armature 273, completes the circuit for energizing relay 280 in series with chain relay 850 as follows: ground by way of armatures 206, 215 and working contact, 255 and resting contact, lower winding of relay 280, armature 273, conductor 367, wiper 354 in engagement with contact #8 of its bank, conductor 871 in cable 876 through Figure 6 to Figure 8, conductor 871 in Figure 8, armature 821 and resting contact, winding of relay 850, armature 853, conductor 883 in cable 885 through Figure 6 to Figure 3, conductor 883 in Figure 3, armatures 349, 344, 334, conductor 884 in cable 885 to Figure 8, conductor 884 in Figure 8, armatures 864, 855, 846, resistance 848 to negative battery. Relays 280 and 850 both operate.

Figure 8:
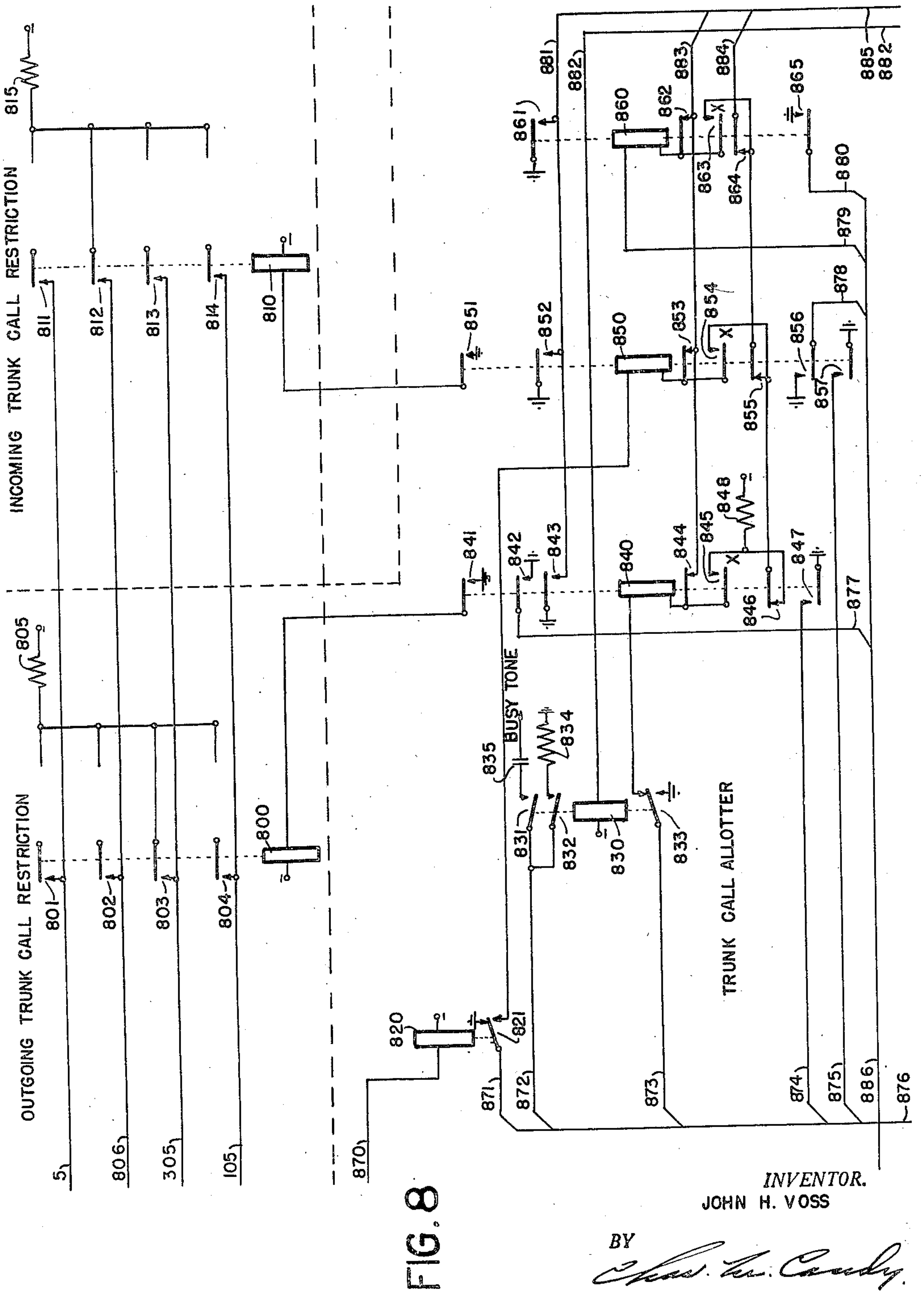

Relay 850 locks to ground by way of armature 287, conductor 367, wiper 354 in engagement with contact #8 of its bank, conductor 871 through cable 876 to Figure 8, conductor 871 in Figure 8, armature 821 and resting contact, winding of relay 850, armature 854 and X contact, armature 846, resistance 848 to negative battery. At armature 851, relay 850 completes an obvious circuit to incoming call restriction relay 810, causing relay 810 to operate and connect negative battery, through resistance 815, to the local station contacts in the test wiper banks of the trunk and local finders of all local stations restricted from answering incoming trunk calls directly. For example, armature 812 of relay 810 connects negative battery through resistance 815 to conductor 806 leading to contacts #12 of all testing wiper banks of the trunk and local finders, thereby marking station #05 in the local finder banks as being restricted from answering incoming trunk calls directly. Armatures 811, 813 and 814 of relay 810 do not connect negative battery to conductors leading to the test wiper banks of the finders and, consequently, the related local stations are not so restricted. Hence, station #08 is privileged to answer incoming trunk calls directly as its test conductor 105 is not connected to negative battery when relay 810 operates. It should be understood that while relay 810 is shown as having only four armatures, it is actually fitted with one armature for each station line equipped.

At armature 852, relay 850 completes the circuit to relay 350 by way of conductor 881 in cable 885 through Figure 6 to Figure 3, conductor 881 in Figure 3, winding of relay 350 to negative battery, causing relay 350 to operate and perform a function to be described later. The functions of armatures 853 and 855 will also be described later. At armature 856, relay 850 completes the circuit to relay 520 from ground, armature 856, conductor 878 in cable 886 to Figure 7, conductor 878 to Figure 5, conductor 878 in Figure 5, armature 569 and working contact, winding of relay 520 to negative battery. At armature 857, relay 850 connects ground by way of conductor 875 in cable 876 through Figure 6 to Figure 3, conductor 875 in Figure 3, contact #8 of wiper 353 bank, wiper 353, conductor 366, armature 286 and working contact, lower winding of relay 200, conductor 163, wiper 153 in engagement with contact #15 of its bank, multiple conductor 105 in cable #08 to contacts #15 of wiper 453, banks of all trunk finders, thus marking station #08 as calling in the trunk finder banks.

Relay 520, upon operating, extends a circuit from wiper 453, conductor 463, armature 513 and resting contact, armature 521, upper winding of relay 530, lower winding of relay 540 to negative battery; and, at armature 523, completes the circuit to trunk finder operating magnet 470 from ground, armatures 541, 539, 523, conductor 466, winding of magnet 470 to negative battery.

Magnet 470, upon energizing, positions its pawl preparatory to stepping the wipers of the trunk finder to find the answering station line and, at its armature 471, completes the circuit for energizing stepping relay 540 from ground by way of armature 471, conductor 472, upper winding of relay 540 to negative battery. Relay 540, upon operating, opens the previously traced circuit for magnet 470 at armature 541, whereupon magnet 470 restores to advance the wipers of the trunk finder into engagement with their next bank contacts. The restoration of magnet 470 also opens the circuit to relay 540 with the result that relay 540 now restores. The restoration of relay 540 again completes the circuit for magnet 470, and the operation of magnet 470 again completes the circuit to relay 540 at armature 471. The reoperation of relay 540 again opens the circuit to magnet 470, causing magnet 470 to restore and step the trunk finder wipers into engagement with their next bank contacts. In the same manner as just described, relay 540 and magnet 470 operates alternately until test wiper 453 encounters the ground potential connected to contact #15 of its bank.

As test wiper 453 encounters the ground potential on the contact #15 of its bank, the following circuit is completed for maintaining relay 540 energized and for energizing relays 530 and 200: from ground at armature 857, conductor 875 in cable 876 through Figure 6 to Figure 3, conductor 875 in Figure 3 to contact #8 of wiper 353 bank, wiper 353, conductor 366, armature 286, lower winding of relay 200, conductor 163, wiper 153, contact #15 of wiper 153 bank, multiple conductor 105 in cable #08 to contact #15 of wiper 453 bank, wiper 453, conductor 463, armature 513 and resting contact, armature 521, upper winding of relay 530, lower winding of relay 540 to negative battery. Relay 530, upon energizing, first closes its X contact at armature 536, thus locking itself to ground at armature 522. At armatures 533 and 534 respectively, relay 530 extends the negative and positive trunk conductors from bank contacts #15 of wipers 451 and 452 through the resting contacts of armatures 571 and 572, the left-hand windings of repeating coil 604, windings of relays 580 and 575 in series to negative battery and ground. The loop from station #08 over multiple conductors 101 and 102 is thus extended to relays 580 and 575 in series, causing relay 575 to operate. Relay 580 is differentially wound and, consequently, does not operate at this time. At armature 537, relay 530 connects ground to contact #15 of wiper 454 bank by way of conductor 464 and wiper 454 for the double purpose of maintaining the circuit to station #08 cut-off relay 120 and guarding station #08 against intrusion; and, at armature 538, opens the locking circuit to relay 565, causing relay 565 to restore.

Relay 565, upon restoring, opens the circuit to the multiple trunk signals at armature 567, and connects ground to conductor 549. If the 565' relays of the other trunks are all in the restored position, the ground on conductor 549 is extended to the winding of relay 820 by way of the resting contacts of armatures 567' and conductor 870, and relay 820 operates. The operation of relay 820 opens the circuit of relay 850 at armature 821, and relay 850 then restores and opens the circuit to incoming call restriction relay 810. At armature 569, relay 565 opens the circuit to relay 520, causing relay 520 to restore; and at armature 569 and resting contact, extends conductor 878 to armature 569' of trunk circuit #2 by way of conductor 573.

The restoration of relay 520 opens the circuit to the upper winding of relay 530 and the lower winding of relay 540 at armature 521, relay 540 restoring but relay 530 remaining in the operated position because of the locking circuit through its lower winding which may be traced as follows: ground on conductor 485 by way of armature 448 if an attendant's station is provided, or ground directly connected to conductor 485 if an attendant's station is not provided, conductor 485 in cable 490 to Figure 6, armature 662, conductor 685, armature 514 and armature 536.

Relay 575, upon operating when the trunk finder wipers extend station line #08 conductors 101 and 102 through to armatures 533 and 534, completes the circuit to relay 640 from ground, armature 577 and working contact, conductor 688, winding of relay 640 to negative battery. Relay 640 operates and, at armature 642, removes relay 670 from in bridge with trunk conductors 601 and 602. At armature 643, relay 640 completes a multiple circuit to relay 660. At armature 576, relay 575 completes the loop circuit to the distant exchange through series relay 625 for cutting off the ringing current from the incoming trunk call and for giving answering supervision to the distant exchange. The cessation of ringing current causes relays 635 and 655 to return to, or remain in, the normal position, dependent upon whether the ringing is cut off in a ringing period or a silent period. Relay 670, upon restoring, removes ground from relay 630, but relay 630 does not restore at this time because of its slow-to-release action. Series relay 625, upon operating when the ringing cut-off circuit is closed at armature 576, completes the locking circuit of relay 630 from ground by way of armature 631 and working contact, armatures 626 and 641. The slow-to-release action of relay 630 prevents its possible release should its circuit be opened at armature 671 before the locking circuit is completed at armature 626.

Returning now to the finder-connector link at the point in the operation where the circuit of relay 200 was completed by trunk wiper 453 making contact with terminal #15 of its bank, relay 200, upon operating, locks itself to ground by way of armature 214 and working contact and armature 204. At armatures 201 and 202, relay 200 opens station #08 loop to line relay 225, causing relay 225 to restore; and, at armature 205, opens the locking circuit to relay 280, causing relay 280 to restore. Line relay 225, upon restoring, opens the circuit of relay 230 at armature 227, which relay restores after a short interval. Relay 230, upon restoring, opens the locking circuit of relay 210 at armature 232, the working contact of armature 232 also disconnecting ground from local finder wiper 154. Relay 210, upon restoring, further opens the finder-connector talking circuit at armatures 211 and 212; and, at armature 213 in the normal position, removes the ground shunt from relay 290. At armature 213 and resting contact, relay 210 completes the self-restoring circuit of the connector from ground by way of contact #8 of wiper 355 bank, wiper 355, conductor 369, armature 213 and resting contact, conductor 363, armature 376 and resting contact, conductor 364, armature 285, conductor 365, winding of magnet 375 to negative battery. At armature 214 in the normal position, relay 210 opens the locking circuit of relay 200, causing relay 200 to restore.

The completion of the connector self-restoring circuit at armature 213 and resting contact causes connector magnet 375 to advance wipers 351 to 355 inclusive to the home position as previously described in the preceding section titled "Local calls." The local finder-connector link is now free of station #08, and negative battery is connected to the winding of relay 290 by way of the upper winding of relay 235, resistance 238, conductor 370, home contact of wiper 355 bank, wiper 355, conductor 369 and busy switch 294 for switching the finder-connector link back into the local link allotting chain for use in other local calls.

Station line #08 is connected to the incoming trunk by way of the trunk finder switch, and relays 530, 575, 625, 630, 640 and 660 in the trunk circuit are operated at this time. The talking circuit from station #08 to the distant exchange is now complete by way of conductors 101 and 102 to the trunk finder banks, wipers 451 and 452, conductors 461 and 462, armatures 533 and 534 and working contacts, armatures 571 and 572 and resting contacts, conductors 675 and 678, left-hand windings of repeating coil 604 and condenser 603 in series, inductively to the right-hand windings of repeating coil 604 in series, conductor 674, armature 576 and working contact, conductor 673, armatures 612 and 616 and resting contacts, condenser 627, and conductors 601 and 602. Transmission battery is supplied to station #08 through the windings of relays 575, 580 and the left-hand windings of repeating coil 604.

The release of the connection between station #08 and the distant exchange is controlled from the distant exchange. The answering person at station #08 may return his handset to the cradle before the trunk circuit is disconnected at the distant exchange, in which event relay 575 restores. As a consequence, the loop circuit to the distant exchange is opened at armature 576, giving disconnect supervision to the distant exchange and causing relay 625 to restore. At armature 577, relay 575 opens the circuit to relay 640, but relay 640 is slow to release and, therefore, a circuit to relay 650 is completed temporarily from ground, armature 577 and resting contact, conductor 689, armature 645, winding of relay 650 to negative battery. Relay 650 is also of the slow-to-release type and, therefore, maintains its armatures in the operated position for a short period. Relay 625, upon restoring, opens the locking circuit to relay 630 at armature 626, but relay 630 is maintained in the operated position by the temporary circuit from ground, armature 631 and armature 651.

Relay 640 restores after a short period and, at armature 642, re-connects relay 670 across the trunk circuit, causing relay 670 to re-operate: at armature 643, opens a multiple circuit to relay 660 but relay 660 is maintained in the operated position at armature 633 and working contact; and, at armature 645, opens the circuit to relay 650. The re-operation of relay 670 establishes a multiple circuit to relay 630 at armature 671 before the temporary holding circuit to relay 630 is opened at armature 651. The slow-to-release action of relay 630 prevents possible release of relay 630 during the shifting of its holding circuits. Opening the trunk circuit at the distant exchange causes the release of relay 670. The holding circuit to relay 630 is thus opened at armature 671, and relay 630 restores after a short period. Relay 630, upon restoring, opens a point in its locking circuit at armature 631: opens a point in the talking circuit at armature 632; and, at armature 633, opens the circuit of relay 660, causing relay 660 to restore after a short interval. Relay 660, upon restoring, opens the locking circuit of relay 530 at armature 662; and, at armature 664, connects relay 560 to conductor 547 by way of conductor 693, armature 664, right-hand contact of busy switch 628, conductor 683 and the resting contact of armature 562 for switching trunk circuit #1 back into the outgoing trunk call allotting chain. Relay 530, upon restoring, removes ground from trunk finder wiper 454 at armature 537, thus opening the circuit of station #08 cut-off-relay 120 and causing relay 120 to restore. Trunk circuit #1 is now at normal, available for being allotted for use in an outgoing trunk call or for receiving an incoming trunk call from the distant exchange.

Should the person at station #08 have returned his handset to the cradle prematurely, and it is not desired to break the connection at the distant exchange, he may be re-signalled from the distant exchange by the application of ringing current to the trunk circuit. Ringing relay 635 responds to the application of ringing current and causes relay 655 to operate over an obvious circuit. Relay 655, upon operating, completes the circuit of relay 570 from ground by way of armature 535, conductor 681, armatures 617, 657, conductor 682, winding of relay 570 to negative battery. Relay 570, therefore, operates in synchronism with the ringing periods from the distant exchange, and correspondingly applies ringing current to conductors 461 and 462 leading to wipers 451 and 452 in engagement with contacts #15 of their banks, and thence by way of multiple conductors 101 and 102 to station #08 line circuit. Station #08 is thus re-signalled. On a ring-back of this nature, the multiple trunk signals are not re-operated because the circuit is open at armature 567 in the normal position.

Assuming now that the person at station #08 does not restore his handset prematurely, then relay 575 is still operated when the trunk circuit is disconnected at the distant exchange, and relay 640 also remains in the operated position. Other trunk relays operated at this time are 530, 625, 630 and 660. Relay 640, at armature 642, retains the circuit of relay 670 open and, therefore, relay 670 cannot supply ground to the winding of relay 630. Opening the trunk circuit at the distant exchange causes the release of series relay 625 which, in turn, opens the locking circuit of relay 630 at armature 626, and since relay 630 cannot be maintained in the operated position by relay 670, relay 630 restores after a short interval.

Relay 630, upon restoring, opens a point in its locking circuit at armature 631: opens a point in the talking circuit at armature 632; and, at armature 633, opens a multiple circuit to relay 660 but relay 660 is maintained at armature 643. The person at station #08 knowing that the conversation has been terminated, returns his handset to the telephone cradle, this action causing switch SW to open the loop circuit to relay 575. At armature 577 in the normal position, relay 575 opens the circuit to relay 640 and, after a short interval, relay 640 restores. In the meantime, the circuit to relay 650 is completed from ground, armature 577 and resting contact, conductor 689, armature 645 and working contact, winding of relay 650 to negative battery. Relay 650 restores shortly after its circuit is opened at armature 645, having performed no important functions at this time. At armature 642, relay re-connects relay 670 in bridge with trunk conductors 601 and 602; and, at armature 643, opens a multiple circuit to relay 660. The circuit to relay 660 is now open at the contacts of armatures 633, 643, and 654 and, after a short interval, relay 660 restores. At armature 662, relay 660 opens the locking circuit to relay 530, causing relay 530 to restore; and, at armature 664, connects relay 560 to conductor 547 by way of conductor 693, armature 664, right-hand contact of busy switch 628, conductor 683 and resting contact of armature 562 for switching trunk circuit #1 back into the outgoing trunk call allotting chain. Relay 530, upon restoring, removes ground from trunk finder wiper 454 at armature 537, thus opening the circuit of station #08 cut-off relay 120. Trunk circuit #1 is now at normal.

Considering now the case where a station restricted from answering an incoming call directly as, for example, station #05, attempts to answer an incoming call directly by dialling the trunk answering number digit 8, chain relay 850 and incoming trunk call restriction relay 810 both operate as heretofore described. At armature 812, relay 810 connects negative battery through resistance 815 to conductor 806 leading through Figures 7 and 5 to Figure 4, conductor 806 in Figure 4 to contacts #12 of all 453 wiper banks, and by multiple conductor 806 to the contacts #12 of all 153 wiper banks of the local finder-connector links. Contacts #12 of the 153 and 453 banks identify station #05. Now as the connector wiper 353 engages its banks contact #8 responsive to the person at station #5 dialling the trunk answering number digit 8, the circuit of relay 200 in the local finder-connector link is completed from ground by way of armature 857, conductor 875 in cable 876 through Figure 6 to Figure 3, conductor 875 in Figure 3, contact #8 of wiper 353 bank, wiper 353, conductor 366, armature 286 and working contact, lower winding of relay 200, conductor 163, wiper 153 in engagement with contact #12 of its bank, multiple conductor 806 through Figures 4, 5 and 7 to Figure 8, conductor 806 in Figure 8, armature 812 and working contact, resistance 815 to negative battery. Relay 200 operates and locks to ground by way of armature 214 and working contact and armature 204. From this point on the local finder-connector link is released in the same manner as that previously described in the instance where station #08 had answered an incoming trunk call and then had been picked up by the trunk finder. In the case of station #05 however, after the local finder-connector link is automatically released, the line relay of station #05 will then operate and connect ground to start conductor 174, thus causing a local finder to pick up station #05 line circuit and return dial tone to station #05 telephone as an indication that station #05 cannot directly complete a connection to an incoming trunk call.

Considering now the case where a person at any station dials the trunk answering number digit 8 at a time when there is no incoming trunk call to answer, then the chain circuit to relay 820 cannot be opened at armature 567 because relay 565 remains in the normal position. Relay 565 operates only when relays 655 and 660 in the trunk circuit are operated by an incoming trunk call as previously described. Relay 820 in the operated position connects ground by way of armature 821 and working contact, conductor 871 in cable 876 through Figure 6 to Figure 3, conductor 871 in Figure 3 to contact #8 of wiper 354 bank. Now when the connector wiper 354 engages its bank contact #8 responsive to the dialling of the digit 8, the ground on conductor 871 causes the busy relay 250 in the local finder-connector link to operate and return busy tone to the calling station in the same manner as when a busy local station is encountered on a local station to local station call.

Each distant-exchange trunk circuit is provided with a busy switch, such as 628, which enables the maintenance man to make the corresponding trunk circuit busy to outgoing trunk calls from the local stations and to prevent the operation of the multiple incoming trunk signals. Operating busy switch 628 causes its right-hand contact to open the circuit to relay 560, and causes its left-hand contact to open a point in the circuit to relay 565. Relay 560, which is normally operated, restores and switches conductor 877 to the 563′ armature of the next trunk circuit, thus making this trunk circuit busy to outgoing trunk calls. Relay 565, which is normally de-energized, cannot now operate and, consequently, the circuit to the multiple incoming trunk signals remains open at armature 567. The trunk circuit remains in this busied condition until busy switch 628 is returned to the normal, or closed-contact, position.

*Outgoing trunk calls*

Any local station not restricted from making outgoing trunk calls may originate an outgoing trunk call by lifting his handset from the telephone and, upon receipt of dial tone, dialling the trunk calling number digit 9. Responsive to the dialling of the digit 9, and in the manner described in detail in the section titled "Local calls," the connector wipers of the local finder-connector link are stepped into engagement with the ninth contacts of their banks.

As explained in detail in the preceding section titled "Incoming trunk calls," a non-busy trunk circuit is pre-allotted for use in an outgoing trunk call. Should the trunk circuit #1 shown in Figures 5 and 6 be the trunk circuit pre-allotted for outgoing trunk use, then the trunk finder of trunk circuit #1 is automatically caused to pick up the calling station line circuit when the connector wipers of the local finder-connector link arrive at contacts #9 of their banks, and the local finder-connector link is then released automatically. The manner in which the trunk finder is caused to pick up the calling station line circuit and the subsequent releasing of the local finder-connector link is also described in detail in the preceding section for an incoming trunk call, with the minor difference that in this instance relays 840 and 806 are operated in place of relays 850 and 810.

Assuming now that a person at station #08 has originated an outgoing trunk call by dialling the digit 9, and that trunk circuit #1 is available for use on this outgoing call, the trunk finder of trunk circuit #1 picks up station #08 line circuit and the local finder-connector link used by station #08 releases, in the manner previously described. When the local finder-connector link has released, relays 530, 575, 640 and 660 in the trunk circuit remain operated. Relay 640, in the operated position, removes relay 670 from in bridge with trunk conductors 601 and 602 at armature 642; and, at armature 645, prepares a point in the circuit to relay 650. Relay 660, in the operated position, opens the circuit to relay 560 at armature 664, causing relay 560 to restore and switch conductor 877 to the 563′ armature of the next free trunk circuit so that a subsequent outgoing trunk call will be routed to the next free trunk circuit.

The trunk line relay at the distant exchange is operated from ground by way of armature 632 and resting contact, winding of relay 625, armature 616 and resting contact, right-hand windings of repeating coil 604, conductor 674, armature 576 in the operated position, conductor 673, armature 612 and resting contact and conductor 601 to the line relay at the distant exchange, this circuit also causing series relay 625 to operate. The trunk line relay at the distant exchange functions in a conventional manner, dependent upon the type of distant exchange, and ground is then returned from the distant exchange over conductor 602 to operate relay 630 by way of armature 631 and resting contact, armatures 626, 641, winding of relay 630 to negative battery. Relay 630 locks to ground at armature 631 and working contact.

At armature 632 and working contact, relay 630 extends trunk conductor 602 to the winding of series relay 625, thereby shifting relay 625 to the loop supervisory circuit from the distant exchange. Armature 632 is fitted with contacts of the make-before-break type to insure continuity of circuit for relay 625. At armature 633, relay 630 completes a multiple circuit to relay 660.

Should the distant exchange be of the automatic type, dial tone is now returned from the distant exchange to station #08 telephone over the completed talking circuit between station #08 and the distant exchange. In response to the calling person at station #08 operating his dial, line relay 575 correspondingly opens and closes the loop circuit to the distant exchange at armature 576, and the automatic switches in the distant exchange are operated in the well known manner to complete the desired connection. The intermittent operation of relay 575, responsive to the dialling, opens and closes the circuit to relay 640 an equal number of times, but the slow-to-release action of relay 640 prevents its release during impulsing. With the first de-energization of relay 575, the circuit to relay 650 is completed from ground, armature 577 and resting contact, conductor 689, armature 645, winding of relay 650 to negative battery.

Relay 650 is also of the slow-to-release type and, therefore, remains operated during each series of impulses when its circuit is intermittently opened at armature 577. Relay 650, in the operated position, maintains a multiple circuit to relay 630 from ground, armature 631 and working contact, armature 651, winding of relay 630 to negative battery, thus preventing relay 630 from releasing when the original locking circuit of relay 630 is intermittently opened at armature 626 by series relay 625 responsive to the dialling. At armature 652, relay 650 removes ringing relay 635 from in bridge with trunk conductors 601 and 602; and, at armature 653, short-circuits the lower right-hand winding of repeating coil 604. The removal of relay 635 from in bridge with trunk conductors 601 and 602, and the shunting of a portion of repeating coil 604 improves the dialling conditions. As each series of impulses cease, relay 575 remains in the operated position, thus opening the circuit to relay 650. When the final series of impulses has been completed, relay 650 is restored to the normal position for the period of conversation. Relay 650, upon restoring, removes the shunt from repeating coil 604 at armature 653, and, at armature 652, re-connects relay 635 across the trunk, thereby restoring the original transmission circuit condition between station #08 and the distant exchange. Transmission battery is supplied to station #08 through relays 575 and 580 in series, and during conversation, relays 530, 575, 625, 630, 640 and 660 of the trunk circuit are in the operated position.

After conversation, and responsive to the person at station #08 returning his handset to the telephone cradle, the local loop to relay 575 is opened at the upper contact of switch SW (Figure 1), and relay 575 restores. At armature 576, relay 575 opens the loop circuit extending to the distant exchange, and the automatic switches in the distant exchange are released in the well known manner. Relay 625 also restores when the trunk loop is opened at armature 576, opening the locking circuit to relay 630 at armature 626 and causing relay 630 to restore after a short interval. At armature 577 in the normal position, relay 575 opens the circuit to relay 640, causing relay 640 to restore after a short interval. At armature 577 and resting contact, relay 575 completes a temporary circuit for relay 650 by way of armature 645 before relay 640 restores. Relay 650, therefore, maintains its armatures in the operated position for a short period but performs no important functions at this time.

Relay 630, upon restoring, opens a point in its locking circuit at armature 631: opens a point in the circuit to relay 625 at armature 632; and, at armature 633, opens a multiple circuit to relay 660. Relay 640, upon restoring, re-connects relay 670 in bridge with trunk conductors 601 and 602 at armature 642; and opens a multiple circuit to relay 660 at armature 643, thereby causing relay 660 to restore after a short interval because there is now no other multiple circuit to relay 660. Relay 660, upon restoring, opens at armature 661 the circuit to the trunk busy lamp 436 at the attendant's station, should an attendant's station be provided: at armature 662, opens the locking circuit to relay 530, causing relay 530 to restore; and, at armature 664, connects relay 560 to conductor 547 by way of conductor 693, armature 664, right-hand contact of busy switch 628, conductor 683 and the resting contact of armature 562 for switching this trunk circuit back into the outgoing trunk call allotting chain. Relay 530, upon restoring, removes ground from trunk finder wiper 454 at armature 537, thus opening the circuit of station #08 cut-off relay. Trunk circuit #1 is now at normal, available for being allotted for use in an outgoing trunk call or for receiving an incoming call from the distant exchange.

Considering now the case where the distant exchange is of the manual type, the trunk line relay at the distant exchange is operated from ground by way of armature 632 and resting contact, winding of relay 625, armature 616 and resting contact, right-hand windings of repeating coil 604, conductor 674, armature 576 in the operated position, conductor 673, armature 612 and resting contact and conductor 601 to the line relay at the distant exchange, this circuit also causing series relay 625 to operate. The operation of the line relay at the distant exchange signals the operator thereat in the well known manner. When the operator answers the call, ground is connected to conductor 602, thereby completing the circuit to relay 630 by way of armature 631 and resting contact, armatures 626, 641, winding of relay 630 to negative battery. Relay 630 locks to ground at armature 631 and working contact.

At armature 632 and working contact, relay 630 extends trunk conductor 602 to the winding of series relay 625, thereby shifting relay 625 to the loop supervisory circuit from the distant exchange. Armature 632 is fitted with contacts of the make-before-break type to insure continuity of circuit for relay 625. At armature 633, relay 630 completes a multiple circuit to relay 660. The calling person at station #08 is now connected to the distant exchange over the completed talking circuit, and informs the operator of the connection desired. The operator then extends the connection to the desired station in the well known manner. During conversation, relays 530, 575, 625, 630, 640 and 660 of the trunk circuit are in the operated position.

After conversation, and in response to the person at station #08 returning his handset to the telephone cradle, the local loop to relay 575 is opened at the upper contact of switch SW (Figure 1), and relay 575 restores. At armature 576, relay 575 opens the loop circuit extending to the distant exchange, thereby giving the distant-exchange operator disconnect supervision in the well known manner. Relay 625 also restores when the trunk loop is opened at armature 576. At armature 577 in the normal position, relay 575 opens the circuit to relay 640, causing relay 640 to restore after a short interval. At armature 577 and resting contact, relay 575 completes a temporary circuit for relay 650 by way of armature 645 before relay 640 restores. Relay 650 is of the slow-to-release type and, therefore, maintains its armatures in the operated position for a short period. Relay 625, upon restoring, opens the locking circuit to relay 630 at armature 626, but relay 630 is maintained in the operated position by the temporary circuit from positive battery, armature 631 and armature 651.

Relay 640 upon restoring, re-connects relay 670 across the trunk circuit at armature 642, causing relay 670 to re-operate: at armature 643, opens a multiple circuit to relay 660 but relay 660 is maintained in the operated position at armature 633 and working contact; and, at armature 645, opens the circuit to relay 650. The re-operation of relay 670 establishes a multiple circuit to relay 630 at armature 671 before the temporary holding circuit to relay 630 is opened at armature 651. When the distant exchange operator takes down the trunk connection, the trunk circuit loop is opened and relay 670 restores. The holding circuit to relay 630 is thus opened at armature 671, and relay 630 restores after a short period.

Relay 630, upon restoring, opens a point in its locking circuit at armatures 631: opens a point in the circuit to relay 625 at armature 632; and, at armature 633, opens its multiple circuit to relay 660, thereby causing relay 660 to restore after a short interval. At armature 661, relay 660 opens the circuit to the trunk busy lamp 436 at the attendant's station, should an attendant's station be provided: at armature 662, opens the locking circuit to relay 530, causing relay 530 to restore; and, at armature 664, connects relay 560 to conductor 547 by way of conductor 693, armature 664, right-hand contact of busy switch 628, conductor 683 and the resting contact of armature 562 for switching this trunk circuit back into the outgoing trunk call allotting chain. Relay 530, upon restoring, removes ground from trunk finder wiper 454 at armature 537, thus opening the circuit of station #08 cut-off relay. Trunk circuit #1 is now at normal, available for being allotted for use in an outgoing trunk call or for receiving an incoming call from the distant exchange.

As in the case of an incoming trunk call from a manual distant exchange, should the person at station #08 return his handset to the cradle prematurely on an outgoing call to a manual exchange, the operator at the distant exchange may re-signal station #08 because the circuit of station #08 cut-off relay is not opened until the operator breaks the trunk connection at the distant exchange.

Assuming now that all of the trunk circuits are in use, then there will be no ground on common conductor 882 to relay 830 because relay 660 in each trunk circuit is operated. Relay 830, therefore has restored and connected ground to contacts #9 of all connector wiper 354 banks by way of armature 833 and resting contact, conductor 873 in cable 876 through Figure 6 to conductor 873 in Figure 3 and conductor 873 in Figure 3. Should an outgoing trunk call be attempted under this condition, then busy relay 250 of the calling local finder-connector link will be operated from ground on contact #9 of wiper 354 bank, wiper 354, conductor 367, armature 272 and working contact, upper winding of relay 250 to negative battery, and busy tone will be returned to the calling person in the manner previously described.

Considering now the case where all but one trunk circuit are in use, and assuming that an outgoing trunk call is attempted just prior to the last free trunk circuit being seized for use in an incoming trunk call, then relay 830 is still in the operated position and guarding ground is not connected to the contacts #9 of the connector wiper 354 banks at armature 833. Consequently, relay 280 in the calling local finder-connector link will operate and switch armatures 246 and 248 through to contacts #9 of connector wiper 351 and wiper 352 banks. Approximately at this point, the trunk circuit is seized for the incoming trunk call, and relay 830 restores because the last multiple ground is removed from its circuit at the now open resting contact of armature 661. Ground by way of resistance 834, armature 832, conductor 872 in cable 876 through Figure 6 to Figure 3, conductor 872 in Figure 3 to contact #9 of wiper 351 bank, wiper 351, conductor 361, armature 282, armature 246 and resting contact is connected to the upper winding of ringing cut-off relay 245, causing cut-off relay 245 to operate and lock and disconnect the ringing current. Busy tone is then returned to the calling person by way of condenser 835, armature 831, conductor 872 in cable 876 through Figure 6 to Figure 3, conductors 872 in Figure 3 to contact #9 of wiper 351 bank, wiper 351, conductor 361, armature 282, armature 246 and working contact to condenser 222. The restoration of relay 560 in the trunk circuit, as a result of the incoming trunk call seizing the trunk circuit, switches conductor 877 from this trunk circuit at armature 563, and the incoming trunk call is completed in the manner described in detail in the preceding section titled "Incoming trunk calls."

*Holding trunk calls*

In order to describe how local stations equipped with a push button, such as 124, may hold a trunk call while making a local call, it will be assumed that station #08 has answered an incoming trunk call in the manner described in detail in the section titled "Incoming trunk calls." The person at station #08 then advises the distant-exchange person on the trunk circuit to wait on the line for a few moments while he makes a local call. He now depresses push button 124 momentarily, which action connects ground to line conductors 101 and 102, thereby shunting the lower winding of differential relay 580 in the trunk circuit. This shunt circuit may be traced from ground through push button 124, lower contact of switch SW, receiver R, lower winding of induction coil, multiple line conductor 102 to the fifteenth contact of trunk wiper 452 bank, wiper 452, conductor 462, armature 534 and working contact, armature 572 and resting contact, conductor 678, lower left-hand winding of repeating coil 604, conductor 677 to lower winding of relay 580. Relay 580, therefore, operates over the circuit through its upper winding extending from ground through push button 124, lower contact of switch SW, receiver R, transmitter T, impulse springs of dial, upper contact of switch SW, multiple line conductor 101 to contact #15 of trunk wiper 451 bank, wiper 451, conductor 461, armature 533 and working contact, armature 571 and resting contact, conductor 675, upper left-hand winding of repeating coil 604, conductor 676, upper winding of relay 580, upper winding of relay 575 to negative battery. Relay 575 was operated previously through both its windings and now remains operated through its upper winding.

Relay 580, upon operating, closes a circuit to relay 605 from ground, armature 581, conductor 686, armature 609 and resting contact, lower winding of relay 605 to negative battery. Relay 580 also closes a multiple circuit to relay 610 from ground, armature 581, conductor 686, armature 618 and resting contact, lower winding of relay 610 to negative battery, and by way of conductor 686, armature 609 and resting contact, upper winding of relay 610 to negative battery. Both relays 605 and 610 are differentially wound relays and, therefore, do not operate or, if operated, restore to normal when both windings are energized. Hence, under the circuit conditions just described, relay 605 operates and relay 610 remains in the normal position.

Relay 605, upon operating locks to ground by way of armature 644 and working contact, 609 and working contact, lower winding of relay 605 to negative battery. Armature 609 is fitted with contacts of the make-before-break type to provide continuity for the circuit to the lower winding of relay 610. When the person at station #08 releases push button 124, the ground shunt to the lower winding of relay 580 is removed and relay 580 restores because the current flow through its lower winding now equals the current flow through the upper winding. The restoration of relay 580 opens the circuit to the lower winding of relay 610, causing relay 610 to operate over the previously traced circuit through its upper winding. At armature 615 and X contact, relay 610 completes a holding bridge including resistance 619 across trunk conductors 691 and 692 extending to the distant exchange: at armature 614, connects marking negative battery through the winding of relay 620, armature 614, conductor 143 in cable 146 through Figures 5 and 4 to Figure 1, and conductor 143 in Figure 1 to contacts #21 of the local finder banks associated with the 154 wipers: connects ground by way of armature 608, armatures 613, 621 to the local finder start conductor 174 to cause an idle finder-connector link to search for marking potential on the #21 contacts (trunk #1) of the local finder banks; and, at armatures 612, 616 and respective working contacts, connects the right-hand windings of repeating coil 604 to the twenty-first contacts of the local finder banks associated with the 151 and 152 wipers.

Assuming now that local finder-connector link #1 is allotted to find trunk circuit #1, the finder magnet 170 is caused to step finder wipers 151 to 155 inclusive to contacts #21 of their respective banks, in the manner previously described. As test wiper 154 engages its bank contact #21, relay 620 operates in series with relays 210 and 220 over the following circuit: ground, armature 232, upper windings of relays 220 and 210 in series, armature 207, conductor 164, wiper 154 in engagement with contact #21 of its bank, conductor 143 in cable 146 through Figure 4 and 5 to Figure 6, conductor 143 in Figure 6, armature 614, winding of relay 620 to negative battery. Relay 620 locks to ground by way of conductor 143 and armatures 622 and, at armatures 621, removes ground from local finder start conductor 174. The operation of relay 210 causes the local finder wipers to remain in engagement with contacts #21 of their banks.

Dial tone is returned to station #08 from finder-connector link #1 by way of armatures 236, 283, 252 and resting contact, condenser 257, condenser 222, armatures 211, 201, conductor 161, wiper 151 in engagement with contact #21 of its bank, conductor 141 in cable 146 through Figures 4 and 5 to Figure 6, conductor 141 in Figure 6, armature 612 and working contact, conductor 673, armature 576, conductor 674, right-hand windings of repeating coil 604, inductively to the left-hand windings of repeating coil 604, conductor 675, armature 571 and resting contact, armature 533, conductor 461, wiper 451 in engagement with contact #15 of its bank, conductor 101 in Figure 1 and conductor 101 in Figure 1 to station #08 telephone. The person at station #08 then dials the number of the desired local station. Relay 575 follows the impulsing from station #08 dial and, at armature 576, repeats the impulsing to line relay 225 in the finder-connector link. When the called local station answers, a transmission circuit is completed from station #6 line conductors 301 and 302, contacts #6 of the banks associated with connector wipers 351 and 352, wipers 351 and 352, conductors 361 and 362, armatures 282, 284 and associated working contacts, armatures 246, 248 and associated working contacts, condensers 222 and 223, armatures 211 and 212, armatures 201 and 202, conductors 161 and 162, wipers 151 and 152 in engagement with contacts #21 their banks, conductors 141 and 142 in cable 146 through Figures 4 and 5 to Figure 6, conductors 141 and 142 in Figure 6, armatures 612, 616 and associated working contacts, conductor 673, armature 576, conductor 674, and right-hand windings of repeating coil 604, inductively to the left-hand windings of repeating coil 604, and back over the trunk conductors 461 and 462, through wipers 451 and 452 in engagement with contacts #15 of their banks and conductors 101 and 102 to station #08 line circuit.

When the person at station #08 has obtained the desired information from station #6, he may return to held trunk connection by again depressing push button 124 momentarily. The depressing of push button 124 unbalances differential relay 580 in the manner previously described, causing relay 580 to re-operate. The operation of relay 580 at this time completes a circuit to the upper winding of relay 605 from ground, armature 581, conductor 686, armature 618 and working contact, upper winding of relay 605 to negative battery. Relay 605 now restores because its windings oppose each other. At armature 608, relay 605 opens another point in the circuit to the local finder start conductor 174; and, at armature 609 and resting contact, transfers the energized upper winding of relay 610 to ground supplied through armature 581.

When the person at station #08 releases push button 124, the ground shunt to the lower winding of relay 580 is removed and relay 580 restores because its two windings now oppose each other. Relay 580 opens the circuit to the upper winding of relay 610 at armature 581, causing relay 610 to restore. The restoration of relay 610 removes holding bridge 619 from the trunk conductors extending to the distant exchange at armature 615; and, at armatures 612 and 616, disconnects line relay 225 of local finder-connector link #1 from trunk circuit #1. The original transmission circuit between station #08 and the distant exchange over trunk circuit #1 is now reestablished, and the person at station #08 may converse with the distant-exchange person. The disconnection of line relay 225 from trunk circuit #1 causes the release of local finder-connector link #1 in the same manner as described in the section titled "Local calls." The release of the local finder-connector link #1 unlocks relay 620 in the trunk circuit.

*Transferring trunk calls*

A trunk call may be transferred from one local station to another local station equipped with a push button, and may be transferred from the second station to a third local station, and so on as many times as may be required.

Assuming now that a person at station #08 has answered and held an incoming trunk call in the manner described in detail in the preceding section titled "Holding trunk calls," and assuming further that the person at station #08 then dials station #6 for the purpose of transferring the held trunk connection to station #6, when station #6 answers the call the person at station #08 then instructs the person at station #6 to depress his push button 324 to accept the trunk call. At this time, differential relays 605 and 610 are both in the operated position, and relay 620 is locked in the operated position. Depressing push button 324 momentarily, connects ground to line conductors 301 and 302, thereby shunting the lower winding of differential relay 240 in the local finder-connector link. This shunt circuit may be traced from ground through push button 324, lower contact of switch SW (Figure 3), receiver R, lower winding of induction coil, line conductor 302 to contact #6 of wiper 352 bank, wiper 352, conductor 362, armature 284, armature 248 and working contact to lower winding of relay 240. Relay 240, therefore, operates over the circuit through its upper winding extending from ground through push button 324, lower contact of switch SW, receiver R, transmitter T, impulse springs of dial, upper contact of switch SW, line conductor 301, contact #6 of connector wiper 351 bank, wiper 351, conductor 361, armature 282 and working contact, upper contact, armature 246 and working contact, upper winding of relay 240, upper winding of relay 235 to negative battery. Relay 235 was operated previously through both its windings and now remains operated through its upper winding.

Relay 240, upon operating, completes a multiple circuit to relay 500 in the trunk circuit from ground, armature 241 and working contact, armature 218, conductor 165, wiper 155 in engagement with contact #21 of its bank, conductor 144 in cable 146 through Figures 4 and 5 to Figure 6, conductor 144 in Figure 6, armature 606, conductor 482 in cable 490 through Figure 5 to Figure 4, conductor 482 in Figure 4, armature 445 and resting contact should an attendant's station be provided, otherwise from conductor 482 in Figure 4 direct to conductor 483, conductor 483 in cable 490 to Figure 5, conductor 483 in Figure 5, armature 501, upper winding of relay 500 to negative battery, and by way of armature 501, lower winding of relay 500, armature 505, resistance 507 to negative battery. Relay 500 does not operate under this circuit condition as it is differentially wound. When the person at station #6 releases push button 324, the ground shunt to the lower winding of relay 240 is removed and relay 240 restores. The restoration of relay 240 removes ground from the previously traced circuit to armature 501, thus opening the multiple circuit to the windings of relay 500. When the ground connection is removed from the windings of relay 500, a momentary induced current flow is established in the local circuit of relay 500 which includes both windings of relay 500 and resistance 507 in series, with the result that sufficient flux is developed in the core of relay 500 to cause armature 506 and "X" contact to close. A circuit for operating relay 500 fully is thus completed from ground, resting contact of armature 512, conductor 680, armature 623, conductor 679, armature 506, both windings of relay 500 in series to negative battery.

Relay 500, upon fully operating, connects a holding bridge including resistance 508 across the left-hand windings of repeating coil 604 at armature 504 for maintaining relay 575 operated until the transfer to station #6 is completed. Relay 500 also completes the circuit to chain relay 860 from ground by way of armature 502, conductor 879 to Figure 7, conductor 879 in cable 886 through Figure 7 to Figure 8, conductor 879 in Figure 8, winding of relay 860, armature 862, conductor 883 in cable 885 through Figure 6 to Figure 3, conductor 883 in Figure 3, armatures 349, 344, 334, conductor 884 in cable 885 through Figure 6 to Figure 8, conductor 884 in Figure 8, armatures 864, 855, 846, resistance 848 to negative battery. Relay 860 locks to ground on conductor 879, winding of relay 860, armatures 863, 855, 846, resistance 848 to negative battery. Relay 860 completes the circuit to relay 550 from ground, armature 865, conductor 880 in cable 886 to Figure 7, conductor 880 in Figure 7 to Figure 5, armature 503, winding of relay 550, armature 555, conductor 542, armature 741, armature 552′ of last trunk in transfer chain, armatures 552′ of the intermediate trunks in chain, conductor 544, armature 552, resistance 557 to negative battery, causing relay 550 to operate.

Relay 550 locks to ground by way of conductor 880, armature 503, winding of relay 550, armature 553, resistance 557 to negative battery. At armature 554, relay 550 conects tick tone to the negative conductor of the trunk circuit by way of armature 511 to inform the persons at both stations #08 and #6 that the trunk connection is being transferred to station #6. At armature 551, relay 550 completes an obvious circuit to relay 740 of the transfer control circuit, causing relay 740 to operate. At armature 742, relay 740 completes two circuits as follows: the circuit to timer relay 700 from ground, armatures 742, 734, winding of relay 700 to negative battery, causing relay 700 to operate; and the circuit to relay 710 from ground, armatures 742,733, winding of relay 710 to negative battery, causing relay 710 to operate after a short interval and lock to ground by way of armatures 742, 701 and lower working contact and 712. At armature 711, relay 710 completes the circuit to relay 720 from ground, armatures 742, 711 and working contact, winding of relay 720 to negative battery, causing relay 720 to operate after a short interval.

At armature 723, relay 720 completes the circuit to relay 730 from ground, armatures 742, 723, winding of relay 730 to negative battery, causing relay 730 to operate after a short interval and lock to ground by way of armatures 742 and 735. At armature 733, relay 730 removes ground from the winding of relay 710 but relay 710 remains operated from ground supplied through armature 701 and lower working contact and armature 712. At armature 734, relay 730 opens the circuit to relay 700, causing relay 700 to restore and start weighted armature 701 vibrating between its upper and lower working contacts. Weighted armature 701 vibrates for a predetermined interval to hold relay 710 operated through armature 701 and lower working contact, and relay 720 operated through armature 701 and upper working contact and armature 722, the time interval being sufficient to permit the trunk finder switch to transfer the trunk connection from station #08 to station #6.

As armature 701 comes to rest, the circuit to relay 710 is opened at the lower working contact of armature 701, and relay 710 restores after a short interval. Relay 710 restoring, opens the holding circuit of relay 720 at the working contact of armature 711 but relay 720 is slow acting in restoring. In the meantime relay 510 has operated from ground, armatures 742, 711 and resting contact, 732, conductor 545, armature 556, winding of relay 510 to negative battery. At armature 512 and working contact, relay 510 transfers the holding circuit of relay 500 to ground by way of armatures 721, 731 and working contact, conductor 509, armature 512 and working contact, conductor 680, armature 623, conductor 679 to armature 506. The following functioning of relay 510 is completed before relay 720 restores.

At armature 511, relay 510 removes the tick tone from the trunk circuit; and, at armature 514, opens the locking circuit to relay 530, causing relay 530 to restore. At armature 516, relay 510 completes a circuit to relay 520 from ground, armatures 516, 529, winding of relay 520 to negative battery, causing relay 520 to operate and lock to ground by way of armatures 524 and 516. At armature 517, relay 510 connects ground by way of conductor 690, armatures 624, 618 and working contact, upper winding of relay 605 to negative battery, causing relay 605 to restore; and at armature 518, connects ground by way of armature 644 and working contact, conductor 692, armature 518, conductor 145 in cable 146 through Figure 4 to Figure 1, conductor 145 in Figure 1, contact #21 of wiper 153 bank, wiper 153, conductor 163, lower winding of relay 200, armature 286, conductor 366, wiper 353 in engagement with contact #6 of its bank, multiple conductor 306 in cable #6 through Figures 2 and 1 to Figure 4, conductor 306 in Figure 4 to contact #6 of wiper 455 bank, thus marking station #6 in the trunk finder bank as the station to which this trunk connection is to be transferred. Relay 605, upon restoring, transfers the upper winding of relay 610 at armature 609 and resting contact to ground supplied through armature 624, and relay 610 remains operated.

Relay 530, upon restoring, opens the talking conductors of the trunk circuit at armatures 533 and 534 but relay 575 is held in the operated position by the holding bridge at armature 504, thus preventing the release of relay 640 at armature 577 and working contact. At armature 537, relay 530 opens the circuit to cut-off relay 120 of station #08 line circuit, thus causing relay 120 to restore and connect line relay 110 across the line circuit. Should the person at station #08 failed to have returned his handset to the cradle after the tick tone on the trunk advised him that the trunk connection was being transferred to station #6, line relay 110 will now close the local finder start circuit at contact 112 to cause an idle finder-connector link to find station #08 line and return dial tone as an indication that station #08 line has been freed from the trunk connection. At armature 539, relay 530 completes the circuit to trunk operating magnet 470 from ground armatures 541, 539, 523, conductor 466, winding of magnet 470 to negative battery, causing magnet 470 to position its pawl preparatory to stepping the wipers of the trunk finder to station #6. Magnet 470, upon operating, completes the circuit to the upper winding of relay 540, and the alternate operation and restoration of relay 540 and magnet 470 causes magnet 470 to advance the trunk finder wipers 451 to 455 inclusive in the manner previously described.

As trunk wiper 455 engages contact #6 of its bank, a circuit is completed from ground, armature 644 and working contact, conductor 692, armature 518, conductor 145 in cable 146 through Figure 4 to Figure 1, conductor 145 in Figure 1, contact #21 of wiper 153 bank, wiper 153, conductor 163, lower winding of relay 200, armature 286, conductor 366, wiper 353, in engagement with contact #6 of its bank, multiple conductor 306 in cable #6 through Figures 2 and 1 to Figure 4, conductor 306 in Figure 4 to contact #6 of wiper 455 bank, wiper 455, conductor 465, armature 513 and working contact, armature 521, upper winding of relay 530, lower winding of relay 540 to negative battery, causing relay 200 in the local finder-connector link and relays 530 and 540 in the trunk circuit to operate.

Relay 530, upon operating, locks to ground through armature 536 and, at armature 539, opens the circuit to magnet 470 to hold the trunk finder wipers in engagement with their #6 contacts. At armatures 533 and 534, relay 530 extends multiple line conductors 301 and 302 of station #6 by way of wipers 451 and 452, conductors 461 and 462 through to the trunk circuit. At armature 537, relay 530 connects ground to cut-off relay 320 of station #6 line circuit by way of conductor 464, wiper 454 in engagement with contact #6 of its bank, conductor 304 in cable #6 through Figures 1 and 2 to Figure 3, conductor 304 in Figure 3, winding of cut-off relay 320 to negative battery, thus holding station #6 line connected to the trunk circuit. The operation of relay 200 in the local finder-connector link causes the release of the local finder-connector link in the same manner described in the section titled "Incoming trunk calls."

The operation of relay 200 also disconnects ground from conductor 164, thereby opening the locking circuit of relay 620, causing relay 620 to restore after a short interval. At armature 623, relay 620 opens the holding circuit to relay 500, causing relay 500 to restore; and, at armature 624, opens the circuit to the upper winding of relay 610, causing relay 610 to restore. At armature 615, relay 610 removes the holding bridge from trunk conductors 601 and 602 extending to the distant exchange; and, at armatures 612, 616 and respective resting contacts, re-connects trunk conductors 601 and 602 to the right-hand windings of repeating coil 604. Relay 500, upon restoring, removes the holding bridge from the left-hand windings of repeating coil 604 at armature 504, placing relay 575 under the control of the line loop from station #6 and thereby completing the transfer of the trunk circuit to station #6. At armature 502, relay 500 opens the locking circuit to chain relay 860; and, at armature 503, opens the locking circuit to relay 550.

Relay 550, upon restoring, opens the circuit to relay 510 at armature 556, causing relay 510 to restore. At armature 551, relay 550 opens the circuit to relay 740, causing relay 740 to restore after a short interval. Relay 510, upon restoring, opens the locking circuit to relay 520 at armature 516, causing relay 520 to restore. Relay 740, upon restoring, opens the locking circuit to relay 730, causing relay 730 to restore and thus return the transfer control circuit to normal position.

After the conversation between stations #6 and the distant exchange has been terminated, the trunk connection is released in the manner described in section titled "Incoming trunk calls" or, if desired, the person at station #6 may transfer the trunk connection to another local station in the manner described in detail in this section. An outgoing trunk call established by a local station may also be transferred to another local station in the manner described in this section.

*Code call paging system*

Figures 9, 10, and 11 show the code call link which makes it unnecessary to occupy a local finder-connector link during the conversation periods of code calls. Two finders are associated with the code call link, the one shown at the right in Figure 9 and designated "Calling number finder" connects with the line circuit of the local person making a code call; and the one shown at the right in Figure 11 and designated "Answering number finder" connects with the line circuit of the person answering the code call. Provision is further made to cause the calling number finder to connect with the distant-exchange trunk circuits in order that a local person connected to a trunk call may use the code paging system.

A code registering switch comprising operating magnet 1080 and banks 1081 to 1085 inclusive registers the code dialled by the calling person, and a code sending switch comprising operating magnet 1180 and banks 1181 and 1182 sends out the registered code at regular intervals. The particular arrangement of the bank wiring of the code registering switch and the code sending switch, as shown in Figures 10, and 14, provides for three one-digit codes and five two-digit codes. The codes consist of the following numbers, 3, 4, 5, 11, 12, 13, 14 and 15. It should be understood, however, that the system is not limited to these eight codes as the banks may be so wired as to provide any desired combination or number of codes, and further, the banks may be of larger contact capacity than shown.

Briefly, code calls are completed in the following manner: The person at the calling station lifts the handset from the telephone cradle and, after hearing the dial tone, dials the code calling number "07." If the code call paging system is not in use, a second dial tone will be returned to the calling person from the code call apparatus, and the calling person then dials the code of the wanted person. The code call signals throughout the establishment thereupon signal the code of the wanted person until the wanted person answers the call or the calling person abandons the call. The wanted person answers by dialing the code answering number "09," and the two persons are connected together over the code call link, thus freeing the local finder-connector links for other service.

In order to describe a code call in detail, it is assumed that station #08 desires to call a person over the paging system and that the paging system is not in use. Responsive to the lifting of the handset at station #08, an idle local finder-connector link is caused to pick up station #08 line circuit and return dial tone to station #08 telephone in the manner described in detail in the section titled "Local calls." The person at station #08 then dials the code calling number "07," and the connector wipers are stepped into engagement with contacts #17 of their banks.

As connector wiper 354 engages contact #17 of its bank, a circuit is closed from ground, armatures 206, 215, 255 and resting contact, lower winding of relay 280, armature 273, conductor 367, wiper 354 in engagement with contact #17 of its bank, conductor 372, armature 326 and resting contact, winding of chain relay 330, armatures 332, 349, 344, 334, conductor 884 in cable 885 through Figure 6 to Figure 8, conductor 884 in Figure 8, armatures 864, 855, 846, resistance 848 to negative battery. Relays 280 and 330 both operate. Relay 330 locks to ground on conductor 372, armature 326 and resting contact, winding of relay 330, armature 333 and X contact, conductor 884 in cable 885 through Figure 6 to Figure 8. conductor 884 in Figure 8. armatures 864, 855, 846, resistance 848 to negative battery. At armature 331. relay 330 connects ground by way of conductor 374. contact #17 of wiper 353 bank, wiper 353, conductor 366, armature 286 and working contact, lower winding of relay 200, conductor 163, wiper 153 in engagement with contact #15 of its bank. multiple conductor 105 to contact #15 of wiper 953 bank to mark station #08 as calling in the calling number finder bank. At armature 336, relay 330 completes the circuit to relay 1030 in the code call link from ground. armature 336, conductor 337, winding of relay 1030 to negative battery, causing relay 1030 to operate after a short interval.

Relay 1030. upon operating. completes the circuit to the calling number finder magnet 970 from ground, armatures 1036, 1032, 1027, conductor 973, winding of magnet 970 to negative battery. Magnet 970, upon operating, positions its pawl preparatory to stepping the wipers of the calling number finder to find the line circuit of calling station #08 and. at armature 971, completes the circuit to stepping relay 1035 from ground, armature 971, conductor 972, lower winding of relay 1035 to negative battery. Relay 1035, upon operating, opens the previously traced circuit to magnet 970 at armature 1036, whereupon magnet 970 restores to advance wipers 951 to 955 inclusive into engagement with their next bank contacts. The restoration of magnet 970 also opens the circuit to relay 1035 at armature 971 with the result that relay 1035 now restores and again completes the circuit to magnet 970. This interaction between relay 1035 and magnet 970 causes magnet 970 to advance wipers 951 to 955 inclusive to contacts #15 of their banks.

As wiper 953 engages contact #15 of its bank, a circuit is completed from ground, armature 331, conductor 374, contact #17 of wiper 353 bank, wiper 353, conductor 366, armature 286, lower winding of relay 200, conductor 163, wiper 153 in engagement with contact #15 of its bank. multiple conductor 105 to contact #15 of wiper 953 bank, wiper 953, conductor 963, lower winding of relay 1020, armature 1031, upper winding of relay 1035 to negative battery causing relays 200, 1020 and 1035 to operate. Relay 1020 locks to ground by way of armatures 1033, 1013, and 1056.

At armature 1028, relay 1020 extends ground by way of armature 1014 and conductor 964 to wiper 954 in engagement with contact #15 of its bank, and from contact #15 of wiper 954 bank by way of multiple conductor 104 to station #08 cut-off relay 120 to retain relay 120 in the operated position after the local finder-connector link is released, and to guard station #08 against intrusion. At armatures 1023 and 1024 respectively, relay 1020 extends the talking conductors from contacts #15 of wiper 951 and wiper 952 banks through the windings of line relay 1040 to negative battery and ground. The loop from station #08 over multiple conductors 101 and 102 is thus extended to relay 1040, causing relay 1040 to operate. At armature 1022, relay 1020 connects dial tone to the code call link by way of armature 1071 and working contact, conductor 1188 and condenser 1114 to inform the person at station #08 to dial the code of the wanted person. At armature 1021, relay 1020 completes the circuit to relay 325 by way of conductors 1186 and 327, causing relay 325 to operate. At armature 1027, relay 1020 opens a point in the circuit to magnet 970 to retain the wipers of the calling number finder in engagement with contacts #15 of their banks. At the resting contact of armature 326, relay 325 opens the locking circuit to relay 330, causing relay 330 to restore. At armature 326 and working contact, relay 325 connects ground to contact #17 of wiper 354 connector banks by way of conductor 372 to make the code calling number "07" busy to calls over other local finder-connector links.

Relay 1040, upon operating, completes an obvious circuit to slow-to-release relay 1050, causing relay 1050 to operate. At armature 1055, relay 1050 connects a multiple ground to the locking circuit of relay 1020 to retain relay 1020 in the locked position after relay 1030 restores. Relay 330, upon restoring, removes ground from contact #17 of wiper 353 bank at armature 331; and, at armature 336, opens the circuit to relay 1030, causing relay 1030 to restore. At armature 1031, relay 1030 opens the circuit to relay 1035, causing relay 1035 to restore: at armature 1032, opens a point in the circuit to magnet 970; and, at armature 1033, removes a multiple ground from the locking circuit of relay 1020.

Returning now to the finder-connector link at the point in the operation where the circuit to relay 200 was completed by calling number finder wiper 953 making contact with terminal #15 of its bank, relay 200, upon operating, locks itself to ground by way of armature 214 and working contact and armature 204. From this point on, the operation of the circuits controlled by relay 200 and the operation of the connector self-restoring circuit to cause the release of the local finder-connector link are the same as described in the section titled "Incoming trunk calls." The local finder-connector link is now free of station #08 line circuit and is switched back into the local link allotting chain for use in other calls.

Assuming that the code of the wanted person is 14, then the circuit to line relay 1040 is interrupted once responsive to the dialling of the digit 1, and four times responsive to the dialling of digit 4. Relay 1040 restores momentarily for each impulse and, at armature 1041, correspondingly opens the circuit to relay 1050. Relay 1050, however, is of the slow-to-release type and, therefore, does not restore during the impulsing period. At armature 1042, relay 1040 transmits an impulse to the operating magnet 1080 of the code registering switch for each deenergization. The circuit for the impulse caused by the dialling of digit 1 may be traced from ground, armatures 1052, 1042, wiper 1085 in engagement with contact #25 of its bank, armature 1069, winding of magnet 1080 to negative battery. Magnet 1080, upon operating, positions its pawl preparatory to stepping wipers 1081 to 1085 inclusive of the code registering switch. The first deenergization of relay 1040 also completes the circuit to relay 1060 from ground, armatures 1052, 1042, wiper 1085 in engagement with contact #25 of its bank, armature 1053, winding of relay 1060 to negative battery. Relay 1060, upon operating, completes a multiple circuit to itself independent of wiper 1085 from ground by way of armatures 1052, 1042, 1054 and 1062.

Relay 1040 re-operates after the impulse, opening the circuits to magnet 1080 and relay 1060 at the resting contact of armature 1042, and magnet 1080 restores. Relay 1060 is of the slow-to-release type and, therefore, restores after a short interval following the dialling of digit 1. The restoration of magnet 1080 advances the wipers of the code registering switch into engagement, with contact #1 of their banks. The restoration of relay 1060 completes a circuit from ground, wiper 1084 in engagement with contact #1 of its bank, armature 1061, winding of relay 1065 to negative battery, causing relay 1065 to operate. As wiper 1083 engages with contact #1 of its bank, the circuit of normally operated relay 1070 is opened at contact #25 of wiper 1083 bank, and relay 1070 restores to remove dial tone from the link at armature 1071.

Wiper 1084 bridges two adjacent contacts at each position and, therefore, when wiper 1084 engages contact #1 of its bank, a locking circuit for relay 1065 is completed from ground, wiper 1084 bridging contact #2 of its bank, armature 1066, winding of relay 1065, to negative battery. The bridging of contact #2 of wiper 1084 bank also completes a self-interrupting circuit to magnet 1080 by way of armatures 1056, 1061, 1067 and working contact, armature 1086, winding of magnet 1080 to negative battery, causing magnet 1080 to operate and again position its pawl. Since magnet 1080 interrupts its own circuit at armature 1086, magnet 1080 restores and advances wipers 1081 to 1085 inclusive into engagement with contacts #2 of their banks. Magnet 1080, upon restoring, also completes its own circuit at armature 1086 because relay 1065 is maintained operated through ground supplied from wiper 1084 in engagement with contact #2 of its bank. Magnet 1080 again operates, positions its pawl, opens its own circuit at armature 1086, restores and advances wipers 1081 to 1085 inclusive into engagement with contacts #3 of their banks. Contact #2, #3, #4 and #5 of wiper 1084 bank are multiplied together and, therefore, in the same manner as just described, magnet 1080 is caused to advance wipers 1081 to 1085 inclusive into successive engagement with contact #4, #5 and #6 of their banks. When magnet 1080 restores and advances the wipers to contacts #6, the circuit to magnet 1080 is not reclosed, because wiper 1084 is now bridging contacts #6 and #7 and relay 1065, therefore, restores. Hence, wipers 1081 to 1085 inclusive, remain in engagement with contacts #6 of their banks until the second digit 4 of the code is dialed.

The circuit for the first impulse caused by the dialling of digit 4 is completed from ground, armatures 1052, 1042, wiper 1085 in engagement with contact #6 of its bank, armature 1069, winding of magnet 1080 to negative battery, causing magnet 1080 to operate and position its pawl. The first deenergization of relay 1040 also completes the circuit to relay 1060 from ground, armatures 1052, 1042, wiper 1085 in engagement with contact #6 of its bank, armature 1053, winding of relay 1060 to negative battery. Relay 1060, upon operating, completes a multiple circuit to itself independent of wiper 1085 from ground by way of armatures 1052, 1042, 1054 and 1062.

Relay 1040 re-operates after the first impulse, opening the circuits to magnet 1080 and relay 1060 at the resting contact of armature 1042, and magnet 1080 restores. Relay 1060 does not restore during the impulsing period. The restoration of magnet 1080 advances wipers 1081 to 1085 inclusive into engagement with contact #7 of their banks. The second deenergization of relay 1040 completes the circuit to magnet 1080 from ground, armatures 1052, 1042, 1054, 1062, 1053, 1069, winding of magnet 1080 to negative battery, causing magnet 1080 to operate and position its pawl a second time. The second re-operation of relay 1040 opens the circuit to magnet 1080, causing magnet 1080 to restore and advance wipers 1081 to 1085 inclusive into engagement with contacts #8 of their banks. In the same manner as just described, magnet 1080 successively advances its wipers into engagement with contacts #9 and #10 of their banks.

As wiper 1082 engages contact #10 of its bank, a circuit is completed from ground, wiper 1082 in engagement with contact #10, multiple strap to contact #11 of the bank, armature 1063, (relay 1060 having restored shortly after the cessation of impulsing), armature 1068, conductor 1195, armatures 1149, 1183, conductor 1190, armature 1025 and working contact, conductor 1191, armature 1122 and resting contact, winding of relay 1110 to negative battery, causing relay 1110 to operate. As wiper 1084 engages contact #10 of its bank, ground by way of wiper 1084, contacts #10, #9, #8 and #7 of wiper 1084 bank and conductor 1199 is connected to contact #7 in the 1181 bank of the code sending switch to provide starting ground for causing the first operation of the code call signals throughout the establishment. When wiper 1081 engages contact #10 of its bank, ground by way of wiper 1081 in engagement with contact #10 and conductor 1184 is connected to contact #10 of the 1181 bank to provide starting ground for causing the second operation of the code call signals. The multipling of the contacts of the 1081 and 1181 banks is shown in detail in the enlarged view of Figure 14. Wipers 1081 to 1085 inclusive now remain in engagement with contacts #10 of their banks, and the code sending switch is in position to operate the code call signals.

Relay 1110, upon operating, completes the circuit to the operating magnet 1180 of the code sending switch from ground, armature 1112, winding of magnet 1180 to negative battery. Magnet 1180, upon operating, positions its pawl preparatory to stepping wipers 1181 and 1182, and, at armature 1183, opens the circuit to relay 1110, causing relay 1110 to restore. At armature 1112, relay 1110 opens the circuit to magnet 1180, whereupon magnet 1180 restores and advances wipers 1181 and 1182 into engagement with contact #1 of their banks. The restoration of magnet 1180 also completes the circuit to relay 1110 at armature 1183, and relay 1110 re-operates. The re-operation of relay 1110 again completes the circuit to magnet 1180 at armature 1112, and magnet 1180 re-operates to position its pawl a second time and also to open the circuit to relay 1110. The alternate operation and restoration of relay 1110 and magnet 1180, in the same manner as just described, causes magnet 1180 to advance wipers 1181 and 1182 contact by contact, this contact stepping continuing automatically until the paged person answers the call or the calling person abandons the call. Relay 1110 is of the slow-to-operate type in order to reduce the speed of the code sending switch to cause a proper operation of the code call signals 1160.

As wiper 1181 engages contact #7 of its bank, the circuit of relay 1120 is completed from ground, wiper 1084 in engagement with contact #10 of its bank, multiple straps to contact #7, conductor 1199, contact #7 of wiper 1181 bank, wiper 1181, winding of relay 1120, resistance 1127 to negative battery, causing relay 1120 to operate. Relay 1120 locks to ground by way of wiper 1182 in engagement with contact #7 of its bank, multiple straps to contact #1 and armature 1123.

At armature 1122, relay 1120 completes the circuit to relay 1125 from ground, wiper 1082 in engagement with contact #10 of its bank, multiple strap to contact #11, armatures 1063, 1068, conductor 1195, armatures 1149, 1183, conductor 1190, armature 1025 and working contact, conductor 1191, armature 1122 and working contact, winding of relay 1125 to negative battery. Relay 1125 is of the slow-to-operate type and, therefore, operates after a short interval and completes the circuit to relay 1110 from ground on conductor 1191, armature 1126, winding of relay 1110 to negative battery. Relay 1110 re-operates after a short interval and, at armature 1113, completes the circuit to power relay 1150 from ground, armatures 1113, 1124, winding of relay 1150 to negative battery. Relay 1150 operates in turn and completes the circuit to multiple code signals 1160, causing the signals to operate once. At armature 1111, relay 1110 connects dial tone to the link by way of armature 1022, conductor 1187, armatures 1121, 1111 and condenser 1114 as a signal to the calling person at station #08 that the code call signals have been operated once to correspond with the dialling of the digit 1.

As wiper 1181 engages contact #8 of its bank, a ground shunt is connected around relay 1120, causing relay 1120 to restore and open the circuit to power relay 1150 at armature 1124, and to transfer the circuit of relay 1110 to the resting contact of armature 1122, the latter action also causing relay 1125 to restore. The ground shunt circuit to relay 1120 may be traced from ground, wiper 1182 in engagement with contact #8 of its bank, multiple straps to contact #1, armature 1123, wiper 1181 in engagement with contact #8 of its bank to resistance 1127. Relay 1120 restores under this condition and opens a point in its locking circuit at armature 1123. The restoration of power relay 1150 opens the circuit to the code call signals, and the code call signals remain inoperative for a period sufficient to introduce a pause between the signalling of the digit 1 and the starting of the signalling for the digit 4.

As wiper 1181 engages contact #10 of its bank, the circuit to relay 1120 is again completed from ground, wiper 1081 in engagement with contact #10 of its bank, conductor 1184 (Figure 14), contact #10 of wiper 1181 bank, wiper 1181, winding of relay 1120, resistance 1127 to negative battery, causing relay 1120 to operate. Relay 1120 locks to ground by way of wiper 1182 in engagement with contact #10 of its bank, multiple straps to contact #1 and armature 1123.

At armature 1122, relay 1120 again completes the circuit to relay 1125 as previously explained, causing relay 1125 to operate and complete the circuit to relay 1110 at contact 1126. Relay 1110 operates and completes the circuit to power relay 1150 at armature 1113, and power relay 1150 in turn completes the circuit to code call signals 1160, causing the signals to operate once. In the manner previously described, the alternate operation and restoration of relay 1110 and magnet 1180 causes wipers 1181 and 1182 to be successively advanced contact by contact and, as wiper 1181 successively engages contacts #11, #12 and #13, power relay 1150 is caused to operate the code call signals once for each of these contacts. Thus, when wiper 1181 reaches contact #13, the code call signals have been operated four times in fairly rapid succession to correspond with the digit 4 dialled by the calling person at station #08. One complete operation of the code 14 has, therefore, been signalled by the multiple code call signals 1160, and the calling person at station #08 has received a corresponding coding of dial tone to advise him that code 14 has been signalled once.

As wiper 1181 engages contact #14 of its bank, a ground shunt is again connected around relay 1120 in the manner as previously described when wiper 1181 engaged contact #8, causing relay 1120 to restore. The restoration of relay 1120 again opens the circuit to power relay 1150 at armature 1124, and also transfers the circuit of relay 1110 to the resting contact of armature 1122, the latter action also causing relay 1125 to restore. The circuit to code call signals 1160 remains open at the armature of relay 1150 until the alternate action of relay 1110 and magnet 1180 has advanced wipers 1181 and 1182 through contacts #25, #1, #2, #3, #4, #5, and #6. When wiper 1181 again engages contact #7 of its bank, the second signalling of code 14 is started in the manner just described. Code 14 will, therefore, be signalled periodically until the paged person answers the call by dialling the code answering number 09 or the calling person at station #08 abandons the call.

Assuming now that the paged person steps to the telephone at station #6 and, responsive to dial tone, dials the code answering number 09, then as connector wiper 354 of the local finder-connector link used by station #6 engages contact #19 of its bank, a circuit is closed from ground, armatures 206, 215, 255 and resting contact, lower winding of relay 280, armature 273, conductor 367, wiper 354 in engagement with contact #19 of its bank, conductor 371, armature 1147 and resting contact, conductor 348, winding of chain relay 340, armatures 342, 349, 344, 334, conductor 884 in cable 885 through Figure 6 to Figure 8, conductor 884 in Figure 8, armatures 864, 855, 846, resistance 848 to negative battery. Relay 340 operates and locks to ground on conductor 371, armature 1147 and resting contact, conductor 348, winding of relay 340, armature 343 and X contact, 334, conductor 884 in cable 885 through Figure 6 to Figure 8, conductor 884 in Figure 8, armatures 864, 855, 846, resistance 848 to negative battery.

At armature 341, relay 340 connects ground by way of conductor 373, contact #19 of wiper 353 bank, wiper 353, conductor 366, armature 286, lower winding of relay 200, conductor 163, wiper 153 in engagement with contact #6 of its bank, multiple conductor 305 to Figure 9, multiple conductor 305 in cable #6 through Figure 10 to Figure 11, conductor 305 in Figure 11, contact #6 of wiper 1153 bank to mark station #6 as calling in the answering number finder bank. At armature 346, relay 340 completes the circuit to relay 1140 in the code call link from ground, armature 346, conductor 347, winding of relay 1140 to negative battery, causing relay 1140 to operate after a short interval.

Relay 1140, upon operating, completes the circuit to the answering number finder magnet 1176 from ground, armature 1036, conductor 1194, armature 1142, winding of magnet 1176 to negative battery. Magnet 1176, upon operating, positions its pawl preparatory to stepping the wipers of the answering number finder to find the line circuit of station #6; and, at armature 1177, completes the circuit to stepping relay 1035 from ground, armature 1177, conductor 1193, lower winding of relay 1035 to negative battery. Relay 1035, upon operating, opens the previously traced circuit for magnet 1176 at armature 1036, whereupon magnet 1176 restores to advance wipers 1151 to 1155 inclusive into engagement with their next bank contacts. The restoration of magnet 1176 also opens the circuit to relay 1035 with the result that relay 1035 now restores and again completes the circuit to magnet 1176. This interaction between relay 1035 and magnet 1176 causes magnet 1176 to advance wipers 1151 to 1155 inclusive to contacts #6 of their banks in the manner previously described. At armature 1143, relay 1140 connects a multiple ground to armature 1013 by way of conductor 1196.

As wiper 1153 engages contact #6 of its bank, a circuit is completed from ground, armature 341, conductor 373, contact #19 of wiper 353 bank, wiper 353, conductor 366, armature 286, lower winding of relay 200, conductor 163, wiper 153 in engagement with contact #6 of its bank, multiple conductor 305 to Figure 9, multiple conductor 305 in cable #6 through Figure 10 to Figure 11, conductor 305 in Figure 11, contact #6 of wiper 1153 bank, wiper 1153, lower winding of relay 1170, armature 1141, conductor 1163, upper winding of relay 1035 to negative battery, causing relays 200, 1170 and 1035 to operate. Relay 1170 locks to ground by way of armature 1013, conductor 1192 and armature 1173.

At armature 1174, relay 1170 extends ground by way of wiper 1154 in engagement with contact #6 of its bank, conductor 304 in cable #6 through Figure 10 to Figure 9, multiple conductor 304 to Figure 1, multiple conductor 304 in cable #6 through Figure 2 to Figure 3, conductor 304 in Figure 3 to station #6 cut-off relay 320 to retain relay 320 in the operated position after the local finder-connector link connected to station #6 line circuit is released, and to guard station #6 from intrusion. At armatures 1171 and 1172 respectively, relay 1170 extends the talking conductors of the code call link from condensers 1073 and 1074 through to wipers 1151 and 1152. The talking circuit from station #08 to station #6 is now complete through the code call link. Transmission battery is supplied to station #08 from relay 1040, and to station #6 from relay 1130 in series with relay 1135. Relay 1135 does not operate at this time because it is differentially wound.

Transmission relay 1130, upon operating, completes the circuit of code call supervisory lamp 1133 at armature 1131 to indicate that a local connection has been completed through the code call link. The supervisory lamp 1133 may be located at the attendant's station should an attendant's station be provided, or at any other designated supervisory point. At armature 1132, relay 1130 completes the circuit to the upper winding of relay 1145, causing relay 1145 to operate and lock to ground by way of armature 1013, conductor 1192, and armature 1148. At armature 1146, relay 1145 connects a multiple ground to relay 325 by way of conductor 327. At the resting contact of armature 1147, relay 1145 opens the locking circuit to relay 340, causing relay 340 to restore. At armature 1147 and working contact, relay 1145 connects ground to contact #19 of wiper 345 connector banks by way of conductor 371 to make the code answering number 09 busy to calls over other local finder-connector banks. At armature 1149, relay 1145 opens one circuit to stepping relay 1110 preparatory to stopping the automatic rotation of the code sending switch (magnet 1180 and wipers 1181 and 1182), but a second circuit to relay 1110 is maintained from ground, wiper 1182 in engagement with any contact of its bank up to contact #24, multiple straps to contact #1, armature 1183, conductor 1190, armature 1025 and working contact, conductor 1191 to armature 1122 for the purpose of causing the code sending switch to complete the current signalling cycle of code 14. As wiper 1182 engages contact #25 of its bank, this second circuit to relay 1110 is opened, and the code sending switch remains in the twenty-fifth, or home, position, having completed the current signalling cycle of code 14. Power relay 1150, therefore, cannot operate again on this connection.

Relay 340, upon restoring, removes ground from contact #19 of wiper 353 bank at armature 341; and, at armature 346, opens the circuit to relay 1140, causing relay 1140 to restore. At armature 1142, relay 1140 opens a point in the circuit to magnet 1176 to retain wipers 1151 to 1155 inclusive in engagement with contacts #6 of their banks; and, at armature 1141, opens the circuit to relay 1035, causing relay 1035 to restore. At armature 1143, relay 1140 removes a multiple ground from the locking circuits of relay 1020, 1145 and 1170.

Returning now to the second finder-connector link at the point in the operation where the circuit to relay 200 was completed by answering number finder wiper 1153 making contact with terminal #6 of its bank, relay 200, upon operating, locks itself to ground by way of armature 214 and working contact and armature 204. From this point on, the operation of the circuits controlled by relay 200 and the operation of the connector self-restoring circuit to cause the release of the local finder-connector link are the same as described in the section titled "Incoming trunk calls". The local finder-connector link is now free of station #6 line circuit and is switched back into the local link allotting chain for use in other calls.

After the conversation over the code call link has been terminated, and responsive to the calling person at station #08 returning the handset to the cradle, the loop circuit to relay 1040 is opened at the upper springs of switch SW (Figure 1) and relay 1040 restores. At armature 1041, relay 1040 opens the circuit to relay 1050, which relay restores after a short interval. Relay 1050 removes ground from the locking circuits of relay 1020, 1145 and 1170 at armature 1055. At armature 1051, relay 1050 completes the self-restoring circuit of the code registering switch from ground, wiper 1182 in engagement with contact #25 of its bank, conductor 1198, wiper 1083 in engagement with contact #10 of its bank, multiple straps to contact #1, armatures 1051, 1067 and resting contact, 1086, winding of magnet 1080 to negative battery. The closing of magnet 1080 circuit at armature 1051 causes magnet 1080 to operate and interrupt its own circuit at armature 1086 in the operated position. Magnet 1086, therefore, operates in the same manner as a buzzer to advance wipers 1081 to 1085 inclusive step by step to contacts #25 of their banks. As wiper 1083 engages contact #25 of its bank, the circuit to magnet 1080 is opened at contact #24 of wiper 1083 bank and, therefore, the code registering switch remains in the twenty-fifth, or home, position.

Relay 1020, upon restoring, opens a multiple circuit to relay 325 at armature 1021; and, at armatures 1023 and 1024, opens the talking circuit of the code call link. At the working contact of armature 1025, relay 1020 opens a point in the circuit to relay 1110; and, at the working contact of armature 1028, removes ground from the holding circuit of cut-off relay 120, causing relay 120 to restore. The restoration of cut-off relay 120 returns line circuit #08 to normal by connecting line relay 110 to conductor 101 at armature 121, and ground to conductor 102 at armature 123. At armature 1028 and resting contact, relay 1020 completes the circuit to the upper winding of relay 1145 by way of armature 1072 (providing that wiper 1083 of the code registering switch has not yet reached contact #25 of its bank and caused relay 1070 to re-operate) and conductor 1164, for the purpose of causing relay 1145 to retain slow-to-release relay 325 in the operated position and thereby prevent any local finder-connector link from seizing the code calling number 07 contact (contact #17) in the connector banks before the code registering switch in the code call link has had sufficient time to return to its normal position. As wiper 1083 engages contact #25 of its bank, the circuit to relay 1070 is completed at contact #25, causing relay 1070 to operate and open the circuit to relay 1145 at armature 1072.

Relay 1145, upon restoring, opens the circuit to relay 325 at armature 1146, causing relay 325 to restore; and, at the working contact of armature 1147, disconnects ground from contact #19 of wiper 354 bank to remove the busy condition from the code answering number 09. Relay 325, upon restoring, disconnects ground from contact #17 of wiper 354 bank to remove the busy condition from the code calling number 07. Relay 1170, upon restoring, further opens the talking circuit of the code call link at armatures 1171 and 1172; and, at armature 1174, removes ground from the holding circuit of cut-off relay 320, causing relay 320 to restore. The restoration of cut-off relay 320 returns line circuit #6 to normay by connecting line relay 310 to conductor 301 at armatures 321, and ground to conductor 302 at armature 323. The code paging system is now in the normal free position in readiness for the next code call.

Considering now the case where the paged person having code call number 14 does not answer the code call, then the code sending switch will continue to cause the code signals 1160 to be operated because relay 1145 will not operate to cut off the code signalling. The calling person at station #08 abandons the call by returning his handset to the cradle, thus opening the circuit to relay 1040 and causing relay 1040 to restore. The restoration of relay 1040 causes relay 1050 to restore after a short interval, and relay 1050, at armature 1055, opens the locking circuit of relay 1020. Relay 1020 in turn completes the circuit to the upper winding of relay 1145 from ground, armature 1028 and resting contact, armature 1072, conductor 1164, upper winding of relay 1145 to negative battery, causing relay 1145 to operate.

The operation of relay 1145 opens a point in one circuit to magnet 1180 at armature 1149 preparatory to stopping the automatic rotation of the code sending switch, but an independent self-restoring circuit to magnet 1180 was closed by the restoration of relay 1120 for the purpose of causing the code sending switch to complete the current signalling cycle of code 14. This independent self-restoring circuit may be traced from ground, wiper 1182 in engagement with any contact of its bank up to contact #24, multiple straps to contact #1, armature 1183, conductor 1190, armature 1025 and resting contact, conductor 1189, winding of magnet 1180 to negative battery. As wiper 1182 engages contact #25 of its bank, the self-restoring circuit to magnet 1180 is opened, and the code sending switch remains in the twenty-fifth, or home, position, having completed the current signalling cycle of code 14. The subsequent restoration of the code registering switch to its home position, and the release of the code call link are the same as previously described for the code call connection after the conversation over the code call link had been terminated.

The operation of the paging system when single-digit code #3, #4 or #5 is dialled, is essentially the same as that just described for two-digit code #14, with the minor exceptions that wipers 1081 to 1085 inclusive remain on contacts #3, #4 or #5 and the code sending switch repeats the sending of the code a second time in each full revolution of the code sending switch.

*Transferring trunk calls over the paging system*

A trunk call may be transferred from one local station to another local station equipped with a push button by way of the code call paging system. In order to describe how this may be accomplished, it will be assumed that a person at station #08 has answered and held an incoming trunk call on trunk circuit #1 in the manner described in detail in the section titled "Holding trunk calls." Dial tone is then returned to station #08 telephone and the person at station #08 dials the code calling number 07, thus stepping the connector wipers of local finder-connector link #1 into engagement with contacts #17 of their banks.

The calling number finder switch of the code call link is then caused to pick up station #08 line circuit and the finder-connector link #1 is then released in the manner described in detail in the preceding section titled "Code call paging system." Upon receiving a second dial tone indicating that he may proceed with the dialling of the code of the wanted person, the person at station #08 then dials the code of the wanted person and the code call signals 1160 throughout the establishment are correspondingly operated, also in the manner described in the preceding section titled "Code call paging system."

Assuming now that the paged person steps to the telephone at station #6 and, responsive to dial tone, dials the code answering number 09, then in the manner described in the preceding section titled "Code call paging system" the persons at stations #08 and #6 are connected together over the code call link. The person at station #08 instructs the person at station #6 to depress his push button 324 to accept the call. Depressing push button 324 momentarily, connects ground to line conductors 301 and 302, thereby shunting the lower winding of differential relay 1135 in the code call link. This shunt circuit may be traced from ground through push button 324, lower contact of switch SW (Figure 3), receiver R, lower winding of induction coil, multiple conductor 302 in cable #6 through Figure 2 to Figure 1, multiple conductor 302 to Figure 9, multiple conductor 302 in cable #6 through Figure 10 to Figure 11, conductor 302 in Figure 11, contact #6 of wiper 1152 bank, wiper 1152, armature 1172 to lower winding of relay 1135. Relay 1135, therefore, operates over the circuit through its upper winding extending from ground through push button 324, lower contact of switch SW, receiver R, transmitter T, impulse springs of dial, upper contact of switch SW, multiple conductor 301 through Figures 2, 1, 9, and 10 to Figure 11, conductor 301 in Figure 11, contact #6 of wiper 1151 bank, wiper 1151, armature 1171, upper winding of relay 1135, upper winding of relay 1130 to negative battery, relay 1130 was operated previously through both its windings and now remains operated through its upper winding.

Relay 1135, upon operating, completes a multiple circuit to relay 500 in the trunk circuit from ground, armature 1136, conductor 1197, armature 1029, conductor 965, wiper 955 in engagement with contact #21 of its bank, conductor 144 to Figure 1, conductor 144 in cable 146 through Figures 4 and 5 to Figure 6, conductor 144 in Figure 6, armature 606, conductor 482 in cable 490 through Figure 5 to Figure 4, conductor 482 in Figure 4, armature 445 and resting contact should an attendant's station be provided, otherwise from conductor 482 in Figure 4 direct to conductor 483, conductor 483 in cable 490 to Figure 5, conductor 483 in Figure 5, armature 501, upper winding of relay 500 to negative battery, and by way of armature 501, lower winding of relay 500, armature 505, resistance 507 to negative battery. Relay 500 does not operate under this circuit condition as it is differentially wound. When the person at station #6 releases push button 324, the ground shunt to the lower winding of relay 1135 is removed and relay 1135 restores. The restoration of relay 1135 removes ground from the previously traced circuit to armature 501, thus opening the multiple circuit to the windings of relay 500 and causing a momentary induced current flow in the local circuit of relay 500 which includes both windings of relay 500 and resistance 507 in series. Relay 500, therefore, operates its X contact and then fully operates over the circuit from ground, resting contact of armature 512, conductor 680, armature 623, conductor 679, armature 506, both windings of relay 500 in series to negative battery.

The operation of the trunk circuit as controlled by the operation of relay 500, and also the operation of the transfer control circuit shown in Figure 7, are the same as described in the section titled "Transferring trunk calls." Ground is, therefore, connected by way of armature 644 and working contact, conductor 692, armature 518, conductor 145 in cable 146 through Figure 4 to Figure 1, conductor 145 through Figure 1 to Figure 9, conductor 145 in Figure 9, contact #21 of wiper 953 bank, wiper 953, conductor 963, lower winding of relay 1010, conductor 1165, armature 1175, wiper 1155 in engagement with contact #6 of its bank, conductor 306 in cable #6 through Figure 10 to Figure 9, conductor 306 to Figure 1, conductor 306 in cable #6 to Figure 4, conductor 306 in Figure 4, contact #6 of wiper 455 bank, thus marking station #6 in the trunk finder bank as the station to which this trunk connection is to be transferred.

Relay 530 in the trunk circuit restores at this point in the transfer operation in the manner previously described and opens the talking conductors of the trunk circuit at armatures 533 and 534, but relay 575 is held in the operated position by the holding bridge at armature 504, thus preventing the release of relay 640 at armature 577 and working contact. At armature 537, relay 530 opens the circuit to cut-off relay 120 of station #08 line circuit, thus causing relay 120 to restore and connect line relay 110 across its line circuit. At armature 539, relay 530 completes the circuit to trunk operating magnet 470 from ground, armatures 541, 539, 523, conductor 466, winding of magnet 470 to negative battery. The subsequent interaction between magnet 470 and relay 540 causes magnet 470 to advance the trunk finder wipers 451 to 455 inclusive into engagement with contacts #6 of their banks, in the manner previously described.

As trunk wiper 455 engages contact #6 of its bank, a circuit is completed from ground, armature 644 and working contact, conductor 692, armature 518, conductor 145 in cable 146 through Figure 4 to Figure 1, conductor 145 through Figure 1 to Figure 9, conductor 145 in Figure 9, contact #21 of wiper 953 bank, wiper 953, conductor 963, lower winding of relay 1010, conductor 1165, armature 1175, wiper 1155 in engagement with contact #6 of its bank, conductor 306 in cable #6 through Figure 10 to Figure 9, conductor 306 to Figure 1, conductor 306 in cable #6 to Figure 4, conductor 306 in Figure 4, contact #6 of wiper 455 bank, wiper 455, conductor 465, armature 513 and working contact, armature 521, upper winding of relay 530, lower winding of relay 540 to negative battery, causing relay 1010 in the code call link and relays 530 and 540 in the trunk circuit to operate.

Relay 530, upon operating, locks to ground through armature 536 and, at armature 539, opens the circuit to magnet 470 to hold the trunk finder wipers in engagement with their #6 contacts. At armatures 533 and 534, relay 530 extends multiple line conductors 301 and 302 of station #6 by way of wipers 451 and 452, conductors 461 and 462 through to the trunk circuit. At armature 537, relay 530 connects ground to cut-off relay 320 of station #6 line circuit by way of conductor 464, wiper 454 in engagement with contact #6 of its bank, conductor 304 in cable #6 through Figures 1 and 2 to Figure 3, conductor 304 in Figure 3, winding of cut-off relay 320 to negative battery, thus holding station #6 line connected to the trunk circuit.

Returning now to the code call link at the point in the operation where the circuit of relay 1010 was completed by trunk wiper 455 making contact with terminal #6 of its bank, relay 1010, upon operating, locks itself to ground by way of armatures 1055 and 1015. At armatures 1011 and 1012, relay 1010 opens the loop to line relay 1040, causing relay 1040 to restore; and, at armature 1013, opens the locking circuits to relays 1020, 1145 and 1170. Relay 1040, upon restoring, opens the circuit of relay 1050, causing relay 1050 to restore after a short interval. At armature 1051, relay 1050 completes the self-restoring circuit of the code registering switch and, in the manner previously described, magnet 1080 operates as a buzzer to advance wipers 1081 to 1085 inclusive step by step to contacts #25 of their banks. As wiper 1083 engages contact #25 of its bank, the circuit to magnet 1080 is opened at contact #24 of wiper 1083 bank and, therefore, the code registering switch remains in the twenty-fifth, or home, position. The balance of the releasing of the code call link is essentially the same as described in the preceding section titled "Code call paging system" with the addition that the locking circuit to relay 1010 is opened at armature 1055. The code paging system is now in the normal free position in readiness for the next code call, and station #6 is connected to the trunk call in place of the original answering station #08.

*Trunk call allotter chain relays*

As explained in detail in the preceding sections, marking potentials are required in the banks of the trunk finder switches, local finder switches, code calling number finder switch of the code call link and the code answering number finder switch of the code call link in order that local persons may, through the use of local finder-connector links, make outgoing trunk calls, answer incoming trunk calls, transfer trunk calls to other local stations, obtain access to the code call paging system, and transfer trunk calls to other local stations by means of the code call link. Since the banks of the finder switches are multipled together, it is desirable that marking potential for only one call be established at a time to prevent possible mix-up in simultaneous calls. This marking control is obtained by interlocking the various types of calls in chain relays of the trunk call allotter.

Figure 12:
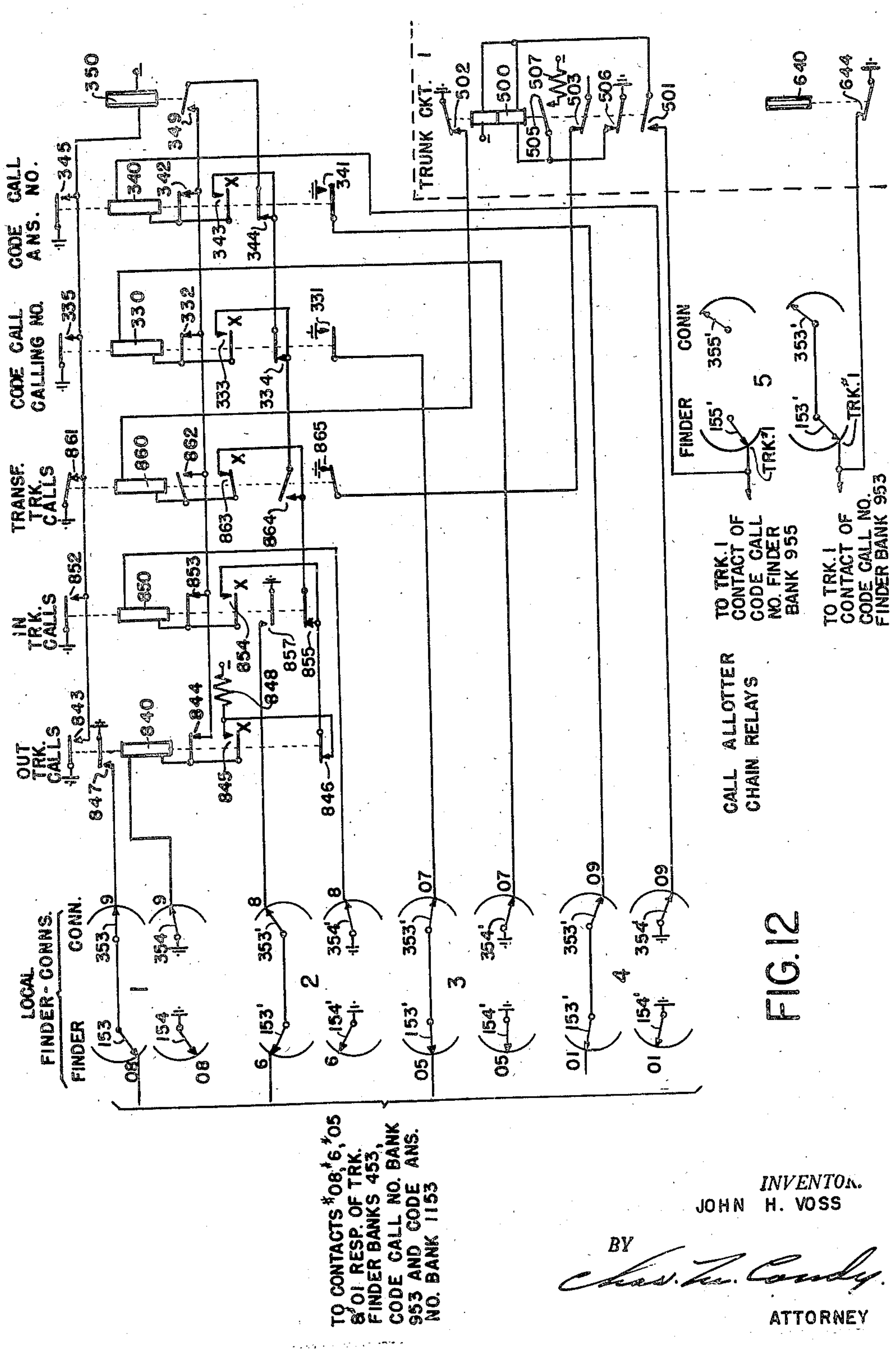
Figure 12 shows, in a simple schematic form, the relationship of the trunk call allotter chain relays with the test and control wipers of the local finder-connector links.

Figure 12 illustrates in a simple schematic manner the method of interlocking the various type of calls in the chain relays. Only the marking and control banks of the local finder-connector links are shown, and all intermediate relay contacts, windings, etc., not required for this explanation have been omitted from the drawing. Five local finder-connector links are included in order to illustrate all possible combination of calls, although it does not follow that every installation would necessarily require five local finder-connector links. Only a sufficient part of trunk circuit #1 is included to illustrate the chain relay control associated with the transferring of trunk calls. The relay reference numbers, armature reference numbers and wiper reference numbers included in Figure 12 are the same as the relevant reference numbers in Figures 1 to 11 inclusive.

Referring now to Figure 12, station #08 is using local finder-connector link #1 to make an outgoing trunk call. The trunk calling number digit 9 has been dialled, and connector wipers 353 and 354 are shown in engagement with contacts #9 of their banks. The circuit to associated chain relay 840 is, however, incomplete because chain relay 860 is shown in the operated position. The partially complete circuit of chain relay 840 may be traced from ground by way of wiper 354 in engagement with contact #9 of its bank, winding of relay 840, armature 844 to the open resting contact of armature 349. Relay 840, therefore, cannot operate at this moment and extend marking ground by way of armature 847, contact #9 of wiper 353 bank, wiper 353, wiper 153 in engagement with contact #08 (fifteenth contact) of its bank, multiple conductors to contacts #08 of the trunk finder banks 453 and, hence, this operation is momentarily delayed. When chain relay 860 restores, relay 840 will operate from ground, wiper 354 in engagement with contact #9 of its bank, winding of relay 840, armature 844, armature 349 (relay 350 now restored because its circuit is now open at armature 861), armatures 344, 334, 864, 855, 846, resistance 848 to negative battery. Relay 840 locks through armature 845 and performs the marking operation just described. The operation of relay 840 again completes the circuit to relay 350 at armature 843, and also opens the circuit to resistance 848 at armature 846, thereby preventing any other chain relay from operating until relay 840 restores.

Station #6 is shown using local finder-connector link #2 for answering an incoming trunk call. The trunk answering number digit 8 has been dialled, and connector wipers 353′ and 354′ of link #2 are shown in engagement with contacts #8 of their banks. The circuit to associated chain relay 850 is, however, incomplete because chain relay 860 is shown in the operated position. Relay 850, therefore, cannot operate at this moment and extend marking ground by way of armature 857, contact #8 of wiper 353′ bank, wiper 353′, wiper 153′ in engagement with contact #6 of its bank, multiple conductors to contacts #6 of the trunk finder banks 453 and, hence, this operation is momentarily delayed. When chain relay 860 restores, relays 840 and 850 will operate their 845 and 854 contacts (X contacts) respectively, but relay 840 will immediately operate fully and disconnect relay 850 from resistance 848 at armature 846. Hence, relay 850 cannot operate to extend marking ground to contacts #6 of the trunk finder banks 453 until relay 840 restores.

Chain relay 860 is shown in the operated position, thus indicating that a trunk call on trunk circuit #1 is being transferred from one local station to another local station. It is assumed at this point in the transfer that one local station has been picked up by the finder switch of trunk circuit #1, and that relay 640 in trunk circuit #1 has connected marking ground to trunk #1 contacts (contact #21) of the local finder switches. Wiper 153′ of local finder-connector link #5 has found the marking ground on the trunk #1 (contact #21) contact of its bank, thus holding the finder wipers of link #5 on the trunk #1 contacts. Wiper 155′ of link #5 has extended ground by way of armature 501 to the windings of relay 500 in multiple, through upper winding of relay 500 to negative battery, and through the lower winding of relay 500, armature 505, resistance 507 to negative battery. Relay 500 operated in the manner previously described and locked to ground by way of armature 506. At armature 502, relay 500 has locked chain relay 860 to negative battery by way of resistance 848 and armatures 846, 855 and 863. The local station connected to trunk circuit #1 may now use link #5 to call the wanted local station and transfer the call on trunk circuit #1 to the wanted local station in the manner described in detail in the section titled "Transferring trunk calls." Chain relay 860 restores as soon as the transfer is completed and local finder-connector link #5 is released.

Station #05 is shown using local finder-connector link #3 for obtaining access to the code call link for the purpose of making a code call. The code calling number 07 has been dialled, and connector wipers 353' and 354' of link #3 are shown in engagement with contacts #07 (seventeenth contact) of their banks. The circuit to associated chain relay 330 is, however, incomplete because chain relay 860 is shown in the operated position. Relay 330, therefore, cannot operate at this moment and extend marking ground by way of armature 331, contact #07 of wiper 353' bank, wiper 353', wiper 153' in engagement with contact #05 (twelfth contact) of its bank, multiple conductors to contact #05 of the code calling number finder bank 953 and, hence, this operation is momentarily delayed. When chain relay 860 restores, relays 840, 850 and 330 will operate their 845, 854 and 333 contacts (X contacts) respectively, but relay 840 will immediately operate fully and disconnect relays 850 and 330 from resistance 848 at armature 846. Hence, relay 850 cannot operate until relay 840 restores, and relay 330 cannot operate until relay 850 has operated and then restored.

Station #01 is shown using local finder-connector link #4 for answering a code call. The code answering number 09 has been dialled, and wipers 353' and 354' of link #4 are shown in engagement with contacts #09 (ninteenth contacts) of their banks. The circuit to associated chain relay 340 is, however, incomplete because chain relay 860 is shown in the operated position and, therefore, relay 340 cannot operate at this moment. It should be understood in connection with this explanation that station #01 could not dial code answering number 09 until after station #05 is picked up by the calling number finder switch of the code call link and has then dialled the code call of the wanted local person, but finder-connector link #4 is shown positioned to the code answering number 09 bank contacts in order to complete the circuits associated with chain relay 340. It is obvious that chain relay 340 cannot operate and lock unless chain relays 840, 850, 860 ad 330 are in the normal, or non-operated, position.

When a marking potential is extended from a local finder-connector link to the banks of the trunk finder switches, it is also automatically extended to the banks of the two finder switches associated with the code call link. Conversely, when a marking potential is extended from a local finder-connector link to the banks of the two finder switches associated with the code call link, it is also automatically extended to the banks of the trunk finder switches. These two conditions are true because the local station contacts of the finder switches associated with the local finder-connector links are multipled to corresponding contacts of the two finder banks associated with the code call link. It would, therefore, appear that the restricting functions of the trunk call restriction relays 800 and 810 would also be effective when a local station restricted from originating an outgoing trunk call or answering an incoming trunk call attempts to gain access to the code call link for the purpose of making a code call. However, this assumption is not correct because trunk call restriction relay 800 is operated only when chain relay 840 is operated, and trunk call restriction relay 810 only when chain relay 850 is operated. Hence, the operation of either code call chain relay 330 or code call chain relay 340 does not cause the call restriction functions to be applied even though the local station contacts of all finder switches are multipled together.

A chain relay circuit similar to the chain relay circuit just described is included in the trunk circuits to permit only one trunk call to be transferred to a local station at a time. The relays associated with this chain circuit are relay 550 in trunk circuit #1, relays 550' in the remaining trunk circuits and relay 740 in the transfer control circuit. The interwiring of these relays is shown in Figures 5 and 7.

*Attendant's station*

The attendant's station shown in Figure 4 is in reality one of the local station lines equipped with special facilities for the handling of trunk connections between the local exchange and the distant exchange. The local exchange can be operated entirely without the use of the attendant's station in the completion of trunk calls to and from the distant exchange, or the attendant's station can be used when the traffic is of such a nature that it is desirable to have one station answer incoming trunk calls and then transfer such calls to the local stations desired. Another arrangement is to operate the attendant's station during normal traffic periods, and to switch the attendant's station out of service during night or other light load periods.

As will be seen, the attendant's station is fitted with an information line, including a line relay 10 and a cut-off relay 20, which is connected to the local exchange over conductors 1 and 2 in exactly the same manner as a line circuit associated with any local station. The attendant can, therefore, make calls over conductors 1 and 2 to local stations, in a manner similar to that described in the section titled "Local calls," by first operating the information line talk key and then the dial after receiving dial tone. The operation of the talk key completes the circuit of relay 410 from ground at contact 401, contact 402 of talk key, winding of relay 410, armatures 411, 475, 413, 444, resistance 427 to negative battery, causing relay 410 to operate and lock through armatures 412, 444, resistance 427 to negative battery. The operation of relay 410 connects the attendant's telephone set to conductors 1 and 2 through armatures 415 and 416 and associated working contacts. The attendant can hold any established local connection by operating the information line hold key, thereby bridging conductors 1 and 2 with a resistance 404, after which the attendant may restore the information line talk key and answer an incoming trunk call.

In the same manner as described in the section titled "Local calls," local stations desiring to call the attendant dial the digits 0 and 1 to cause a local connector switch to connect with the attendant's information line. Ringing current from the connector switch causes relay 405 to operate and then lock to ground at armature 414 and resting contact. The operation of relay 405 completes the circuit of call lamp 403 to signal the attendant who then operates the information line talk key to answer the call. The operation of the talk key completes the circuit to relay 410 from ground at contact 401, contact 402 of talk key, winding of relay 410, armatures 411, 475, 413, 444, resistance 427 to negative battery, causing relay 410 to operate and lock through armatures 412, 444, resistance 427 to negative battery. At armatures 415 and 416, relay 410 connects the attendant's telephone set to conductors 1 and 2, thereby operating the ringing cut-off relay in the connector switch and disconnecting the ringing current. At the resting contact of armature 414, relay 410 opens the locking circuit of line relay 405 which in turn opens the circuit of call lamp 403 at armature 406. At the conclusion of the conversation, the attendant returns the talk key to normal position thereby causing relay 410 to restore and disconnect the attendant's telephone set from line conductors 1 and 2.

Assuming now that the attendant is to answer all incoming trunk calls, then the circuit from the working contact of armature 567 (Figure 5) to the trunk signals located throughout the establishment is opened by means of a key switch (not shown). Now, when trunk circuit #1, for example, is seized on an incoming call, relays 670, 630 and 660 are operated in the manner described in detail in the section titled "Incoming trunk calls." The periodic application of ringing current to trunk circuit #1 at the distant exchange causes relay 635 and 655 to operate during the ringing periods and restore during the silent periods, also in the manner described in the section titled "Incoming trunk calls."

Relay 655, upon operating, completes the circuit of call lamp 435 at the attendant's station from ground, armature 656, conductor 672 to Figure 5, conductor 672 in cable 490 to Figure 4, conductor 672 in Figure 4, call lamp 435 to negative battery. At armature 658, relay 655 completes the circuit to relay 565 from ground, armature 644 and resting contact, armature 663, conductor 691, armatures 515, 538, conductor 687, armature 658, left-hand control of busy switch 628, conductor 684, winding of relay 565 to negative battery. Relay 565, upon operating, locks to ground by way of armature 644 and resting contact, armature 663, conductor 691, armatures 515, 538 and 568. At armature 566, relay 565 completes a multiple circuit to call lamp 435 by way of conductor 672, thereby causing call lamp 435 to glow continuously when relay 655 restores during each silent period. At this point in the connection, relays 565, 630, 660 and 670 are in the operated position, and relays 635 and 655 are operated during the ringing periods.

The attendant answers the incoming trunk call by operating the talk key of trunk circuit #1. The operation of the talk key completes the circuit to relay 440 from ground at contact 433, contact 434 of talk key, winding of relay 440, armatures 442, 475, 413, 444, resistance 427 to negative battery, causing relay 440 to operate and lock through armature 443, resistance 427 to negative battery. Relay 440 connects the attendant's telephone set to trunk circuit #1 by way of armature 449, conductor 479 in cable 490 to Figure 5, conductor 479 in Figure 5, armature 571 and resting contact, conductor 675, upper left-hand winding of repeating coil 604, conductor 676, upper windings of relays 580 and 575 in series, negative battery, ground, lower windings of relay 575 and 580 in series, conductor 677, lower left-hand winding of repeating coil 604, conductor 678, armature 572 and resting contact, conductor 486 in cable 490 to Figure 4, conductor 486 in Figure 4, and armature 439. The loop from the attendant's station telephone set is thus extended to relay 580 and 575 in series, causing relay 575 to operate. Relay 580 is differentially wound and, consequently, does not operate at this time.

At armature 576, relay 575 completes the loop circuit to the distant exchange through series relay 625 for cutting off the ringing current from trunk circuit #1 and for giving answering supervision to the distant exchange. At armature 577, relay 575 completes the circuit to relay 640 from ground, armature 577 and working contact, conductor 688, winding of relay 640 to negative battery. Relay 640 operates and, at armature 642, removes relay 670 from in bridge with trunk conductors 601 and 602. At armature 643, relay 640 completes a multiple circuit to relay 660. The cessation of ringing current causes relay 635 and 655 to return to, or remain in, the normal position, dependent upon whether the ringing cut off in a ringing period or a silent period.

Relay 670, upon restoring, removes ground from relay 630, but relay 630 does not restore at this time because of its slow-to-release action. Series relay 625, upon operating when the ringing cut-off circuit is closed at armature 576, completes the locking circuit of relay 630 from ground, armature 631 and working contact, and armatures 626 and 641. The slow-to-release action of relay 630 prevents its possible release should its circuit be opened at armature 671 before the locking circuit is completed at armature 626. The operation of relay 640 also opens the locking circuit of relay 565 at the resting contact of armature 644, causing relay 565 to restore and open the circuit of call lamp 435 at armature 566. The talking circuit from the attendant's station to the distant exchange is now complete inductively through the windings of repeating coil 604, and relays 575, 625, 630, 640 and 660 in the trunk circuit are operated at this time.

The release of the connection between the attendant's station and the distant exchange is controlled from the distant exchange. The attendant may restore the trunk talk key to normal before the trunk circuit is disconnected at the distant exchange, in which event relays 440 and 575 restore. At armatures 449 and 439, relay 440 disconnects the attendant's telephone set from the trunk circuit, and the loop circuit to the distant exchange is opened at armature 576 thus giving supervision to the distant exchange and causing relay 625 to restore. At armature 577, relay 575 opens the circuit to relay 640, but relay 640 is slow to release and, therefore, a circuit to relay 650 is completed temporarily from ground, armature 577 and resting contact, conductor 689, armature 645, winding of relay 650 to negative battery. Relay 650 is also of the slow-to-release type and, therefore, maintains its armatures in the operated position for a short interval. Relay 625, upon restoring, opens the locking circuit to relay 630 at armature 626, but relay 630 is maintained in the operated position by the temporary circuit from ground and armatures 631 and 651.

Relay 640 restores after a short period and, at armature 642, re-connects relay 670 across trunk conductors 601 and 602, causing relay 670 to re-operate: at armature 643, opens a multiple circuit to relay 660 but relay 660 is maintained in the operated position at armature 633 and working contact; and, at armature 645, opens the circuit to relay 650. The re-operation of relay 670 establishes a multiple circuit to relay 630 at armature 671 before the temporary holding circuit to relay 630 is opened at armature 651, thereby preventing the release of relay 630. Opening the trunk circuit at the distant exchange causes the release of relay 670. The holding circuit to relay 630 is thus opened at armature 671, and relay 630 restores after a short interval. Relay 630, at armature 631, opens a point in its locking circuit: opens a point in the talking circuit at armature 632; and, at armature 633, opens the circuit of relay 660, causing relay 660 to restore after a short interval.

Relay 660, upon restoring, opens the circuit of busy lamp 436 at the attendant's station; and, at armature 664, connects relay 560 to conductor 547 by way of conductor 693, armature 664, right-hand contact of busy switch 628, conductor 683 and the resting contact of armature 562 for switching trunk circuit #1 back into the outgoing trunk call allotting chain. Trunk circuit #1 is now at normal, available for use in an outgoing trunk call either by the attendant or a local station, or for receiving an incoming trunk call from the distant exchange.

Assuming now that the attendant does not disconnect before the trunk circuit is opened at the distant exchange, then relay 575 is still operated when the trunk circuit is disconnected at the distant exchange, and relay 640 also remains in the operated position. Other trunk relays operated at this time are 625, 630 and 660. Relay 640, at 642, retains the circuit of relay 670 open and, therefore, relay 670 cannot supply ground to the winding of relay 630. Opening the trunk circuit at the distant exchange causes the release of series relay 625 which, in turn, opens the locking circuit of relay 630 at armature 626 and, since relay 630 cannot be maintained in the operated position by relay 670, relay 630 restores after a short interval.

Relay 630, upon restoring, opens a point in its locking circuit at armature 631: opens a point in the talking circuit at armature 632; and, at armature 633, opens a multiple circuit to relay 660 but relay 660 is maintained at armature 643. The attendant knowing that the conversation has been terminated, restores the talk key of the trunk circuit, this action disconnecting the attendant's telephone set from the trunk circuit and causing relay 575 to restore. At armature 577 in the normal position, relay 575 opens the circuit to relay 640, and relay 640 restores after a short interval. In the meantime, the circuit to relay 650 is completed from ground, armature 577 and resting contact, conductor 689, armature 645, winding of relay 650 to negative battery. Relay 650 restores shortly after its circuit is opened at armature 645, having performed no important function at this time.

At armature 642, relay 640 re-connects relay 670 in bridge with trunk conductors 601 and 602; and, at armature 643, opens a multiple circuit to relay 660. The circuit to relay 660 is now open at armatures 633, 643 and 654 and, after a short interval, relay 660 restores. At armature 664, relay 660 connects relay 560 to conductor 547 by way of conductor 693, armature 664, right-hand contact of busy switch 628, conductor 683 and the resting contact of armature 562 for switching trunk circuit #1 back into the outgoing trunk call allotting chain. Trunk circuit #1 is now at normal.

The attendant may make an outgoing call to the distant exchange by first operating the talk key of an idle trunk circuit thereby connecting the attendant's telephone set to the trunk circuit at armatures 449 and 439. The loop from the attendant's telephone set is thus extended to relays 580 and 575 in series, causing relay 575 to operate. Relay 580 is differentially wound and, consequently, does not operate at this time. At armature 577, relay 575 completes the circuit to relay 640 from ground, armature 577 and working contact, conductor 688, winding of relay 640 to negative battery, causing relay 640 to operate. The trunk line relay at the distant exchange is operated from ground by way of armature 632 and resting contact, winding of relay 625, armature 616 and resting contact, right-hand windings of repeating coil 604, conductor 674, armature 576 in the operated position, conductor 673, armature 612 and resting contact and conductor 601 to the line relay at the distant exchange, this circuit also causing series relay 625 to operate. The trunk line relay at the distant exchange functions in a conventional manner, dependent upon the type of distant exchange, and ground is then returned from the distant exchange over conductor 602 to operate relay 630 by way of armature 631 and resting contact, armatures 626, 641, winding of relay 630 to negative battery. Relay 630 locks to ground at armature 631 and working contact.

At armature 632 and working contact, relay 630 extends trunk conductor 602 to the winding of series relay 625, thereby shifting relay 625 to the loop supervisory circuit from the distant exchange. At armature 633, relay 630 completes the circuit to relay 660, causing relay 660 to operate. At armature 661, relay 660 completes the circuit to busy lamp 436 at the attendant's station from ground, armature 661 and working contact, conductor 476 in cable 490 through Figure 5 to Figure 4, conductor 476 in Figure 4, busy lamp 436 to negative battery.

Should the distant exchange be of the automatic type, dial tone is now returned from the distant exchange to the attendant over the completed talking circuit between the attendant and the distant exchange. In response to the attendant operating the dial, relay 575 correspondingly opens and closes the loop circuit to the distant exchange at armature 576, and the automatic switches in the distant exchange complete the desired connection. Relay 640 does not release when its circuit is intermittently opened at the working contact of armature 577 during the dialling; and, with the first de-energization of relay 575, the circuit to relay 650 is completed from ground, armature 577 and resting contact, conductor 689, armature 645, winding of relay 650 to negative battery.

Relay 650 is also of the slow-to-release type and, therefore, remains operated during each series of impulses when its circuit is intermittently opened at armature 577. Relay 650, in the operated position, maintains a multiple circuit to relay 630 from ground, armature 631 and working contact armature 651, winding of relay 630 to negative battery, thus preventing relay 630 from releasing when the original locking circuit of relay 630 is intermittently opened at armature 626 during the impulsing. At armature 652, relay 650 removes ringing relay 635 from in bridge with trunk conductors 601 and 602; and, at armature 653, short-circuits the lower right-hand winding of repeating coil 604. The disconnection of relay 535 from the trunk conductors 601 and 602, and the shunting of a portion of repeating coil 604, improves the dialling conditions. As each series of impulses cease, relay 575 remains in the operated position, thus opening the circuit to relay 650. When the final series of impulses has been completed, relay 650 is restored to the normal position for the period of conversation. Relay 650, upon restoring, removes the shunt from repeating coil 604 at armature 653, and at armature 652, re-connects relay 635 across the trunk, thereby restoring the original transmission circuit conditions.

After conversation, and responsive to the the attendant restoring the trunk circuit talk key, the loop circuit to relay 575 is opened at armatures 449 and 439, and relay 575 restores. At armature 576, relay 575 opens the loop circuit extending to the distant exchange, and the switches in the distant exchange are released. Relay 625 also restores when the trunk loop circuit is opened at armature 576, opening the locking circuit to relay 630 at armature 626 and causing relay 630 to restore after a short interval. At armature 577 in the normal position, relay 575 opens the circuit to relay 640, causing relay 640 to restore after a short interval.

Relay 630, upon restoring, opens a point in its locking circuit at armature 631; opens a point in the circuit to relay 625 at armature 632; and, at armature 633, opens a multiple circuit to relay 660. Relay 640, upon restoring, re-connects relay 670 in bridge with trunk conductors 601 and 602 at armature 642; and, at armature 643, opens a multiple circuit to relay 660, thereby causing relay 660 to restore after a short interval. Relay 660, at armature 661, opens the circuit to busy lamp 436 at the attendant's station; and, at armature 664, connects relay 560 to conductor 547 by way of conductor 693, armature 664, right-hand contact of busy switch 628, conductor 683 and the resting contact of armature 562 for switching this trunk circuit back into the outgoing trunk call allotting chain. The trunk circuit is now at normal.

Considering now the case where the distant exchange is of the manual type, the trunk line relay at the distant exchange is operated from ground, armature 632 and resting contact, winding of relay 625, armature 616 and resting contact, right-hand windings of repeating coil 604, conductor 674, armature 576 in the operated position, conductor 673, armature 612 and resting contact and conductor 601 to the line relay at the distant exchange, this circuit also causing series relay 625 to operate. The operation of the line relay at the distant exchange signals the operator thereat in the well-known manner. When the operator answers the call, ground is connected to conductor 602, thereby completing the circuit to relay 630 by way of armature 631 and resting contact, armatures 626, 641, winding of relay 630 to negative battery. Relay 630 locks to ground at armature 631 and working contact.

At armature 632 and working contact, relay 630 extends trunk conductor 602 to the winding of relay 625, thereby shifting relay 625 to the loop supervisory circuit from the distant exchange. At armature 633, relay 630 completes a multiple circuit to relay 660. The attendant is now connected to the distant exchange over the completed talking circuit, and informs the operator of the connection desired. The operator then extends the connection to the desired station in the well-known manner. The release of the connection is similar to that just described for the connection between the attendant's station and a distant automatic exchange, with the general exception that the operator at the distant exchange takes down the trunk connection at the distant exchange.

As in the case of a local station such as station #08, the attendant may transfer a trunk call to a local station. The transfer is accomplished by attendant first operating the common key designated "Transfer key" in Figure 4 momentarily, thereby shunting the lower winding of relay 580 in the trunk circuit and causing relay 580 to operate in a manner similar to that described in the section titled "Holding trunk calls." The operation of relay 580 causes relay 605 to operate and, when the attendant releases the transfer key, relay 580 is restored and causes relay 610 to operate. The operation of relays 605 and 610 causes the trunk circuit to be split into two sections, a holding bridge 619 to be connected across conductors 601 and 602 to the distant exchange, and a local finder-connector link is caused to find the split trunk line circuit and thereby connect with the attendant's station, the foregoing operations being similar to equivalent operations described in the section titled "Holding trunk calls." The attendant then dials the desired local station over the local finder-connector link.

When the called local station answers, the attendant instructs the answering person to depress his push button (in the case of station #6, the push button is 324) to accept the trunk call. The operation from this point on is the same as that described for station #6 in the section titled "Transferring trunk calls," with the minor exceptions that the attendant is substituted for station #08 and that the attendant's telephone set connected directly across the trunk circuit by means of conductors 486 and 479 instead of through the trunk finder wipers 451 and 452.

The attendant can also use the code call paging system over the information line circuit for locating desired local stations in a manner similar to that described for station #08 in the section titled "Code call paging system," and can transfer trunk calls over the paging system to local stations in a manner similar to that described in the section titled "Transferring trunk calls over the paging system."

Each trunk circuit to the distant exchange is equipped with a Hold key at the attendant's station by means of which the attendant may leave a trunk connection she is extending to a local station, thus enabling the attendant to restore the associated talk key to normal for the purpose of attending to another call. The operation of the hold key connect resistance 437 across the trunk circuit by way of contact 431 and conductors 478 and 479 in cable 490 to Figure 5, and conductors 478 and 479 in Figure 5 to the talking conductors of the trunk circuit. At contact 433, the hold key opens the circuit to relay 440, causing relay 440 to disconnect the attendant's telephone set from the trunk connection at armatures 449 and 439. Should the called local station on the first mentioned trunk connection answer before the attendant returns to the connection, the answering person will receive a tick tone warning by way of contact 432 of the trunk hold key, conductor 480 in cable 490 through Figure 5 to Figure 6, conductor 480 in Figure 6, conductor 141 in cable 146 through Figures 5 and 4 to Figure 1, conductor 141 in Figure 1, contact #21 of wiper 151 bank, wiper 151, conductor 161, armatures 201, 211, condenser 222, armatures 246 and working contact, 282, conductor 361, and wiper 351 to the line conductor leading to the called station. The person at the called local station thereupon accepts the trunk call by momentarily operating his push button such as 324, and the trunk circuit is switched to the called station in the manner previously described. This switching of the trunk circuit to the called local station causes the call lamp 435 at the attendant's station to glow from ground, contact 430 of the trunk hold key, conductor 477 in cable 490 to Figure 5, conductor 477 in Figure 5, armature 531, conductor 672 in cable 490 to Figure 4, conductor 672 in Figure 4, call lamp 435 to negative battery, thus informing the attendant that the called local station has answered and switched the trunk connection. The attendant thereupon returns the trunk hold key to the normal position, and the circuit of call lamp 435 is opened at contact 430 of the hold key.

Considering now the case in which the attendant has answered an incoming trunk call and then called a busy local station in an attempt to transfer the trunk call thereto, when the local connector switch encounters the busy connection busy tone is returned to the attendant to indicate that the called local station is in use. The attendant may then offer this trunk connection to the called busy local station by operating the common key designated "Station offer key" in Figure 4 and asking the busy local station to accept this trunk connection. The operation of the station offer key completes a circuit from ground, contact 420, armature 445 and working contact, conductor 482 in cable 490 through Figure 5 to Figure 6, conductor 482 in Figure 6, armature 606, conductor 144 in cable 146 through Figure 5 and Figure 4 to Figure 1, conductor 144 in Figure 1, contact #21 of wiper 155 bank, wiper 155, conductor 165, armatures 218, 241 and resting contact, 256, 274, lower winding of relay 260 to negative battery, causing relay 260 to operate and lock. The functioning of relay 260 from this point on is essentially the same as that described in the section titled "Local calls" wherein station #08 over-rides the encountered busy condition by momentarily operating busy over-ride push button 125. The person at the called busy local station may or may not accept the offered trunk connection, according to circumstance.

Considering now the case in which the attendant has answered an incoming trunk call, has called a local station for the purpose of transferring the trunk connection to the called local station, and then notes that the called local station is a fully-restricted station not equipped with a transfer push button such as 124. The attendant may then switch the trunk connection to the called local station by momentarily operating the common key designated "Station transfer key" in Figure 4. The operation of the station transfer key completes the circuit to relay 500 from ground, contact 421, armature 446 and working contact, conductor 483 in cable 490 to Figure 5, conductor 483 in Figure 5, armature 501, upper winding of relay 500 to negative battery, and from armature 501, lower winding of relay 500, armature 505, resistance 507 to negative battery. Relay 500 does not operate under this condition, but as soon as the station transfer key is released relay 500 operates from an induced momentary current flow through its windings sufficiently to close the "X" contact at armature 506. Relay 500 then locks to ground, armature 512 and resting contact, conductor 680, armature 623, conductor 679, armature 506, and both windings of relay 500 to negative battery. From this point on, the operation of the transfer is essentially the same as that described in the section titled "Transferring trunk calls" with the minor exceptions that the transfer key is at the attendant's station instead of at the called local station, and the attendant may remain connected to the trunk circuit after the transfer to the local station has been effected. In the latter case, tick tone is connected to the trunk circuit as long as the attendant retains the trunk talk key in the operated position to advise the persons on the trunk call that the attendant has not disconnected. This tick tone circuit may be traced from armature 441, conductor 481 in cable 490 to Figure 5, conductor 481 in Figure 5, armature 532 to the negative talking conductor of the trunk circuit.

Considering now the case in which a local station equipped with a transfer push button such as 124, and connected with a trunk circuit, desires to signal the attendant for the purpose of having the attendant take over the trunk connection. In order to signal the attendant, the person at the local station depresses the transfer push button and holds it depressed until the attendant answers. The holding of the push button in the depressed position causes call lamp 435 at the attendant's station to flash from interrupted ground, armatures 607, 611, conductor 672 in cable 490 through Figure 5 to Figure 4, conductor 672 in Figure 4, call lamp 435 to negative battery. When the attendant answers, the person at the local station releases the transfer push button and again operates the push button, this time momentarily. The first release of the push button causes relay 610 to operate and split the trunk circuit into two sections, hold the trunk connection and cause a local finder-connector link to be connected with the local station over the split trunk circuit, all of these operations being accomplished in the manner described in the section titled "Holding trunk calls." The second and momentary operation of the transfer push button re-connects the local station with the trunk circuit, removes the hold condition, re-connects the two sections of the trunk circuit, and releases the local finder-connector link in the manner described in the latter part of the section titled "Holding trunk calls." The attendant may take over the trunk connection by momentarily operating the common key designated "Station release key" in Figure 4, thus disconnecting the local station from the trunk circuit. The operation of the station release key unlocks relay 530 in the trunk circuit which relay in turn removes holding ground from the cut-off relay of the local station at armature 537. The original locking circuit of relay 530 may be traced from ground, contact 423 of station release key, armature 448 and working contact, conductor 485 in cable 490 through Figure 5 to Figure 6, conductor 485 in Figure 6, armature 662, conductor 685, armatures 514, 536, lower winding of relay 530 to negative battery. The attendant then deals with the trunk call as required, and may transfer the trunk connection to another local station, if necessary, in the manner previously described.

Considering now the case in which a local station connected with a trunk call and desiring to bring in a second local station to the trunk connection for establishing a conference between the person on the trunk circuit and the two local stations, then the person at the first mentioned local station momentarily operates the transfer push button at his telephone for the purpose of holding the trunk connection and causing a local finder-connector link to be connected with his telephone. He then dials the desired, or second, local station over the local link and requests the answering person to wait on the connection. Next, the person at the first mentioned local station signals the attendant in the manner described in the preceding paragraph and requests the attendant to complete the conference circuit. The attendant then momentarily operates the common key designated "Station conference key" in Figure 4, thereby completing the circuit to relay 600 from ground, contact 422 at the station conference key, armature 447, conductor 484 in cable 490 through Figure 5 to Figure 6, conductor 484 in Figure 6, winding of relay 600 to negative battery. Relay 600 operates and locks to ground by way of armature 535, conductor 681, and armature 638. At armatures 637 and 639, relay 600 multiples the talking conductors of the trunk circuit through condensers 648 and 649, conductors 141 and 142 in cable 146 through Figures 5 and 4 to Figure 1, conductors 141 and 142 in Figure 1 to the respective contacts #21 of wiper 151 and 152 banks, and then by way of the local finder-connector link to the second local station. The conference connection between the trunk circuit and the two local stations is now complete, and the attendant retires by restoring the trunk talk key to normal.

The attendant may monitor a trunk connection established to a local station by operating the common key designated "Monitor key" in Figure 4 in addition to operating the particular trunk talk key. The operation of the monitor key connects a condenser 426 in series with the attendant's telephone set, thus preventing the establishment of a direct-current loop across the trunk circuit from the attendant's telephone set while the attendant is monitoring the trunk connection.

A chain relay circuit similar to the chain relay circuit described in the preceding section titled "Trunk call allotter chain relays" is included in the attendant station's talk keys to permit only one talk key to be effective at one time. The relays associated with this chain circuit are relay 449 of each distant-exchange trunk circuit, relay 410 of the attendant's information line circuit, and relay 474. The interwiring of these relays is shown in Figure 4.

Having described the invention, what is considered new and is desired to have protected by Letters Patent is pointed out in the following claims:

1. In a telephone system, trunk lines, subscribers' lines, means including automatic type progressively movable switches for enabling subscribers to answer incoming calls and make outgoing calls over said trunk lines, an allotter including a relay for controlling the completion of incoming trunk calls and a relay for controlling the completion of outgoing trunk calls, said two relays accessible to said switches and operated therefrom one at a time for permitting the completion of their related trunk calls when one of said stations attempts to answer an incoming trunk call at the same time another of said stations initiates an outgoing trunk call, the operated relay delaying the operation of the other relay until the attempted trunk call related to the operated relay is completed, said allotter controlling the sequence of the operation of said two relays.

2. In a telephone system, trunk lines, local stations, an attendant's station, said trunk lines terminating at said attendant's station and also accessible to said local stations, means for connecting said local stations with said trunk lines, means controlled by a local station connected with one of said trunk lines for holding said trunk line and for establishing a local connection between said local station and another one of said local stations, signalling means at said attendant's station for each of said trunk lines, means controlled by said first local station for operating said signalling means at said attendant's station associated with said connected trunk line, means controlled by the attendant when responding to said signalling for connecting said attendant's station with said trunk line, means controlled by said first local station for causing said holding means to be disabled, means operative by said attendant for connecting said second station with said trunk line, the connection of said second local station with said trunk line completing a conference circuit including said trunk line and the said two local stations.

3. In a telephone system, subscribers' stations, progressively movable automatic switches for enabling said stations to complete at least two different kinds of calls, at least two relays accessible to said switches, one of said relays operative when any one of said stations attempts to complete one of said kinds of calls, another of said relays operative when any one of said stations attempts to complete another of said kinds of calls, said relays so inter-connected that only one of the relays is operated to permit the completion of its associated attempted call when calls of said two different kinds are attempted simultaneously, the operated relay also delaying the operation of the other relay until said attempted call associated with said operated relay is completed, said other relay thereupon automatically operating to permit the completion of its associated attempted call.

4. In a telephone system, trunks, stations with and without keys, an attendant's position, means controlled by a key-equipped station for connecting said one station with a trunk, means responsive to the operation of the key at said one station for holding said trunk and for enabling said one station to connect with another key-equipped station, means responsive to the operation of the key at said other station for transferring said trunk to said other station, for disabling said holding means, and for disconnecting said one station, means for signalling said attendant's position responsive to a second operation of the key at said other station, means for connecting said attendant's position with said trunk in bridge with said other station, means controlled by the attendant for holding said trunk and for disconnecting said other station, means controlled by the attendant for connecting with a keyless station, and means controlled by the attendant for switching said keyless station to said trunk and for disabling said last holding means.

5. In a telephone system, stations with and without key switches, an attendant's position, a trunk having a call signal at said attendant's position, means for connecting a switch-equipped station with said trunk, means responsive to the operation of the switch at said one station for operating said signal, means controlled by the attendant for connecting said position with said trunk in bridge with said one station, means controlled by the attendant for disconnecting said one station from said trunk, means controlled by the attendant for holding said trunk, means controlled by the attendant for connecting said position with a station having no key switch, and means controlled by the attendant for switching said trunk to said last station, for disabling said holding means, and for releasing said connection of said position with said last station.

JOHN H. VOSS.

REFERENCES CITED

The following references are of record in the file of this patent:

UNITED STATES PATENTS

| Number | Name | Date |
|---|---|---|
| Re. 17,006 | Nelson | June 19, 1928 |
| 1,735,575 | Jacobson | Nov. 12, 1929 |
| 1,855,701 | Beale | Apr. 26, 1932 |
| 2,056,752 | Voss | Oct. 6, 1936 |
| 2,087,930 | Voss | July 27, 1937 |
| 2,265,151 | Crocker | Dec. 9, 1941 |
| 2,289,895 | Abbott | July 14, 1942 |
| 2,332,966 | Erwin | Oct. 26, 1943 |
| 2,335,524 | Lomax | Nov. 30, 1943 |
| 2,380,950 | Deakin | Aug. 7, 1945 |